US012162785B2

(12) United States Patent
Rosko et al.

(10) Patent No.: US 12,162,785 B2
(45) Date of Patent: *Dec. 10, 2024

(54) OZONE DISTRIBUTION IN A FAUCET

(71) Applicant: Delta Faucet Company, Indianapolis, IN (US)

(72) Inventors: Michael Scot Rosko, Greenwood, IN (US); Patrick B. Jonte, Zionsville, IN (US); Adam M. DeVries, Anderson, IN (US); Kurt J. Thomas, Indianapolis, IN (US); Joel D. Sawaski, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 853 days.

This patent is subject to a terminal disclaimer.

(21) Appl. No.: 17/188,285

(22) Filed: Mar. 1, 2021

(65) Prior Publication Data

US 2021/0179461 A1    Jun. 17, 2021

Related U.S. Application Data

(60) Continuation of application No. 15/850,956, filed on Dec. 21, 2017, now Pat. No. 10,947,138, which is a division of application No. 14/362,764, filed as application No. PCT/US2012/068283 on Dec. 6, 2012, now Pat. No. 9,919,939.

(Continued)

(51) Int. Cl.
*C02F 1/78*    (2023.01)
*E03C 1/05*    (2006.01)
*C02F 1/467*   (2023.01)
*E03C 1/04*    (2006.01)

(52) U.S. Cl.
CPC ............... *C02F 1/78* (2013.01); *E03C 1/055* (2013.01); *C02F 1/4672* (2013.01); *C02F 2201/78* (2013.01); *C02F 2201/782* (2013.01); *C02F 2209/005* (2013.01); *C02F 2307/06* (2013.01);
(Continued)

(58) Field of Classification Search
None
See application file for complete search history.

(56) References Cited

U.S. PATENT DOCUMENTS 2,778,800 A   1/1957   Sheahan
3,653,514 A   4/1972   Holler
(Continued)

FOREIGN PATENT DOCUMENTS

CA   2945136    10/2015
CN   1675435    9/2005
(Continued)

OTHER PUBLICATIONS

US 7,959,789 B2, 06/2011, Field et al. (withdrawn)
(Continued)

*Primary Examiner* — Richard C Gurtowski
(74) *Attorney, Agent, or Firm* — Bose McKinney & Evans LLP

(57) ABSTRACT

A faucet for dispensing a fluid includes a spout, a pull-out spray head removably coupled to the spout and including an outlet, and a valve assembly in fluid communication with the outlet. Additionally, the faucet includes a fluid treatment assembly configured to output a treatment into the fluid.

14 Claims, 21 Drawing Sheets

Related U.S. Application Data

(60) Provisional application No. 61/567,392, filed on Dec. 6, 2011.

(52) U.S. Cl.
CPC .. *E03C 2001/0415* (2013.01); *E03C 2201/40* (2013.01); *Y10T 137/4238* (2015.04)

(56) References Cited

U.S. PATENT DOCUMENTS

| | | | |
|---|---|---|---|
| 3,805,481 A | 4/1974 | Armstrong |
| 4,214,962 A | 7/1980 | Pincon |
| 4,219,367 A | 8/1980 | Cary, Jr. |
| 4,352,740 A | 10/1982 | Grader et al. |
| 4,599,166 A | 7/1986 | Gesslauer |
| 4,650,573 A | 3/1987 | Nathanson |
| 4,955,535 A | 9/1990 | Tsutsui et al. |
| 4,971,687 A | 11/1990 | Anderson |
| 5,103,856 A | 4/1992 | Fleischmann |
| 5,173,178 A | 12/1992 | Kawashima et al. |
| 5,199,639 A | 4/1993 | Kobayashi et al. |
| 5,205,994 A | 4/1993 | Sawamoto et al. |
| 5,312,624 A | 5/1994 | Richter et al. |
| 5,354,541 A | 10/1994 | Sali |
| 5,368,815 A | 11/1994 | Kasting, Jr. |
| 5,405,631 A | 4/1995 | Rosenthal |
| 5,578,280 A | 11/1996 | Kazi et al. |
| 5,635,059 A | 6/1997 | Johnson |
| 5,670,094 A | 9/1997 | Sasaki |
| 5,680,658 A | 10/1997 | Ho |
| 5,728,287 A | 3/1998 | Hough et al. |
| 5,766,462 A | 6/1998 | Jones |
| 5,803,139 A | 9/1998 | Kennedy |
| 5,807,473 A | 9/1998 | Sadler et al. |
| 5,811,014 A | 9/1998 | Green |
| 5,824,274 A | 10/1998 | Long |
| 5,837,142 A | 11/1998 | Mullerheim |
| 5,843,291 A | 12/1998 | Eki et al. |
| 5,843,307 A | 12/1998 | Faivre et al. |
| 5,853,562 A | 12/1998 | Eki et al. |
| 5,858,201 A | 1/1999 | Otsuka et al. |
| 5,858,215 A | 1/1999 | Burchard et al. |
| 5,858,435 A | 1/1999 | Gallo |
| 5,879,732 A | 3/1999 | Caracciolo |
| 5,900,143 A | 5/1999 | Dalton et al. |
| 5,911,870 A | 6/1999 | Hough |
| 5,932,171 A | 8/1999 | Malchesky |
| 5,939,030 A | 8/1999 | Moxley |
| 5,945,068 A | 8/1999 | Ferone |
| 5,948,374 A | 9/1999 | Kuzumoto |
| 5,961,920 A | 10/1999 | Soremark |
| 5,962,383 A | 10/1999 | Doyel |
| 5,985,108 A | 11/1999 | Arai |
| 5,985,223 A | 11/1999 | Saxena |
| 5,989,407 A | 11/1999 | Andrews |
| 5,992,431 A | 11/1999 | Weber |
| 6,017,862 A | 1/2000 | Doyel |
| 6,019,950 A | 2/2000 | Lai |
| 6,024,882 A | 2/2000 | McNeilly et al. |
| 6,030,586 A | 2/2000 | Kuan |
| 6,035,871 A | 3/2000 | Oh |
| 6,039,884 A | 3/2000 | Burris |
| 6,045,588 A | 4/2000 | Estes |
| 6,058,940 A | 5/2000 | Lane |
| 6,060,439 A | 5/2000 | Doyel |
| 6,066,257 A | 5/2000 | Venkatesh |
| 6,086,833 A | 7/2000 | Conners |
| 6,096,219 A | 8/2000 | Green |
| 6,096,221 A | 8/2000 | Kerchouche |
| 6,106,731 A | 8/2000 | Hayes |
| 6,110,292 A | 8/2000 | Jewett |
| 6,123,759 A | 9/2000 | Mise |
| 6,132,629 A | 10/2000 | Boley |
| 6,135,146 A | 10/2000 | Koganezawa et al. |
| 6,139,710 A | 10/2000 | Powell |
| 6,153,105 A | 11/2000 | Tadlock |
| 6,153,151 A | 11/2000 | Moxley |
| 6,167,709 B1 | 1/2001 | Caracciolo |
| 6,171,469 B1 | 1/2001 | Hough et al. |
| 6,178,973 B1 | 1/2001 | Franca |
| 6,180,014 B1 | 1/2001 | Salama |
| 6,197,268 B1 | 3/2001 | Hwang |
| 6,197,321 B1 | 3/2001 | Richter et al. |
| 6,197,573 B1 | 3/2001 | Suryanarayan |
| 6,210,801 B1 | 4/2001 | Luo |
| 6,217,833 B1 | 4/2001 | Kolu |
| 6,221,487 B1 | 4/2001 | Luo |
| 6,231,769 B1 | 5/2001 | Pean |
| 6,235,392 B1 | 5/2001 | Luo |
| 6,245,229 B1 | 6/2001 | Kool et al. |
| 6,251,172 B1 | 6/2001 | Conrad |
| 6,267,125 B1 | 7/2001 | Bergman |
| 6,267,878 B1 | 7/2001 | Kerchouche |
| 6,273,108 B1 | 8/2001 | Bergman |
| 6,280,696 B1 | 8/2001 | Hsu |
| 6,299,668 B1 | 10/2001 | Penth |
| 6,299,778 B1 | 10/2001 | Penth |
| 6,300,255 B1 | 10/2001 | Venkataranan |
| 6,306,334 B1 | 10/2001 | Luc |
| 6,309,545 B1 | 10/2001 | Penth |
| 6,319,390 B1 | 11/2001 | Kono |
| 6,328,044 B1 | 12/2001 | Crisinel |
| 6,331,354 B1 | 12/2001 | Sealey |
| 6,340,379 B1 | 1/2002 | Penth |
| 6,348,155 B1 | 2/2002 | Conway |
| 6,348,227 B1 | 2/2002 | Caracciolo |
| 6,357,727 B1 | 3/2002 | Cho |
| 6,363,656 B1 | 4/2002 | Byun |
| 6,365,026 B1 | 4/2002 | Andrews |
| 6,368,503 B1 | 4/2002 | Williamson et al. |
| 6,375,717 B1 | 4/2002 | Peteln |
| 6,375,721 B1 | 4/2002 | Holter |
| 6,379,633 B1 | 4/2002 | Garlick |
| 6,379,746 B1 | 4/2002 | Birch |
| 6,380,119 B1 | 4/2002 | Grosch |
| 6,386,751 B1 | 5/2002 | Wootan et al. |
| 6,387,348 B1 | 5/2002 | Ferrell |
| 6,391,191 B2 | 5/2002 | Conrad |
| 6,399,492 B1 | 6/2002 | Andreas |
| 6,405,491 B1 | 6/2002 | Gallant |
| 6,419,831 B2 | 7/2002 | Wang |
| 6,426,005 B1 | 7/2002 | Larsson |
| 6,428,710 B1 | 8/2002 | Kempen et al. |
| 6,431,189 B1 | 8/2002 | Deibert |
| 6,436,445 B1 | 8/2002 | Hei |
| 6,436,826 B1 | 8/2002 | Pyo |
| 6,440,523 B1 | 8/2002 | Sealey |
| 6,440,547 B1 | 8/2002 | Luo |
| 6,444,314 B1 | 9/2002 | Luo |
| 6,447,633 B1 | 9/2002 | Peace |
| 6,451,066 B2 | 9/2002 | Estes |
| 6,453,584 B1 | 9/2002 | Buckner |
| 6,455,017 B1 | 9/2002 | Kasting, Jr. |
| 6,458,257 B1 | 10/2002 | Andrews |
| 6,461,487 B1 | 10/2002 | Andrews |
| 6,471,727 B2 | 10/2002 | Luo |
| 6,482,370 B2 | 11/2002 | Holsclaw et al. |
| 6,485,769 B2 | 11/2002 | Audy |
| 6,488,835 B1 | 12/2002 | Powell |
| 6,489,281 B1 | 12/2002 | Smith |
| 6,491,788 B2 | 12/2002 | Sealey |
| 6,491,879 B2 | 12/2002 | Conrad |
| 6,492,284 B2 | 12/2002 | Peace |
| 6,494,228 B2 | 12/2002 | Guillaume |
| 6,497,768 B2 | 12/2002 | Bergman |
| 6,506,309 B1 | 1/2003 | Daniels et al. |
| 6,506,351 B1 | 1/2003 | Jain |
| 6,511,914 B2 | 1/2003 | Wirth |
| 6,511,930 B1 | 1/2003 | Luo |
| 6,514,613 B2 | 2/2003 | Luo |
| 6,516,536 B2 | 2/2003 | Ryden |
| 6,521,194 B2 | 2/2003 | Yeh |
| 6,523,193 B2 | 2/2003 | Saraya |
| 6,528,163 B2 | 3/2003 | Sealey |

(56) References Cited

U.S. PATENT DOCUMENTS

| | | | |
|---|---|---|---|
| 6,537,494 B2 | 3/2003 | Garlick |
| 6,548,411 B2 | 4/2003 | Wirth |
| 6,551,182 B2 | 4/2003 | Caracciolo |
| 6,551,409 B1 | 4/2003 | DeGendt et al. |
| 6,551,490 B2 | 4/2003 | Andrews et al. |
| 6,555,053 B1 | 4/2003 | Aoyagi |
| 6,561,134 B1 | 5/2003 | Mikami |
| 6,562,386 B2 | 5/2003 | Ruan |
| 6,565,927 B1 | 5/2003 | Drzal |
| 6,576,096 B1 | 6/2003 | Andrews |
| 6,579,810 B2 | 6/2003 | Chang |
| 6,581,215 B1 | 6/2003 | Tai |
| 6,582,525 B2 | 6/2003 | Bergman |
| 6,585,867 B1 | 7/2003 | Asano |
| 6,591,638 B2 | 7/2003 | Estes |
| 6,591,845 B1 | 7/2003 | Bergman |
| 6,592,677 B1 | 7/2003 | Tomimori |
| 6,595,440 B2 | 7/2003 | Moriarty et al. |
| 6,596,033 B1 | 7/2003 | Luo |
| 6,601,594 B2 | 8/2003 | Bergman |
| 6,605,350 B1 | 8/2003 | Sealey |
| 6,609,863 B1 | 8/2003 | Morioka et al. |
| 6,615,854 B1 | 9/2003 | Hongo |
| 6,626,212 B2 | 9/2003 | Morioka et al. |
| 6,632,292 B1 | 10/2003 | Aegerter |
| 6,637,049 B2 | 10/2003 | Gallant |
| 6,637,438 B1 | 10/2003 | Lane |
| 6,638,364 B2 | 10/2003 | Harkins et al. |
| 6,645,255 B2 | 11/2003 | Sanduja et al. |
| 6,645,569 B2 | 11/2003 | Cramer et al. |
| 6,645,874 B1 | 11/2003 | Torek |
| 6,649,052 B2 | 11/2003 | Lee |
| 6,651,134 B1 | 11/2003 | Phelan |
| 6,652,816 B2 | 11/2003 | Hwang |
| 6,664,095 B1 | 12/2003 | Suryanarayan |
| 6,671,563 B1 | 12/2003 | Engelson et al. |
| 6,673,248 B2 | 1/2004 | Chowdbury |
| 6,680,253 B2 | 1/2004 | Wirth |
| 6,681,417 B2 | 1/2004 | Brunelle |
| 6,691,536 B2 | 2/2004 | Severns et al. |
| 6,692,613 B2 | 2/2004 | Peace |
| 6,692,827 B2 | 2/2004 | Luo |
| 6,696,228 B2 | 2/2004 | Muraoka |
| 6,699,330 B1 | 3/2004 | Muraoka |
| 6,701,941 B1 | 3/2004 | Bergman |
| 6,702,941 B1 | 3/2004 | Haq |
| 6,702,949 B2 | 3/2004 | Wood |
| 6,706,237 B2 | 3/2004 | Luo |
| 6,706,876 B2 | 3/2004 | Luo |
| 6,709,599 B1 | 3/2004 | Rosenberger |
| 6,710,002 B2 | 3/2004 | Grosch |
| 6,712,951 B2 | 3/2004 | Andrews |
| 6,723,233 B1 | 4/2004 | Barnes |
| 6,726,749 B2 | 4/2004 | Peteln |
| 6,727,818 B1 | 4/2004 | Wildman et al. |
| 6,730,176 B2 | 5/2004 | Kuyel |
| 6,731,989 B2 | 5/2004 | Engleson et al. |
| 6,738,996 B1 | 5/2004 | Malek et al. |
| 6,743,301 B2 | 6/2004 | Matsuno |
| 6,746,580 B2 | 6/2004 | Andrews |
| 6,757,921 B2 | 7/2004 | Esche |
| 6,766,670 B2 | 7/2004 | Estes |
| 6,766,963 B2 | 7/2004 | Hansen |
| 6,769,568 B2 | 8/2004 | Bonini et al. |
| 6,770,168 B1 | 8/2004 | Stigsson |
| 6,771,916 B2 | 8/2004 | Hoffman |
| 6,774,056 B2 | 8/2004 | Kuntz |
| 6,786,221 B2 | 9/2004 | Lane |
| 6,790,429 B2 | 9/2004 | Ciampi |
| 6,794,291 B2 | 9/2004 | Peace |
| 6,797,156 B2 | 9/2004 | Chau |
| 6,800,206 B2 | 10/2004 | Robinson |
| 6,802,984 B1 | 10/2004 | Perkins |
| 6,803,066 B2 | 10/2004 | Traeder et al. |
| 6,806,194 B2 | 10/2004 | Wirth |
| 6,808,637 B2 | 10/2004 | Cho |
| 6,810,548 B2 | 11/2004 | Yoshioka |
| 6,811,811 B2 | 11/2004 | Gerald France et al. |
| 6,814,876 B1 | 11/2004 | Neal |
| 6,817,370 B2 | 11/2004 | Bergman |
| 6,821,443 B2 | 11/2004 | Kim |
| 6,837,252 B2 | 1/2005 | Bergman |
| 6,837,944 B2 | 1/2005 | Kashkoush |
| 6,838,376 B2 | 1/2005 | Matsuse |
| 6,841,075 B2 | 1/2005 | Penth |
| 6,843,835 B2 | 1/2005 | Fornai |
| 6,844,742 B2 | 1/2005 | Centanni |
| 6,851,873 B2 | 2/2005 | Muraoka |
| 6,858,571 B2 | 2/2005 | Pham et al. |
| 6,860,277 B2 | 3/2005 | Lee |
| 6,861,023 B2 | 3/2005 | Sealey |
| 6,861,356 B2 | 3/2005 | Matsuse |
| 6,863,933 B2 | 3/2005 | Cramer et al. |
| 6,866,806 B2 | 3/2005 | Andrews |
| 6,869,487 B1 | 3/2005 | Bergman |
| 6,869,540 B2 | 3/2005 | Robinson |
| 6,872,366 B2 | 3/2005 | Thomas |
| 6,872,444 B2 | 3/2005 | McDonald et al. |
| 6,874,535 B2 | 4/2005 | Parsons et al. |
| 6,876,303 B2 | 4/2005 | Reeder et al. |
| 6,881,243 B1 | 4/2005 | Khitrik |
| 6,883,563 B2 | 4/2005 | Smith |
| 6,893,469 B1 | 5/2005 | Van Hauwermeiren et al. |
| 6,897,661 B2 | 5/2005 | Allen |
| 6,897,832 B2 | 5/2005 | Essig |
| 6,898,951 B2 | 5/2005 | Severns et al. |
| 6,904,920 B2 | 6/2005 | Bexten |
| 6,908,976 B2 | 6/2005 | Sanduja et al. |
| 6,913,028 B2 | 7/2005 | Morioka et al. |
| 6,915,170 B2 | 7/2005 | Engleson et al. |
| 6,919,032 B2 | 7/2005 | Mulgrew |
| 6,921,476 B2 | 7/2005 | Abe |
| 6,927,176 B2 | 8/2005 | Verhaverbeke |
| 6,929,903 B2 | 8/2005 | Itoh |
| 6,930,046 B2 | 8/2005 | Hanson |
| 6,932,903 B2 | 8/2005 | Chang |
| 6,932,907 B2 | 8/2005 | Haq |
| 6,933,733 B2 | 8/2005 | Korenev |
| 6,946,080 B2 | 9/2005 | Perkins |
| 6,946,852 B2 | 9/2005 | Centanni |
| 6,949,145 B2 | 9/2005 | Banerjee |
| 6,953,525 B2 | 10/2005 | LeCraw |
| 6,964,739 B2 | 11/2005 | Boyd |
| 6,969,682 B2 | 11/2005 | Hanson |
| 6,970,574 B1 | 11/2005 | Johnson |
| 6,974,562 B2 | 12/2005 | Ciampi et al. |
| 6,982,006 B1 | 1/2006 | Boyers |
| 6,982,241 B2 | 1/2006 | Smith |
| 6,983,756 B2 | 1/2006 | Matsuno |
| 6,984,295 B2 | 1/2006 | Shiue |
| 6,988,568 B2 | 1/2006 | Buckner |
| 6,990,868 B2 | 1/2006 | Hardcastle |
| 6,991,820 B2 | 1/2006 | Ming et al. |
| 7,001,086 B2 | 2/2006 | Itoh |
| 7,008,523 B2 | 3/2006 | Herrington |
| 7,008,535 B1 | 3/2006 | Spears |
| 7,008,592 B2 | 3/2006 | Sias |
| 7,013,504 B2 | 3/2006 | Brunelle |
| 7,014,684 B2 | 3/2006 | Dietrich |
| 7,015,816 B2 | 3/2006 | Wildman et al. |
| 7,018,481 B2 | 3/2006 | Hayasaki |
| 7,029,577 B2 | 4/2006 | Cummins |
| 7,029,637 B2 | 4/2006 | Hogarth |
| 7,037,853 B2 | 5/2006 | Hongo |
| 7,041,226 B2 | 5/2006 | Vaideeswaran |
| 7,041,270 B2 | 5/2006 | Hammel |
| 7,043,855 B2 | 5/2006 | Heilman |
| 7,047,663 B2 | 5/2006 | Zhang |
| 7,059,065 B2 | 6/2006 | Gerlach |
| 7,067,057 B2 | 6/2006 | Rosenberger |
| 7,067,444 B2 | 6/2006 | Luo |
| 7,070,125 B2 | 7/2006 | Williams et al. |
| 7,070,769 B2 | 7/2006 | Ascione et al. |
| 7,071,175 B1 | 7/2006 | Linschoten |

(56) References Cited

U.S. PATENT DOCUMENTS

| | | |
|---|---|---|
| 7,074,751 B2 | 7/2006 | Singh et al. |
| 7,081,095 B2 | 7/2006 | Lynn et al. |
| 7,083,510 B2 | 8/2006 | Caracciolo |
| 7,083,704 B2 | 8/2006 | Sealey |
| 7,086,407 B2 | 8/2006 | Lynn |
| 7,087,123 B2 | 8/2006 | Lynn |
| 7,087,124 B2 | 8/2006 | Lynn |
| 7,087,504 B2 | 8/2006 | Nakajima |
| 7,087,805 B2 | 8/2006 | Centanni |
| 7,089,763 B2 | 8/2006 | Forsberg |
| 7,090,744 B2 | 8/2006 | Sealey |
| 7,093,734 B2 | 8/2006 | Garwood |
| 7,094,522 B2 | 8/2006 | Itoh |
| 7,096,072 B2 | 8/2006 | Engleson et al. |
| 7,103,419 B2 | 9/2006 | Engleson et al. |
| 7,105,133 B2 | 9/2006 | Kim |
| 7,107,106 B2 | 9/2006 | Engleson et al. |
| 7,112,621 B2 | 9/2006 | Rohrbaugh et al. |
| 7,117,041 B2 | 10/2006 | Engleson et al. |
| 7,118,672 B2 | 10/2006 | Husain |
| 7,122,484 B2 | 10/2006 | Perng |
| 7,128,278 B2 | 10/2006 | Achambeau |
| 7,135,108 B1 | 11/2006 | Barnes |
| 7,146,749 B2 | 12/2006 | Barron |
| 7,147,692 B2 | 12/2006 | Fornai |
| 7,153,370 B2 | 12/2006 | Lee |
| 7,160,441 B2 | 1/2007 | Gannon |
| 7,160,472 B2 | 1/2007 | Van Vliet |
| 7,163,588 B2 | 1/2007 | Bergman |
| 7,166,219 B2 | 1/2007 | Kohler |
| 7,169,295 B2 | 1/2007 | Husain |
| 7,171,277 B2 | 1/2007 | Engleson et al. |
| 7,174,601 B1 | 2/2007 | Palmer |
| 7,179,746 B2 | 2/2007 | Ohmi |
| 7,186,375 B2 | 3/2007 | Centanni |
| 7,188,632 B2 | 3/2007 | Lynn |
| 7,192,553 B2 | 3/2007 | Crowe |
| 7,199,516 B2 | 4/2007 | Seo |
| 7,205,018 B2 | 4/2007 | Sherwood et al. |
| 7,211,185 B2 | 5/2007 | Powell |
| 7,211,187 B2 | 5/2007 | Lumbert |
| 7,214,356 B2 | 5/2007 | Hsieh et al. |
| 7,217,325 B2 | 5/2007 | Hanson |
| 7,217,952 B2 | 5/2007 | Nakajima |
| 7,223,822 B2 | 5/2007 | Abhari et al. |
| 7,242,306 B2 | 7/2007 | Wildman et al. |
| 7,244,354 B2 | 7/2007 | Burris |
| 7,255,332 B2 | 8/2007 | Osborn |
| 7,255,831 B2 | 8/2007 | Wei |
| 7,258,798 B2 | 8/2007 | LeCraw |
| 7,258,802 B2 | 8/2007 | Miks |
| 7,264,680 B2 | 9/2007 | Gebhart |
| 7,271,728 B2 | 9/2007 | Taylor et al. |
| 7,272,947 B2 | 9/2007 | Anderson |
| 7,273,562 B2 | 9/2007 | Van Leeuwen |
| 7,273,716 B2 | 9/2007 | McDermott |
| 7,275,400 B2 | 10/2007 | Severns et al. |
| 7,275,551 B2 | 10/2007 | Kanaya |
| 7,278,434 B2 | 10/2007 | Huang |
| 7,279,451 B2 | 10/2007 | Singh et al. |
| 7,285,256 B2 | 10/2007 | Wan |
| 7,293,658 B2 | 11/2007 | Cummins |
| 7,294,278 B2 | 11/2007 | Spears |
| 7,294,681 B2 | 11/2007 | Jiang et al. |
| 7,297,225 B2 | 11/2007 | Thomas |
| 7,300,571 B2 | 11/2007 | Cote |
| 7,303,676 B2 | 12/2007 | Husain |
| 7,303,677 B2 | 12/2007 | Cote |
| 7,307,188 B2 | 12/2007 | Wytcherley |
| 7,314,600 B2 | 1/2008 | Matsuzaki |
| 7,320,756 B2 | 1/2008 | Mukhopadhyay |
| 7,322,535 B2 | 1/2008 | Erdely |
| 7,332,095 B2 | 2/2008 | Johnston |
| 7,341,984 B2 | 3/2008 | Wilson et al. |
| 7,344,640 B2 | 3/2008 | Gannon |
| 7,354,933 B2 | 4/2008 | Patek |
| 7,371,637 B2 | 5/2008 | Ramkumar |
| 7,373,787 B2 | 5/2008 | Forsberg |
| 7,378,084 B2 | 5/2008 | Dueva-Koganov |
| 7,378,355 B2 | 5/2008 | Bergman |
| 7,381,244 B2 | 6/2008 | Tyndall |
| 7,381,338 B2 | 6/2008 | Van Leeuwen |
| 7,382,332 B2 | 6/2008 | Essig |
| 7,387,719 B2 | 6/2008 | Carson |
| 7,387,736 B2 | 6/2008 | Phillips |
| 7,388,649 B2 | 6/2008 | Kobayashi et al. |
| 7,390,365 B2 | 6/2008 | Itoh |
| 7,392,600 B2 | 7/2008 | Gerlach |
| 7,399,713 B2 | 7/2008 | Aegerter |
| 7,402,253 B2 | 7/2008 | Van Leeuwen |
| 7,404,863 B2 | 7/2008 | Bergman |
| 7,407,592 B2 | 8/2008 | Van Leeuwen |
| 7,407,633 B2 | 8/2008 | Potember |
| 7,408,470 B2 | 8/2008 | Wildman et al. |
| 7,413,650 B2 | 8/2008 | Lumbert |
| 7,415,781 B2 | 8/2008 | Barron |
| 7,416,581 B2 | 8/2008 | Raetz |
| 7,416,611 B2 | 8/2008 | Bergman |
| 7,416,660 B2 | 8/2008 | Van Leeuwen |
| 7,422,684 B1 | 9/2008 | Davis |
| 7,423,728 B2 | 9/2008 | Matsunaga |
| 7,429,537 B2 | 9/2008 | Aegerter |
| 7,438,392 B2 | 10/2008 | Vaideeswaran |
| 7,442,352 B2 | 10/2008 | Lu |
| 7,443,302 B2 | 10/2008 | Reeder et al. |
| 7,443,305 B2 | 10/2008 | Verdiramo |
| 7,446,121 B2 | 11/2008 | Pfefferkorn |
| 7,449,127 B2 | 11/2008 | Verhaverbeke |
| 7,450,024 B2 | 11/2008 | Wildman et al. |
| 7,456,113 B2 | 11/2008 | Rayandayan |
| 7,459,075 B2 | 12/2008 | Burns |
| 7,462,608 B2 | 12/2008 | Chen et al. |
| 7,464,418 B2 | 12/2008 | Seggio et al. |
| 7,469,883 B2 | 12/2008 | Verhaverbeke |
| 7,470,172 B2 | 12/2008 | Caracciolo |
| 7,479,215 B2 | 1/2009 | Carson |
| 7,479,477 B2 | 1/2009 | Wilson et al. |
| 7,481,935 B2 | 1/2009 | Olivier |
| 7,482,207 B2 | 1/2009 | Brown et al. |
| 7,483,756 B2 | 1/2009 | Engleson et al. |
| 7,488,409 B1 | 2/2009 | Carson |
| 7,488,419 B1 | 2/2009 | Wang et al. |
| 7,493,906 B2 | 2/2009 | Mulgrew |
| 7,494,074 B2 | 2/2009 | Berstead |
| 7,494,549 B2 | 2/2009 | Eitoku |
| 7,494,962 B2 | 2/2009 | Kin et al. |
| 7,501,103 B2 | 3/2009 | Oeste |
| 7,501,550 B2 | 3/2009 | Klaptchuk |
| 7,503,127 B2 | 3/2009 | DuVal |
| 7,503,134 B2 | 3/2009 | Buckner |
| 7,504,267 B2 | 3/2009 | Liang |
| 7,514,008 B2 | 4/2009 | Burns |
| 7,517,445 B2 | 4/2009 | Carson |
| 7,524,466 B2 | 4/2009 | Long |
| 7,524,618 B2 | 4/2009 | Ito |
| 7,524,805 B2 | 4/2009 | Singh et al. |
| 7,524,910 B2 | 4/2009 | Jiang et al. |
| 7,531,463 B2 | 5/2009 | Koos |
| 7,531,710 B2 | 5/2009 | Carson |
| 7,531,730 B2 | 5/2009 | Everly |
| 7,534,288 B2 | 5/2009 | Bromberg |
| 7,534,304 B2 | 5/2009 | Conrad |
| 7,534,366 B2 | 5/2009 | Singh et al. |
| 7,534,400 B2 | 5/2009 | Hsieh et al. |
| 7,537,023 B2 | 5/2009 | Marty et al. |
| 7,537,640 B2 | 5/2009 | Wan |
| 7,541,402 B2 | 6/2009 | Abhari et al. |
| 7,542,586 B2 | 6/2009 | Johnson |
| 7,550,528 B2 | 6/2009 | Abhari et al. |
| 7,559,973 B2 | 7/2009 | Wan |
| 7,566,387 B2 | 7/2009 | Nam |
| 7,569,232 B2 | 8/2009 | Man et al. |
| 7,581,264 B2 | 9/2009 | Mangiardi |
| 7,581,549 B2 | 9/2009 | Johnson |

(56) References Cited

U.S. PATENT DOCUMENTS

| | | |
|---|---|---|
| 7,582,539 B2 | 9/2009 | Lee |
| 7,585,406 B2 | 9/2009 | Khadzhiev |
| 7,589,145 B2 | 9/2009 | Brant et al. |
| 7,604,735 B1 | 10/2009 | Barnes |
| 7,605,117 B2 | 10/2009 | Wilson et al. |
| 7,607,443 B2 | 10/2009 | Barnhill |
| 7,610,115 B2 | 10/2009 | Rob |
| 7,611,620 B2 | 11/2009 | Carson |
| 7,612,735 B2 | 11/2009 | Essig |
| 7,622,435 B2 | 11/2009 | Wilson et al. |
| 7,628,924 B2 | 12/2009 | Jack |
| 7,628,967 B2 | 12/2009 | Johnson |
| 7,629,306 B2 | 12/2009 | Shankland et al. |
| 7,631,372 B2 | 12/2009 | Marty et al. |
| 7,632,475 B2 | 12/2009 | Suchak et al. |
| 7,638,067 B2 | 12/2009 | Hilgren |
| 7,638,070 B2 | 12/2009 | Johnson |
| 7,640,766 B2 | 1/2010 | Shelton |
| 7,644,523 B2 | 1/2010 | Buckner |
| 7,645,829 B2 | 1/2010 | Tse et al. |
| 7,648,584 B2 | 1/2010 | Freer |
| 7,649,015 B2 | 1/2010 | Arimili et al. |
| 7,654,728 B2 | 2/2010 | Wood |
| 7,655,610 B2 | 2/2010 | Singh et al. |
| 7,662,293 B2 | 2/2010 | Brolin et al. |
| 7,669,608 B2 | 3/2010 | Hayasaki |
| 7,674,339 B2 | 3/2010 | Silberberg et al. |
| 7,679,879 B2 | 3/2010 | Furuhashi |
| 7,686,962 B2 | 3/2010 | Burns |
| 7,690,395 B2 | 4/2010 | Jonte et al. |
| 7,691,251 B2 | 4/2010 | Carson |
| 7,696,141 B2 | 4/2010 | Freer |
| 7,699,985 B2 | 4/2010 | Cote |
| 7,699,988 B2 | 4/2010 | McGuire |
| 7,699,994 B2 | 4/2010 | McGuire |
| 7,700,049 B2 | 4/2010 | Clark |
| 7,700,707 B2 | 4/2010 | Abhari et al. |
| 7,702,970 B2 | 4/2010 | Ha et al. |
| 7,708,958 B2 | 5/2010 | Namespetra |
| 7,726,906 B2 | 6/2010 | Essig |
| 7,728,513 B2 | 6/2010 | Seo |
| 7,731,800 B2 | 6/2010 | Puri |
| 7,733,459 B2 | 6/2010 | Dierichs |
| 7,736,599 B2 | 6/2010 | Chiu |
| 7,736,600 B2 | 6/2010 | Clark |
| 7,737,097 B2 | 6/2010 | Freer |
| 7,737,101 B2 | 6/2010 | Thonhauser et al. |
| 7,740,686 B2 | 6/2010 | Metteer |
| 7,740,815 B2 | 6/2010 | Smith |
| 7,755,494 B2 | 7/2010 | Melker et al. |
| 7,758,742 B2 | 7/2010 | Powell |
| 7,766,995 B2 | 8/2010 | Suchak et al. |
| 7,767,095 B2 | 8/2010 | Phillips |
| 7,767,168 B2 | 8/2010 | Namespetra |
| 7,767,638 B2 | 8/2010 | Singh et al. |
| 7,768,146 B2 | 8/2010 | Balzano |
| 7,770,782 B2 | 8/2010 | Sahud |
| 7,771,737 B2 | 8/2010 | Man et al. |
| 7,780,856 B2 | 8/2010 | Liou |
| 7,780,858 B2 | 8/2010 | Miks |
| 7,781,963 B2 | 8/2010 | Yoshida et al. |
| 7,782,214 B1 | 8/2010 | Lynn |
| 7,783,383 B2 | 8/2010 | Eliuk |
| 7,785,470 B2 | 8/2010 | McGuire |
| 7,790,127 B1 | 9/2010 | Lee |
| 7,790,477 B2 | 9/2010 | Liang |
| 7,794,770 B2 | 9/2010 | Sherwood et al. |
| 7,799,141 B2 | 9/2010 | Korolik |
| 7,799,363 B2 | 9/2010 | Sherwood et al. |
| 7,806,584 B2 | 10/2010 | Wood |
| 7,806,988 B2 | 10/2010 | Rana |
| 7,812,730 B2 | 10/2010 | Wildman et al. |
| 7,817,046 B2 | 10/2010 | Coveley et al. |
| 7,819,947 B2 | 10/2010 | Weist |
| 7,821,616 B2 | 10/2010 | Ito |
| 7,824,505 B2 | 11/2010 | Rana |
| 7,825,081 B2 | 11/2010 | Singh et al. |
| 7,829,144 B2 | 11/2010 | Matsuse |
| 7,836,543 B2 | 11/2010 | Field et al. |
| 7,837,882 B2 | 11/2010 | Van Vliet |
| 7,841,737 B2 | 11/2010 | Manglardi |
| 7,842,326 B2 | 11/2010 | Sherwood et al. |
| 7,846,263 B1 | 12/2010 | Marcantel |
| 7,850,098 B2 | 12/2010 | Vogel et al. |
| 7,857,995 B2 | 12/2010 | Johnson |
| 7,860,583 B2 | 12/2010 | Condurso et al. |
| 7,862,662 B2 | 1/2011 | Freer |
| 7,863,233 B2 | 1/2011 | Thonhauser |
| 7,875,173 B1 | 1/2011 | Barnes |
| 7,875,179 B2 | 1/2011 | Suzuki |
| 7,880,860 B2 | 2/2011 | Jansen |
| 7,886,557 B2 | 2/2011 | Anderson |
| 7,887,679 B2 | 2/2011 | Kitaori |
| 7,891,046 B2 | 2/2011 | Field et al. |
| 7,892,326 B2 | 2/2011 | Raetz |
| 7,896,947 B2 | 3/2011 | Takahashi |
| 7,897,192 B2 | 3/2011 | Sherwood et al. |
| 7,898,407 B2 | 3/2011 | Hufton et al. |
| 7,901,276 B2 | 3/2011 | McNaughton |
| 7,906,086 B2 | 3/2011 | Comrie |
| 7,906,160 B2 | 3/2011 | Sherwood et al. |
| 7,909,269 B2 | 3/2011 | Erickson et al. |
| 7,914,365 B2 | 3/2011 | McNaughton et al. |
| 7,922,668 B2 | 4/2011 | Rimdzius |
| 7,922,824 B2 | 4/2011 | Minsek et al. |
| 7,922,890 B2 | 4/2011 | Sanchez et al. |
| 7,927,428 B2 | 4/2011 | Shibazaki |
| 7,930,066 B2 | 4/2011 | Eliuk |
| 7,931,813 B2 | 4/2011 | Asokan et al. |
| 7,931,859 B2 | 4/2011 | Eliuk |
| 7,932,425 B2 | 4/2011 | Blessing |
| 7,932,618 B2 | 4/2011 | Baarman et al. |
| 7,935,565 B2 | 5/2011 | Brown et al. |
| 7,935,665 B2 | 5/2011 | Leon et al. |
| 7,938,911 B2 | 5/2011 | Zapilko |
| 7,943,040 B2 | 5/2011 | Taylor |
| 7,943,087 B2 | 5/2011 | McGuire |
| 7,946,299 B2 | 5/2011 | Franklin |
| 7,946,304 B2 | 5/2011 | Kim |
| 7,947,104 B2 | 5/2011 | Burnham |
| 7,947,108 B2 | 5/2011 | Wan |
| 7,952,484 B2 | 5/2011 | Lynn |
| 7,955,631 B2 | 6/2011 | Turatti |
| 7,956,480 B2 | 6/2011 | Onodera et al. |
| 7,956,481 B2 | 6/2011 | Baarman et al. |
| 7,959,943 B2 | 6/2011 | Hissong et al. |
| 7,964,068 B2 | 6/2011 | Kitaori |
| 7,964,166 B2 | 6/2011 | Suchak |
| 7,967,800 B2 | 6/2011 | Chewins |
| 7,968,006 B2 | 6/2011 | Johnson |
| 7,972,441 B2 | 7/2011 | Yokota |
| 7,976,873 B2 | 7/2011 | Myntti et al. |
| 7,976,875 B2 | 7/2011 | Myntti |
| 7,978,083 B2 | 7/2011 | Melker et al. |
| 7,981,297 B2 | 7/2011 | Sauvignet et al. |
| 7,985,188 B2 | 7/2011 | Felts et al. |
| 7,985,379 B2 | 7/2011 | Chiu |
| 7,986,395 B2 | 7/2011 | Chang et al. |
| 7,993,601 B2 | 8/2011 | Weiss |
| 7,993,675 B2 | 8/2011 | Oliver et al. |
| 8,002,614 B2 | 8/2011 | McNaughton et al. |
| 8,004,183 B2 | 8/2011 | Seo |
| 8,007,654 B2 | 8/2011 | Field et al. |
| 8,007,666 B1 | 8/2011 | Davis |
| 8,008,860 B2 | 8/2011 | Yoshida et al. |
| 8,012,339 B2 | 9/2011 | Field |
| 8,012,340 B2 | 9/2011 | Field et al. |
| 8,012,521 B2 | 9/2011 | Garwood |
| 8,012,758 B2 | 9/2011 | Enzien |
| 8,016,996 B2 | 9/2011 | Field et al. |
| 8,017,040 B2 | 9/2011 | Johnson |
| 8,017,041 B2 | 9/2011 | Johnson |
| 8,017,813 B2 | 9/2011 | Kin et al. |
| 8,020,564 B2 | 9/2011 | Batch |

(56) References Cited

U.S. PATENT DOCUMENTS

| | | |
|---|---|---|
| 8,021,577 B2 | 9/2011 | Johnson |
| 8,025,786 B2 | 9/2011 | Field et al. |
| 8,025,787 B2 | 9/2011 | Field et al. |
| 8,025,807 B2 | 9/2011 | Centanni |
| 8,026,821 B2 | 9/2011 | Reeder et al. |
| 8,029,726 B2 | 10/2011 | Resch |
| 8,043,439 B2 | 10/2011 | Park |
| 8,043,441 B2 | 10/2011 | de Larios |
| 8,046,867 B2 | 11/2011 | Field et al. |
| 8,048,279 B2 | 11/2011 | Powell |
| 8,053,401 B2 | 11/2011 | Thonhauser et al. |
| 8,053,404 B2 | 11/2011 | Singh et al. |
| 8,057,812 B2 | 11/2011 | Man et al. |
| 8,065,882 B2 | 11/2011 | Singh et al. |
| 8,070,882 B2 | 12/2011 | Schwab |
| 8,071,526 B2 | 12/2011 | Lynn |
| 8,071,687 B2 | 12/2011 | Jiang et al. |
| 8,072,576 B2 | 12/2011 | Kobayashi et al. |
| 8,075,705 B2 | 12/2011 | Lynn |
| 8,082,857 B2 | 12/2011 | George et al. |
| 8,084,394 B2 | 12/2011 | Steffen |
| 8,085,381 B2 | 12/2011 | Kawai |
| 8,088,867 B2 | 1/2012 | Jiang et al. |
| 8,097,166 B2 | 1/2012 | Nakashima |
| 8,099,802 B2 | 1/2012 | Yamaguchi et al. |
| 8,105,494 B2 | 1/2012 | Miks |
| 8,105,558 B2 | 1/2012 | Comrie |
| 8,115,899 B2 | 2/2012 | Jansen |
| 8,125,612 B2 | 2/2012 | Kobayashi et al. |
| 8,127,396 B2 | 3/2012 | Mangiardi |
| 8,128,888 B2 | 3/2012 | Bacik |
| 8,130,363 B2 | 3/2012 | Kobayashi et al. |
| 8,132,870 B2 | 3/2012 | Buczynski |
| 8,133,382 B2 | 3/2012 | Powell |
| 8,133,546 B2 | 3/2012 | Kumazawa |
| 8,134,682 B2 | 3/2012 | Kobayashi |
| 8,141,520 B2 | 3/2012 | Matsumura |
| 8,142,550 B2 | 3/2012 | Audunson |
| 8,147,889 B2 | 4/2012 | Kirkpatrick et al. |
| 8,148,317 B2 | 4/2012 | Singh et al. |
| 8,152,142 B2 | 4/2012 | Hirakui |
| 8,153,078 B2 | 4/2012 | Bacik |
| 8,156,608 B2 | 4/2012 | Field et al. |
| 8,158,152 B2 | 4/2012 | Palepu |
| 8,163,236 B1 | 4/2012 | Bacik |
| 8,163,243 B1 | 4/2012 | Burke |
| 8,163,689 B2 | 4/2012 | Singh et al. |
| 8,168,225 B2 | 5/2012 | Giner |
| 8,169,327 B2 | 5/2012 | Lynn |
| 8,169,592 B2 | 5/2012 | Kobayashi et al. |
| 8,174,668 B2 | 5/2012 | Kobayashi et al. |
| 8,182,743 B1 | 5/2012 | Bacik |
| 8,183,670 B2 | 5/2012 | Ohmi |
| 8,187,201 B2 | 5/2012 | Lynn |
| 8,192,968 B2 | 6/2012 | Edwards |
| 8,193,289 B2 | 6/2012 | Abhari et al. |
| 8,196,810 B2 | 6/2012 | Sahud |
| 8,197,698 B2 | 6/2012 | Johnson |
| 8,202,500 B2 | 6/2012 | Fahs |
| 8,206,647 B2 | 6/2012 | Kirkpatrick |
| 8,207,060 B2 | 6/2012 | Yang |
| 8,216,523 B2 | 7/2012 | Meilander |
| 8,216,630 B2 | 7/2012 | Autefage |
| 8,217,573 B2 | 7/2012 | Yoshida et al. |
| 8,222,345 B2 | 7/2012 | Abhari et al. |
| 8,226,832 B2 | 7/2012 | Angelilli |
| 8,237,558 B2 | 8/2012 | Seyed Momen et al. |
| 8,242,324 B2 | 8/2012 | Johnson |
| 8,243,195 B2 | 8/2012 | Eymard |
| 8,249,295 B2 | 8/2012 | Johnson |
| 8,252,359 B2 | 8/2012 | Ghosh |
| 8,258,965 B2 | 9/2012 | Reeder et al. |
| 8,262,741 B2 | 9/2012 | Estes |
| 8,263,045 B2 | 9/2012 | Dueva-Koganov |
| 8,267,101 B2 | 9/2012 | Beard |
| 8,268,931 B2 | 9/2012 | Tong |
| 8,269,946 B2 | 9/2012 | Kawai |
| 8,276,603 B2 | 10/2012 | Berklund |
| 8,279,063 B2 | 10/2012 | Wohltjen |
| 8,287,702 B2 | 10/2012 | Gomez |
| 8,293,669 B2 | 10/2012 | Kirkpatrick |
| 8,294,584 B2 | 10/2012 | Plost |
| 8,304,232 B2 | 11/2012 | Morgan |
| 8,316,866 B2 | 11/2012 | Freer |
| 8,317,993 B2 | 11/2012 | Kuriyama |
| 8,318,027 B2 | 11/2012 | McGuire |
| 8,318,188 B2 | 11/2012 | Man et al. |
| 8,330,359 B2 | 12/2012 | Yoshida et al. |
| 8,340,792 B2 | 12/2012 | Condurso et al. |
| 8,342,194 B2 | 1/2013 | Berner et al. |
| 8,343,341 B2 | 1/2013 | Davis |
| 8,343,359 B2 | 1/2013 | Daines |
| 8,343,437 B2 | 1/2013 | Patel |
| 8,350,706 B2 | 1/2013 | Wegelin et al. |
| 8,362,310 B2 | 1/2013 | Blessing |
| 8,366,920 B2 | 2/2013 | Davis |
| 8,367,007 B2 | 2/2013 | Otero |
| 8,367,025 B2 | 2/2013 | Comrie |
| 8,368,544 B2 | 2/2013 | Wildman et al. |
| 8,372,207 B1 | 2/2013 | Shields |
| 8,375,965 B2 | 2/2013 | Puri |
| 8,376,254 B2 | 2/2013 | Hatten |
| 8,377,279 B2 | 2/2013 | Jha |
| 8,384,877 B2 | 2/2013 | Kobayashi et al. |
| 8,388,731 B2 | 3/2013 | Metteer |
| 8,394,306 B2 | 3/2013 | Nishida et al. |
| 8,395,515 B2 | 3/2013 | Tokhtuev et al. |
| 8,409,334 B2 | 4/2013 | Audunson |
| 8,409,353 B2 | 4/2013 | Yokota |
| 8,414,748 B2 | 4/2013 | Carson |
| 8,425,857 B2 | 4/2013 | Glazer |
| 8,426,175 B2 | 4/2013 | Edwards |
| 8,440,154 B2 | 5/2013 | Fahs |
| 8,444,942 B2 | 5/2013 | Suchak |
| 8,445,381 B2 | 5/2013 | Ramkumar |
| 8,448,848 B2 | 5/2013 | Sahud |
| 8,449,690 B2 | 5/2013 | Jeong et al. |
| 8,449,777 B2 | 5/2013 | Bain |
| 8,450,925 B2 | 5/2013 | Seo |
| 8,454,754 B2 | 6/2013 | Shibata |
| 8,454,831 B2 | 6/2013 | Sauvignet |
| 8,459,277 B2 | 6/2013 | Varrin, Jr. et al. |
| 8,460,605 B2 | 6/2013 | Meilander |
| 8,461,055 B2 | 6/2013 | Radouane |
| 8,475,599 B2 | 7/2013 | Freer |
| 8,480,613 B2 | 7/2013 | Nakamura |
| 8,480,810 B2 | 7/2013 | Freer |
| 8,480,847 B2 | 7/2013 | Amano |
| 8,480,888 B2 | 7/2013 | Ashley |
| 8,482,406 B2 | 7/2013 | Snodgrass |
| 8,486,225 B2 | 7/2013 | Aono |
| 8,486,331 B2 | 7/2013 | Uhm |
| 8,487,774 B2 | 7/2013 | Reeder et al. |
| 8,492,327 B2 | 7/2013 | Singh et al. |
| 8,493,545 B2 | 7/2013 | Kawai |
| 8,496,759 B2 | 7/2013 | Heiligenmann et al. |
| 8,497,405 B1 | 7/2013 | Meilander |
| 8,502,680 B2 | 8/2013 | Tokhtuev |
| 8,505,477 B2 | 8/2013 | Makover |
| 8,506,724 B2 | 8/2013 | Kirkpatrick |
| 8,512,796 B2 | 8/2013 | Felts et al. |
| 8,518,269 B2 | 8/2013 | Fischmann T. |
| 8,518,634 B2 | 8/2013 | Yeh |
| 8,520,184 B2 | 8/2013 | Shiraishi |
| 8,522,799 B2 | 9/2013 | Freer |
| 8,522,801 B2 | 9/2013 | Freer |
| 8,525,666 B2 | 9/2013 | Melker et al. |
| 8,525,971 B2 | 9/2013 | Shiraishi |
| 8,563,647 B2 | 10/2013 | Jiang et al. |
| 8,564,759 B2 | 10/2013 | Chang et al. |
| 8,569,555 B2 | 10/2013 | Blessing |
| 8,571,708 B2 | 10/2013 | Rob |
| 8,572,826 B2 | 11/2013 | Bilgen et al. |
| 8,574,371 B2 | 11/2013 | Folz et al. |

(56) References Cited

U.S. PATENT DOCUMENTS

| | | |
|---|---|---|
| 8,574,502 B2 | 11/2013 | Uhm |
| 8,584,852 B2 | 11/2013 | Zucker |
| 8,587,437 B2 | 11/2013 | Kyle et al. |
| 8,591,660 B2 | 11/2013 | Silberberg et al. |
| 8,591,662 B2 | 11/2013 | Freer |
| 8,598,996 B2 | 12/2013 | Wildman et al. |
| 8,603,320 B2 | 12/2013 | Field |
| 8,609,120 B2 | 12/2013 | Heacox |
| 8,609,191 B2 | 12/2013 | Raetz |
| 8,618,219 B2 | 12/2013 | Jiang et al. |
| 8,623,808 B2 | 1/2014 | Singh et al. |
| 8,629,971 B2 | 1/2014 | Dierichs |
| 8,630,722 B2 | 1/2014 | Condurso et al. |
| 8,632,655 B2 | 1/2014 | Vehmaa |
| 8,632,656 B2 | 1/2014 | Vehmaa |
| 8,638,419 B2 | 1/2014 | Jansen |
| 8,646,121 B2 | 2/2014 | Nguyen |
| 8,652,404 B2 | 2/2014 | Glazer |
| 8,653,169 B2 | 2/2014 | Jiang et al. |
| 8,653,199 B2 | 2/2014 | Abhari et al. |
| 8,664,092 B2 | 3/2014 | Kawasaki |
| 8,667,817 B2 | 3/2014 | Smith |
| 8,670,103 B2 | 3/2014 | Hazelton |
| 8,670,104 B2 | 3/2014 | Hazelton |
| 8,671,959 B2 | 3/2014 | de Larios |
| 8,672,156 B2 | 3/2014 | Martinovic |
| 8,674,840 B2 | 3/2014 | Snodgrass |
| 8,679,999 B2 | 3/2014 | Kanagasabapathy |
| 8,685,446 B2 | 4/2014 | Moser |
| 8,696,873 B2 | 4/2014 | Karlstrom et al. |
| 8,698,998 B2 | 4/2014 | Nagasaka et al. |
| 8,703,006 B2 | 4/2014 | Basu |
| 8,703,605 B2 | 4/2014 | Yang |
| 8,704,997 B2 | 4/2014 | Shiraishi |
| 8,709,137 B2 | 4/2014 | Chan et al. |
| 8,716,210 B2 | 5/2014 | Freer |
| 8,719,999 B2 | 5/2014 | Field |
| 8,721,898 B2 | 5/2014 | McGuire |
| 8,722,565 B2 | 5/2014 | Mestl et al. |
| 8,725,526 B2 | 5/2014 | Cobbs et al. |
| 8,726,918 B2 | 5/2014 | Watanabe |
| 8,734,727 B2 | 5/2014 | Zimmerman |
| 8,734,741 B1 | 5/2014 | Suchak |
| 8,736,453 B2 | 5/2014 | Wilson et al. |
| 8,741,829 B2 | 6/2014 | Singh et al. |
| 8,742,932 B2 | 6/2014 | Casares |
| 8,747,178 B2 | 6/2014 | Seo |
| 8,753,449 B2 | 6/2014 | Chhabra |
| 8,753,518 B2 | 6/2014 | Brunsell |
| 8,753,520 B1 | 6/2014 | Fischmann |
| 8,758,621 B2 | 6/2014 | Zuback |
| 8,758,789 B2 | 6/2014 | Man et al. |
| 8,760,617 B2 | 6/2014 | Kobayashi et al. |
| 8,761,906 B2 | 6/2014 | Condurso et al. |
| 8,766,804 B2 | 7/2014 | Reeder et al. |
| 8,777,064 B2 | 7/2014 | Williams et al. |
| 8,784,669 B2 | 7/2014 | Bain |
| 8,784,762 B2 | 7/2014 | Moore |
| 8,795,620 B2 | 8/2014 | Moore |
| 8,808,550 B2 | 8/2014 | Dholakia |
| 8,808,809 B2 | 8/2014 | Makeover |
| 8,823,490 B2 | 9/2014 | Libbus et al. |
| 8,824,501 B2 | 9/2014 | Liu |
| 8,834,954 B2 | 9/2014 | Felts et al. |
| 8,841,545 B2 | 9/2014 | Wakayama |
| 8,844,324 B2 | 9/2014 | Tobi |
| 8,844,766 B2 | 9/2014 | Zaima et al. |
| 8,845,782 B2 | 9/2014 | Metteer |
| 8,845,976 B2 | 9/2014 | Beldring |
| 8,846,754 B2 | 9/2014 | Hulse |
| 8,852,437 B2 | 10/2014 | Zacharias |
| 8,862,196 B2 | 10/2014 | Lynn |
| 8,864,971 B2 | 10/2014 | Jha |
| 8,865,098 B2 | 10/2014 | Suchak |
| 8,872,665 B2 | 10/2014 | Snodgrass |
| 8,875,547 B2 | 11/2014 | Suzuki |
| 8,877,003 B2 | 11/2014 | Silberberg et al. |
| 8,883,083 B2 | 11/2014 | Law |
| 8,883,708 B2 | 11/2014 | Singh et al. |
| 8,888,902 B2 | 11/2014 | Galbraith |
| 8,889,253 B2 | 11/2014 | Kekicheff |
| 8,902,068 B2 | 12/2014 | Bechtel et al. |
| 8,904,846 B2 | 12/2014 | Mader et al. |
| 8,905,052 B2 | 12/2014 | Ulger et al. |
| 8,906,228 B2 | 12/2014 | O'Rear |
| 8,906,242 B2 | 12/2014 | McGuire |
| 8,911,755 B2 | 12/2014 | Curry |
| 8,911,783 B2 | 12/2014 | Giner |
| 8,919,743 B2 | 12/2014 | Osborn |
| 8,932,408 B2 | 1/2015 | Sellmer |
| 8,932,410 B2 | 1/2015 | Ulger et al. |
| 8,932,702 B2 | 1/2015 | Phillips et al. |
| 8,934,786 B2 | 1/2015 | Liu |
| 8,937,429 B2 | 1/2015 | Seo |
| 8,937,625 B2 | 1/2015 | Lee |
| 8,940,100 B2 | 1/2015 | Yoneda et al. |
| 8,940,101 B2 | 1/2015 | Jeong |
| 8,941,811 B2 | 1/2015 | Jansen |
| 8,945,310 B2 | 2/2015 | Zink et al. |
| 8,945,499 B2 | 2/2015 | Johnston et al. |
| 8,951,477 B2 | 2/2015 | Russell |
| 8,953,144 B2 | 2/2015 | Dierichs |
| 8,956,466 B2 | 2/2015 | Blaiss et al. |
| 8,957,159 B2 | 2/2015 | Jiang et al. |
| 8,958,468 B2 | 2/2015 | Servaes |
| 8,961,478 B2 | 2/2015 | Nakamura |
| 8,962,597 B2 | 2/2015 | Rieth et al. |
| 8,981,403 B2 | 3/2015 | Shatalov |
| 8,987,188 B2 | 3/2015 | Huboux et al. |
| 8,992,769 B2 | 3/2015 | O'Rear |
| 8,993,314 B2 | 3/2015 | Eckelberry |
| 8,999,072 B2 | 4/2015 | Varrin, Jr. et al. |
| 8,999,154 B2 | 4/2015 | McGuire |
| 8,999,173 B2 | 4/2015 | Schwartzel |
| 8,999,261 B2 | 4/2015 | Benedetto |
| 9,000,926 B2 | 4/2015 | Hollock et al. |
| 9,000,930 B2 | 4/2015 | Pelland et al. |
| 9,005,156 B2 | 4/2015 | Nakamura |
| 9,005,531 B2 | 4/2015 | Mole |
| 9,009,882 B2 | 4/2015 | Bucher |
| 9,011,682 B2 | 4/2015 | Volker |
| 9,011,787 B2 | 4/2015 | Dunkley et al. |
| 9,021,792 B2 | 5/2015 | Hosoya |
| 9,025,127 B2 | 5/2015 | Dierichs |
| 9,027,369 B2 | 5/2015 | Mueller |
| 9,027,795 B2 | 5/2015 | Zaima et al. |
| 9,028,695 B2 | 5/2015 | Noguchi et al. |
| 9,031,793 B2 | 5/2015 | Lynn et al. |
| 9,034,180 B2 | 5/2015 | McGuire |
| 9,034,183 B2 | 5/2015 | Davis |
| 9,043,019 B2 | 5/2015 | Eliuk |
| 9,051,193 B2 | 6/2015 | Fischmann T. |
| 9,051,404 B2 | 6/2015 | Jiang et al. |
| 9,060,667 B2 | 6/2015 | Jeong |
| 9,062,333 B2 | 6/2015 | Lehr |
| 9,069,887 B2 | 6/2015 | Gupta et al. |
| 9,073,762 B2 | 7/2015 | Cummins |
| 9,073,766 B2 | 7/2015 | Fahs |
| 9,074,286 B2 | 7/2015 | Mayer |
| 9,074,355 B2 | 7/2015 | Jallon |
| 9,085,842 B2 | 7/2015 | Ulger et al. |
| 9,089,811 B2 | 7/2015 | Vickery |
| 9,095,153 B2 | 8/2015 | Xu |
| 9,096,911 B2 | 8/2015 | Binder |
| 9,099,298 B2 | 8/2015 | Dobashi |
| 9,101,528 B2 | 8/2015 | Nakamura |
| 9,111,435 B2 | 8/2015 | Gips et al. |
| 9,114,183 B2 | 8/2015 | Campagna |
| 9,120,966 B2 | 9/2015 | Roccon |
| 9,123,233 B2 | 9/2015 | Hermann |
| 9,125,529 B2 | 9/2015 | Stine |
| 9,126,855 B2 | 9/2015 | Weist |
| 9,129,797 B2 | 9/2015 | Tokoshima |
| 9,131,826 B2 | 9/2015 | Heiligenmann |

(56) References Cited

U.S. PATENT DOCUMENTS

| | | |
|---|---|---|
| 9,133,109 B2 | 9/2015 | Antebi |
| 9,149,755 B2 | 10/2015 | Lee |
| 9,150,768 B2 | 10/2015 | Cook |
| 9,157,017 B2 | 10/2015 | Singh et al. |
| 9,169,146 B2 | 10/2015 | McGuire |
| 9,169,597 B2 | 10/2015 | Aharon |
| 9,174,845 B2 | 11/2015 | Lynn |
| 9,187,344 B2 | 11/2015 | Kolstad |
| 9,187,347 B2 | 11/2015 | Van Vliet |
| 9,188,385 B2 | 11/2015 | Armellin |
| 9,192,686 B2 | 11/2015 | Graydon |
| 9,193,614 B2 | 11/2015 | McGuffin |
| 9,220,800 B2 | 12/2015 | Shenberg |
| 9,221,114 B2 | 12/2015 | Chen et al. |
| 9,226,495 B2 | 1/2016 | Berentsveig et al. |
| 9,227,283 B2 | 1/2016 | Zhu |
| 9,227,852 B2 | 1/2016 | Robinson |
| 9,230,421 B2 | 1/2016 | Reeder et al. |
| 9,249,252 B2 | 2/2016 | Ngantung |
| 9,254,358 B2 | 2/2016 | Volker |
| 9,259,006 B2 | 2/2016 | Lemons |
| 9,260,327 B2 | 2/2016 | Merayo |
| 9,266,760 B2 | 2/2016 | Wang |
| 9,278,153 B1 | 3/2016 | Tsang |
| 9,278,204 B2 | 3/2016 | Nakamura |
| 9,283,418 B2 | 3/2016 | Brunsell |
| 9,287,800 B2 | 3/2016 | Hruska |
| 9,295,623 B2 | 3/2016 | Curry |
| 9,295,966 B1 | 3/2016 | Appelbaum |
| 9,296,551 B2 | 3/2016 | Klein et al. |
| 9,296,629 B2 | 3/2016 | Van Vliet |
| 9,297,085 B2 | 3/2016 | Kitaori |
| 9,300,400 B2 | 3/2016 | Liu |
| 9,301,910 B2 | 4/2016 | Yontz |
| 9,303,394 B2 | 4/2016 | Mock |
| 9,304,392 B2 | 4/2016 | Kobayashi et al. |
| 9,305,191 B2 | 4/2016 | Long et al. |
| 9,307,907 B2 | 4/2016 | Condurso et al. |
| 9,308,492 B2 | 4/2016 | Obee |
| 9,311,809 B2 | 4/2016 | Diaz |
| 9,321,665 B2 | 4/2016 | Kolstad |
| 9,334,183 B2 | 5/2016 | Fahs |
| 9,334,518 B2 | 5/2016 | Medoff |
| 9,340,438 B2 | 5/2016 | Linguist |
| 9,340,918 B2 | 5/2016 | Lv |
| 9,349,267 B2 | 5/2016 | Wildman et al. |
| 9,359,234 B2 | 6/2016 | Kirk |
| 9,362,504 B2 | 6/2016 | Lee |
| 9,365,439 B1 | 6/2016 | Guardino |
| 9,370,745 B2 | 6/2016 | Xu et al. |
| 9,371,228 B2 | 6/2016 | Golden |
| 9,373,242 B1 | 6/2016 | Conrad et al. |
| 9,375,500 B2 | 6/2016 | Dunkley et al. |
| 9,375,663 B2 | 6/2016 | Pett |
| 9,380,920 B2 | 7/2016 | Pollack |
| 9,382,500 B2 | 7/2016 | Huboux et al. |
| 9,392,815 B2 | 7/2016 | Russell |
| 9,394,189 B2 | 7/2016 | Buchanan |
| 9,396,638 B2 | 7/2016 | Wildman et al. |
| 9,403,122 B2 | 8/2016 | Geckeler |
| 9,427,728 B2 | 8/2016 | Sidheswaran |
| 9,440,188 B2 | 9/2016 | Suchak |
| 9,440,964 B2 | 9/2016 | Crouse et al. |
| 9,445,719 B2 | 9/2016 | Libbus et al. |
| 9,446,352 B2 | 9/2016 | Tomimatsu et al. |
| 9,447,505 B2 | 9/2016 | Mayer |
| 9,449,841 B2 | 9/2016 | Suen |
| 9,451,759 B2 | 9/2016 | Kuo |
| 9,451,765 B2 | 9/2016 | Cuer |
| 9,451,787 B2 | 9/2016 | Russell |
| 9,451,866 B2 | 9/2016 | Franco |
| 9,451,867 B2 | 9/2016 | Beshears |
| 9,456,602 B2 | 10/2016 | DeMattei et al. |
| 9,458,536 B2 | 10/2016 | Felts et al. |
| 9,464,334 B2 | 10/2016 | Medoff |
| 9,472,089 B2 | 10/2016 | Alhazme |
| 9,475,065 B2 | 10/2016 | Ilmasti |
| 9,486,817 B2 | 11/2016 | Patton |
| 9,487,913 B2 | 11/2016 | Urbini |
| 9,491,965 B2 | 11/2016 | Man et al. |
| 9,492,781 B2 | 11/2016 | Galbraith |
| 9,493,364 B2 | 11/2016 | Johnston et al. |
| 9,497,428 B2 | 11/2016 | Gaisser et al. |
| 9,498,762 B2 | 11/2016 | Carlberg |
| 9,511,161 B2 | 12/2016 | Matts et al. |
| 9,518,225 B2 | 12/2016 | Singh et al. |
| 9,518,749 B2 | 12/2016 | Kim |
| 9,522,348 B2 | 12/2016 | Lynn |
| 9,529,267 B2 | 12/2016 | Rho |
| 9,536,415 B2 | 1/2017 | De Luca et al. |
| 9,538,886 B2 | 1/2017 | Marin |
| 9,539,193 B2 | 1/2017 | Rieth et al. |
| 9,545,360 B2 | 1/2017 | Felts et al. |
| 9,549,886 B2 | 1/2017 | Yontz et al. |
| 9,553,004 B2 | 1/2017 | Takemura |
| 9,562,318 B2 | 2/2017 | Youn |
| 9,564,039 B2 | 2/2017 | Hermann |
| 9,572,526 B2 | 2/2017 | Felts et al. |
| 9,579,255 B2 | 2/2017 | Eliuk |
| 9,581,914 B2 | 2/2017 | Dierichs |
| 9,586,244 B2 | 3/2017 | Glazer |
| 9,586,810 B2 | 3/2017 | Fuhrmann et al. |
| 9,592,413 B2 | 3/2017 | Hulse |
| 9,605,223 B2 | 3/2017 | Beldring |
| 9,613,518 B2 | 4/2017 | Dunn et al. |
| 9,617,177 B2 | 4/2017 | Kolstad |
| 9,630,866 B2 | 4/2017 | Fritz |
| 9,631,129 B2 | 4/2017 | Thomas et al. |
| 9,640,059 B2 | 5/2017 | Hyland |
| 9,645,505 B2 | 5/2017 | Shiraishi |
| 9,649,712 B2 | 5/2017 | Chen et al. |
| 9,650,270 B2 | 5/2017 | Kolstad |
| 9,652,969 B2 | 5/2017 | Herzog |
| 9,666,061 B2 | 5/2017 | Reeder et al. |
| 9,670,081 B2 | 6/2017 | Lynn |
| 9,672,726 B2 | 6/2017 | Borke et al. |
| 9,679,464 B2 | 6/2017 | Marra et al. |
| 9,694,317 B2 | 7/2017 | Littleford |
| 9,695,363 B2 | 7/2017 | Singh et al. |
| 9,696,049 B2 | 7/2017 | Metteer |
| 9,700,195 B2 | 7/2017 | Padtberg et al. |
| 9,703,210 B2 | 7/2017 | Jansen |
| 9,708,537 B2 | 7/2017 | Singh et al. |
| 9,708,761 B2 | 7/2017 | Medoff |
| 9,715,817 B2 | 7/2017 | Wildman et al. |
| 9,731,368 B2 | 8/2017 | Chen et al. |
| 9,735,026 B2 | 8/2017 | Brown |
| 9,738,548 B2 | 8/2017 | Guardino |
| 9,741,233 B2 | 8/2017 | Laufer et al. |
| 9,745,211 B2 | 8/2017 | Davis |
| 9,758,411 B2 | 9/2017 | Simancas |
| 9,758,716 B2 | 9/2017 | Roccon |
| 9,759,673 B2 | 9/2017 | Rapoport |
| 9,782,053 B2 | 10/2017 | Gilreath |
| 10,947,138 B2 * | 3/2021 | Rosko ............... C02F 1/78 |
| 2001/0040133 A1 | 11/2001 | Wang |
| 2002/0011257 A1 | 1/2002 | BeGendt et al. |
| 2002/0014951 A1 | 2/2002 | Kramer et al. |
| 2002/0019709 A1 | 2/2002 | Segal |
| 2002/0023419 A1 | 2/2002 | Penth |
| 2002/0036673 A1 | 3/2002 | Miyoshi |
| 2002/0040867 A1 | 4/2002 | Conrad |
| 2002/0044059 A1 | 4/2002 | Reeder et al. |
| 2002/0045421 A1 | 4/2002 | Demerath |
| 2002/0048539 A1 | 4/2002 | Mackay |
| 2002/0056163 A1 | 5/2002 | Estes |
| 2002/0060189 A1 | 5/2002 | Conrad |
| 2002/0066464 A1 | 6/2002 | Bergman |
| 2002/0071795 A1 | 6/2002 | Jensen |
| 2002/0088478 A1 | 7/2002 | DeGendt et al. |
| 2002/0094363 A1 | 7/2002 | Traeder et al. |
| 2002/0103674 A1 | 8/2002 | Reeder et al. |
| 2002/0104271 A1 | 8/2002 | Gallant |
| 2002/0121482 A1 | 9/2002 | Ciampi et al. |

(56) References Cited

U.S. PATENT DOCUMENTS

| | | |
|---|---|---|
| 2002/0130091 A1 | 9/2002 | Ekberg et al. |
| 2002/0133886 A1 | 9/2002 | Severns et al. |
| 2002/0134736 A1 | 9/2002 | Burris et al. |
| 2002/0146357 A1 | 10/2002 | Yeh |
| 2002/0150678 A1 | 10/2002 | Cramer et al. |
| 2002/0151634 A1 | 10/2002 | Rohrbaugh et al. |
| 2002/0152556 A1 | 10/2002 | Ascione et al. |
| 2002/0155044 A1 | 10/2002 | Ciampi et al. |
| 2002/0157686 A1 | 10/2002 | Kenny |
| 2002/0160159 A1 | 10/2002 | McDonald et al. |
| 2002/0174483 A1 | 11/2002 | Gallant |
| 2002/0192366 A1 | 12/2002 | Cramer et al. |
| 2002/0195127 A1 | 12/2002 | Morioka |
| 2002/0195131 A1 | 12/2002 | Morioka et al. |
| 2003/0000522 A1 | 1/2003 | Lynn et al. |
| 2003/0009244 A1 | 1/2003 | Engleson et al. |
| 2003/0009825 A1 | 1/2003 | Gallant et al. |
| 2003/0009952 A1 | 1/2003 | Gallant et al. |
| 2003/0014817 A1 | 1/2003 | Gallant et al. |
| 2003/0019165 A1 | 1/2003 | Gallant et al. |
| 2003/0019536 A1 | 1/2003 | Smith |
| 2003/0025909 A1 | 2/2003 | Hallstadius |
| 2003/0046770 A1 | 3/2003 | Sanduja et al. |
| 2003/0071069 A1 | 4/2003 | Shelton |
| 2003/0080467 A1 | 5/2003 | Andrews et al. |
| 2003/0091749 A1 | 5/2003 | France et al. |
| 2003/0099584 A1 | 5/2003 | Diang |
| 2003/0108460 A1 | 6/2003 | Andreev et al. |
| 2003/0108648 A1 | 6/2003 | Ming et al. |
| 2003/0140947 A1 | 7/2003 | Han |
| 2003/0146169 A1 | 8/2003 | Ciampi et al. |
| 2003/0168764 A1 | 9/2003 | Nishida et al. |
| 2003/0170988 A1 | 9/2003 | Izumi |
| 2003/0182019 A1 | 9/2003 | Bonini et al. |
| 2003/0226751 A1 | 12/2003 | Kasten |
| 2003/0235996 A1 | 12/2003 | Leon et al. |
| 2004/0009271 A1 | 1/2004 | Davidson |
| 2004/0033930 A1 | 2/2004 | Thonhauser |
| 2004/0035448 A1 | 2/2004 | Aegerter |
| 2004/0037932 A1 | 2/2004 | Garwood |
| 2004/0052957 A1 | 3/2004 | Cramer et al. |
| 2004/0062697 A1 | 4/2004 | Mortson |
| 2004/0065623 A1 | 4/2004 | Lee |
| 2004/0072948 A1 | 4/2004 | Sanduja et al. |
| 2004/0073329 A1 | 4/2004 | Engelson et al. |
| 2004/0087665 A1 | 5/2004 | Aubert et al. |
| 2004/0089839 A1 | 5/2004 | Thomas et al. |
| 2004/0090333 A1 | 5/2004 | Wildman et al. |
| 2004/0114596 A1 | 6/2004 | Ha et al. |
| 2004/0119047 A1 | 6/2004 | Singh et al. |
| 2004/0121316 A1 | 6/2004 | Birkus et al. |
| 2004/0123489 A1 | 7/2004 | Pancheri |
| 2004/0123490 A1 | 7/2004 | Pancheri |
| 2004/0127383 A1 | 7/2004 | Pham et al. |
| 2004/0127614 A1 | 7/2004 | Jiang et al. |
| 2004/0129032 A1 | 7/2004 | Severns et al. |
| 2004/0138392 A1 | 7/2004 | Jiang et al. |
| 2004/0139555 A1 | 7/2004 | Conrad |
| 2004/0140269 A1 | 7/2004 | Chang |
| 2004/0143459 A1 | 7/2004 | Engleson et al. |
| 2004/0152583 A1 | 8/2004 | Grosch |
| 2004/0161508 A1 | 8/2004 | Traeder et al. |
| 2004/0192135 A1 | 9/2004 | Lee |
| 2004/0220320 A1 | 11/2004 | Abhari et al. |
| 2004/0220336 A1 | 11/2004 | Abhari et al. |
| 2004/0220359 A1 | 11/2004 | Abhari et al. |
| 2004/0226106 A1 | 11/2004 | Gardner et al. |
| 2004/0226581 A1 | 11/2004 | Gardner et al. |
| 2004/0231371 A1 | 11/2004 | Scheper et al. |
| 2004/0232253 A1 | 11/2004 | Hansen |
| 2004/0242862 A1 | 12/2004 | Hammes |
| 2004/0249046 A1 | 12/2004 | Abhari et al. |
| 2004/0256594 A1 | 12/2004 | Singh et al. |
| 2004/0259750 A1 | 12/2004 | DuVal |
| 2004/0265200 A1 | 12/2004 | Kim |
| 2005/0000911 A1 | 1/2005 | Thorpe |
| 2005/0005954 A1 | 1/2005 | Barani |
| 2005/0008555 A1 | 1/2005 | Hsieh et al. |
| 2005/0017380 A1 | 1/2005 | Namespetra et al. |
| 2005/0032391 A1 | 2/2005 | Peace |
| 2005/0034745 A1 | 2/2005 | Bergman |
| 2005/0035862 A1 | 2/2005 | Wildman et al. |
| 2005/0043196 A1 | 2/2005 | Wright |
| 2005/0050644 A1 | 3/2005 | Severns et al. |
| 2005/0065060 A1 | 3/2005 | Kin et al. |
| 2005/0071928 A1 | 4/2005 | Wright |
| 2005/0072446 A1 | 4/2005 | Bergman |
| 2005/0087554 A1 | 4/2005 | Shelton |
| 2005/0093182 A1 | 5/2005 | Morita |
| 2005/0103329 A1 | 5/2005 | Essig |
| 2005/0103722 A1 | 5/2005 | Freydina et al. |
| 2005/0107913 A1 | 5/2005 | Engleson et al. |
| 2005/0107914 A1 | 5/2005 | Engleson et al. |
| 2005/0113945 A1 | 5/2005 | Engleson et al. |
| 2005/0118436 A1 | 6/2005 | Bhangale |
| 2005/0119788 A1 | 6/2005 | Engleson et al. |
| 2005/0119914 A1 | 6/2005 | Batch |
| 2005/0129571 A1 | 6/2005 | Centanni |
| 2005/0135306 A1 | 6/2005 | McAllen et al. |
| 2005/0136397 A1 | 6/2005 | McDermott |
| 2005/0152991 A1 | 7/2005 | Man et al. |
| 2005/0161433 A1 | 7/2005 | Silberberg et al. |
| 2005/0167368 A1 | 8/2005 | Gehringer |
| 2005/0167369 A1 | 8/2005 | Robinson |
| 2005/0168341 A1 | 8/2005 | Reeder et al. |
| 2005/0176604 A1 | 8/2005 | Lee |
| 2005/0192197 A1 | 9/2005 | Man et al. |
| 2005/0197320 A1 | 9/2005 | Chen et al. |
| 2005/0199484 A1 | 9/2005 | Olstowski |
| 2005/0209197 A1 | 9/2005 | Arimilli et al. |
| 2005/0214182 A1 | 9/2005 | Lu |
| 2005/0215063 A1 | 9/2005 | Bergman |
| 2005/0217706 A1 | 10/2005 | Banerjee |
| 2005/0217707 A1 | 10/2005 | Aegerter |
| 2005/0233589 A1 | 10/2005 | Aegerter |
| 2005/0233931 A1 | 10/2005 | Singh et al. |
| 2005/0238812 A1 | 10/2005 | Bhangale |
| 2005/0241805 A1 | 11/2005 | Singh et al. |
| 2005/0245421 A1 | 11/2005 | Singh et al. |
| 2005/0247905 A1 | 11/2005 | Singh et al. |
| 2005/0268944 A1 | 12/2005 | Bexten |
| 2005/0269256 A1 | 12/2005 | Haq |
| 2005/0274393 A1 | 12/2005 | Perng |
| 2005/0279686 A1 | 12/2005 | Hsu |
| 2005/0288204 A1 | 12/2005 | Matts et al. |
| 2006/0019857 A1 | 1/2006 | Wilson et al. |
| 2006/0020067 A1 | 1/2006 | Brant et al. |
| 2006/0021923 A1 | 2/2006 | Lin |
| 2006/0022166 A1 | 2/2006 | Wilson et al. |
| 2006/0027507 A1 | 2/2006 | Van Leeuwen |
| 2006/0029699 A1 | 2/2006 | Garwood |
| 2006/0032012 A1 | 2/2006 | Buckner |
| 2006/0033071 A1 | 2/2006 | Wilson et al. |
| 2006/0033072 A1 | 2/2006 | Wilson et al. |
| 2006/0043026 A1 | 3/2006 | Law |
| 2006/0043330 A1 | 3/2006 | Wilson et al. |
| 2006/0043331 A1 | 3/2006 | Shankland et al. |
| 2006/0046499 A1 | 3/2006 | Dolechek |
| 2006/0047538 A1 | 3/2006 | Condurso et al. |
| 2006/0051259 A1 | 3/2006 | Chiu |
| 2006/0054568 A1 | 3/2006 | Jones |
| 2006/0060226 A1 | 3/2006 | Yoon |
| 2006/0071799 A1 | 4/2006 | Verdiramo |
| 2006/0077367 A1 | 4/2006 | Kobayashi et al. |
| 2006/0078661 A1 | 4/2006 | Wang |
| 2006/0083844 A1 | 4/2006 | Sherwood et al. |
| 2006/0053546 A1 | 5/2006 | Gloodt |
| 2006/0108293 A1 | 5/2006 | Brolin et al. |
| 2006/0115815 A1 | 6/2006 | Birkus et al. |
| 2006/0116310 A1 | 6/2006 | Singh et al. |
| 2006/0118132 A1 | 6/2006 | Bergman |
| 2006/0118143 A1 | 6/2006 | Jeong et al. |
| 2006/0128692 A1 | 6/2006 | Chen et al. |
| 2006/0130907 A1 | 6/2006 | Marty et al. |

(56) References Cited

U.S. PATENT DOCUMENTS

| | | |
|---|---|---|
| 2006/0130908 A1 | 6/2006 | Marty et al. |
| 2006/0132316 A1 | 6/2006 | Wildman et al. |
| 2006/0137723 A1 | 6/2006 | Bergman |
| 2006/0141157 A1 | 6/2006 | Sekimoto |
| 2006/0146445 A1 | 7/2006 | Nolan et al. |
| 2006/0147602 A1 | 7/2006 | Sherwood et al. |
| 2006/0148167 A1 | 7/2006 | Brown et al. |
| 2006/0151007 A1 | 7/2006 | Bergman |
| 2006/0155206 A1 | 7/2006 | Lynn |
| 2006/0159813 A1 | 7/2006 | Ming et al. |
| 2006/0160276 A1 | 7/2006 | Brown et al. |
| 2006/0162180 A1 | 7/2006 | Heilman |
| 2006/0163169 A1 | 7/2006 | Eckhardt |
| 2006/0177987 A1 | 8/2006 | Bergman |
| 2006/0180532 A1 | 8/2006 | Cummins |
| 2006/0186215 A1 | 8/2006 | Logan |
| 2006/0191828 A1 | 8/2006 | Cummins |
| 2006/0195041 A1 | 8/2006 | Lynn et al. |
| 2006/0220329 A1 | 10/2006 | Dolechek |
| 2006/0235324 A1 | 10/2006 | Lynn |
| 2006/0260647 A1 | 11/2006 | Verhaverbeke |
| 2006/0264343 A1 | 11/2006 | Verhaverbeke |
| 2006/0266683 A1 | 11/2006 | Sung |
| 2007/0010489 A1 | 1/2007 | Arimilli et al. |
| 2007/0010592 A1 | 1/2007 | Bowman et al. |
| 2007/0020378 A1 | 1/2007 | Shirade |
| 2007/0021566 A1 | 1/2007 | Tse et al. |
| 2007/0026693 A1 | 2/2007 | Yokota |
| 2007/0028975 A1 | 2/2007 | Herring et al. |
| 2007/0064210 A1 | 3/2007 | Kobayashi et al. |
| 2007/0064986 A1 | 3/2007 | Johnson |
| 2007/0084829 A1 | 4/2007 | Hanson |
| 2007/0091287 A1 | 4/2007 | Chang et al. |
| 2007/0094046 A1 | 4/2007 | Cobbs et al. |
| 2007/0101867 A1 | 5/2007 | Hunter |
| 2007/0102280 A1 | 5/2007 | Hunter |
| 2007/0108135 A1 | 5/2007 | Davis |
| 2007/0113418 A1 | 5/2007 | Palmer |
| 2007/0116800 A1 | 5/2007 | Prakash et al. |
| 2007/0116819 A1 | 5/2007 | Prakash et al. |
| 2007/0116820 A1 | 5/2007 | Prakash et al. |
| 2007/0116821 A1 | 5/2007 | Prakash et al. |
| 2007/0116822 A1 | 5/2007 | Prakash et al. |
| 2007/0116823 A1 | 5/2007 | Prakash et al. |
| 2007/0116824 A1 | 5/2007 | Prakash et al. |
| 2007/0116825 A1 | 5/2007 | Prakash et al. |
| 2007/0116826 A1 | 5/2007 | Prakash et al. |
| 2007/0116827 A1 | 5/2007 | Prakash et al. |
| 2007/0116828 A1 | 5/2007 | Prakash et al. |
| 2007/0116829 A1 | 5/2007 | Prakash et al. |
| 2007/0116830 A1 | 5/2007 | Prakash et al. |
| 2007/0116831 A1 | 5/2007 | Prakash et al. |
| 2007/0116832 A1 | 5/2007 | Prakash et al. |
| 2007/0116833 A1 | 5/2007 | Prakash et al. |
| 2007/0116834 A1 | 5/2007 | Prakash et al. |
| 2007/0116835 A1 | 5/2007 | Prakash et al. |
| 2007/0116836 A1 | 5/2007 | Prakash et al. |
| 2007/0116837 A1 | 5/2007 | Prakash et al. |
| 2007/0116838 A1 | 5/2007 | Prakash et al. |
| 2007/0116839 A1 | 5/2007 | Prakash et al. |
| 2007/0116840 A1 | 5/2007 | Prakash et al. |
| 2007/0116841 A1 | 5/2007 | Prakash et al. |
| 2007/0117365 A1 | 5/2007 | Kuriyama |
| 2007/0124177 A1 | 5/2007 | Engleson et al. |
| 2007/0125230 A1 | 6/2007 | Powell et al. |
| 2007/0131254 A1 | 6/2007 | Kin |
| 2007/0132968 A1 | 6/2007 | Kobayashi et al. |
| 2007/0134390 A1 | 6/2007 | Prakash et al. |
| 2007/0134391 A1 | 6/2007 | Prakash et al. |
| 2007/0141974 A1 | 6/2007 | McNaughton et al. |
| 2007/0144565 A1 | 6/2007 | Lynn |
| 2007/0148305 A1 | 6/2007 | Sherwood et al. |
| 2007/0148307 A1 | 6/2007 | Sherwood et al. |
| 2007/0154364 A1 | 7/2007 | Tseng |
| 2007/0154614 A1 | 7/2007 | Sherwood et al. |
| 2007/0169889 A1 | 7/2007 | Clark |
| 2007/0171390 A1 | 7/2007 | Hazelton |
| 2007/0178214 A1 | 8/2007 | Sherwood et al. |
| 2007/0186367 A1 | 8/2007 | Field et al. |
| 2007/0186368 A1 | 8/2007 | Field et al. |
| 2007/0186369 A1 | 8/2007 | Field et al. |
| 2007/0186954 A1 | 8/2007 | Field et al. |
| 2007/0186957 A1 | 8/2007 | Field et al. |
| 2007/0186958 A1 | 8/2007 | Field et al. |
| 2007/0187261 A1 | 8/2007 | Field et al. |
| 2007/0187262 A1 | 8/2007 | Field et al. |
| 2007/0187263 A1 | 8/2007 | Field et al. |
| 2007/0189949 A1 | 8/2007 | Hsieh et al. |
| 2007/0190469 A1 | 8/2007 | Clark |
| 2007/0190523 A1 | 8/2007 | Birkus et al. |
| 2007/0207923 A1 | 9/2007 | Lu |
| 2007/0207941 A1 | 9/2007 | Thonhauser |
| 2007/0210111 A1 | 9/2007 | Davis |
| 2007/0222599 A1 | 9/2007 | Coveley et al. |
| 2007/0235065 A1 | 10/2007 | Lin |
| 2007/0242247 A1 | 10/2007 | Shiraishi |
| 2007/0246564 A1 | 10/2007 | Rodenbeck et al. |
| 2007/0247316 A1 | 10/2007 | Wildman et al. |
| 2007/0247600 A1 | 10/2007 | Kobayashi et al. |
| 2007/0247601 A1 | 10/2007 | Hazelton |
| 2007/0251549 A1 | 11/2007 | Heiligenmann et al. |
| 2007/0253860 A1 | 11/2007 | Schroder |
| 2007/0253861 A1 | 11/2007 | Naka |
| 2007/0258072 A1 | 11/2007 | Nagasaka et al. |
| 2007/0264175 A1 | 11/2007 | Iversen |
| 2007/0264296 A1 | 11/2007 | Myntti |
| 2007/0264310 A1 | 11/2007 | Hissong et al. |
| 2007/0264342 A1 | 11/2007 | Oliver et al. |
| 2007/0264353 A1 | 11/2007 | Myntti et al. |
| 2007/0267334 A1 | 11/2007 | Osborn |
| 2007/0290177 A1 | 12/2007 | Singh et al. |
| 2007/0291239 A1 | 12/2007 | Shiraishi |
| 2007/0292559 A1 | 12/2007 | Garwood |
| 2007/0293640 A1 | 12/2007 | Jiang et al. |
| 2008/0001763 A1 | 1/2008 | Raja et al. |
| 2008/0002164 A1 | 1/2008 | Chang et al. |
| 2008/0014113 A1 | 1/2008 | Centanni |
| 2008/0017590 A1 | 1/2008 | Suchak et al. |
| 2008/0017613 A1 | 1/2008 | Nogami et al. |
| 2008/0021779 A1 | 1/2008 | Lynn et al. |
| 2008/0023411 A1 | 1/2008 | Liou |
| 2008/0030695 A1 | 2/2008 | Kobayashi et al. |
| 2008/0030696 A1 | 2/2008 | Kobayashi et al. |
| 2008/0035580 A1 | 2/2008 | de Rijk |
| 2008/0039176 A1 | 2/2008 | Okada |
| 2008/0050498 A1 | 2/2008 | Sherwood et al. |
| 2008/0066739 A1 | 3/2008 | LeMahieu |
| 2008/0066741 A1 | 3/2008 | LeMahieu |
| 2008/0067078 A1 | 3/2008 | Kitaori et al. |
| 2008/0073324 A1 | 3/2008 | Nogami |
| 2008/0078382 A1 | 4/2008 | LeMahieu |
| 2008/0081868 A1 | 4/2008 | Jiang et al. |
| 2008/0081878 A1 | 4/2008 | Jiang et al. |
| 2008/0087719 A1 | 4/2008 | Sahud |
| 2008/0093277 A1 | 4/2008 | Armour |
| 2008/0105764 A1 | 5/2008 | Jianglin et al. |
| 2008/0108710 A1 | 5/2008 | Prakash et al. |
| 2008/0121837 A1 | 5/2008 | Singh et al. |
| 2008/0142010 A1 | 6/2008 | Weaver |
| 2008/0157022 A1 | 7/2008 | Singh |
| 2008/0169290 A1 | 7/2008 | Mangiardi |
| 2008/0175777 A1 | 7/2008 | Suchak et al. |
| 2008/0179242 A1 | 7/2008 | Mukhopadhyay |
| 2008/0181832 A1 | 7/2008 | Shiue et al. |
| 2008/0189872 A9 | 8/2008 | Wright |
| 2008/0192483 A1 | 8/2008 | Mangiardi |
| 2008/0196156 A1 | 8/2008 | Brewin |
| 2008/0196334 A1 | 8/2008 | Mangiardi |
| 2008/0202994 A1 | 8/2008 | Hsu et al. |
| 2008/0203195 A1 | 8/2008 | Schmitt |
| 2008/0206415 A1 | 8/2008 | Sherwood |
| 2008/0209665 A1 | 9/2008 | Mangiardi |
| 2008/0210572 A1 | 9/2008 | Field |
| 2008/0212337 A1 | 9/2008 | Mangiardi |

(56) References Cited

U.S. PATENT DOCUMENTS

| | | |
|---|---|---|
| 2008/0214006 A1 | 9/2008 | Lee |
| 2008/0216241 A1 | 9/2008 | Davidson et al. |
| 2008/0216875 A1 | 9/2008 | Sharrock et al. |
| 2008/0225249 A1 | 9/2008 | Kobayashi et al. |
| 2008/0225250 A1 | 9/2008 | Kobayashi et al. |
| 2008/0230484 A1 | 9/2008 | Burnham et al. |
| 2008/0231825 A1 | 9/2008 | Kobayashi et al. |
| 2008/0236622 A1 | 10/2008 | Kim |
| 2008/0239260 A1 | 10/2008 | Shiraishi |
| 2008/0245092 A1 | 10/2008 | Forsberg |
| 2008/0245390 A1 | 10/2008 | Freer |
| 2008/0246599 A1 | 10/2008 | Hufton et al. |
| 2008/0251373 A1 | 10/2008 | Oke |
| 2008/0252865 A1 | 10/2008 | Nagasaka et al. |
| 2008/0260922 A1 | 10/2008 | Kirkpatrick et al. |
| 2008/0267840 A1 | 10/2008 | Yeh |
| 2008/0271238 A1 | 11/2008 | Reeder et al. |
| 2008/0287924 A1 | 11/2008 | Mangiardi |
| 2008/0296228 A1 | 12/2008 | Sauvignet et al. |
| 2008/0303658 A1 | 12/2008 | Melker et al. |
| 2008/0308763 A1 | 12/2008 | Singh et al. |
| 2008/0312125 A1 | 12/2008 | Kin et al. |
| 2008/0313799 A1 | 12/2008 | Nguyen |
| 2009/0011222 A1 | 1/2009 | Xiu |
| 2009/0017272 A1 | 1/2009 | Phillips et al. |
| 2009/0020016 A1 | 1/2009 | Christophersen |
| 2009/0026143 A1 | 1/2009 | Matsumura |
| 2009/0039032 A1 | 2/2009 | Patera et al. |
| 2009/0039176 A1 | 2/2009 | Davidson et al. |
| 2009/0069475 A1 | 3/2009 | Jiang et al. |
| 2009/0071507 A1 | 3/2009 | Buschhardt |
| 2009/0081311 A1 | 3/2009 | Man et al. |
| 2009/0081317 A1 | 3/2009 | McNaughton et al. |
| 2009/0092556 A1 | 4/2009 | Singh et al. |
| 2009/0096615 A1 | 4/2009 | Reeder et al. |
| 2009/0099503 A1 | 4/2009 | Mitsuda |
| 2009/0110594 A1 | 4/2009 | Shin |
| 2009/0113619 A1 | 5/2009 | Tichenor et al. |
| 2009/0114605 A1 | 5/2009 | Salama et al. |
| 2009/0120473 A1 | 5/2009 | Lynn |
| 2009/0126763 A1 | 5/2009 | Park |
| 2009/0127128 A1 | 5/2009 | Kitaori |
| 2009/0133713 A1 | 5/2009 | Ohmi |
| 2009/0145463 A1 | 6/2009 | Oh |
| 2009/0149604 A1 | 6/2009 | Abhari et al. |
| 2009/0170852 A1 | 7/2009 | Choi |
| 2009/0189759 A1 | 7/2009 | Wildman et al. |
| 2009/0192231 A1 | 7/2009 | Lemons |
| 2009/0199872 A1 | 8/2009 | Kirkpatrick |
| 2009/0202396 A1 | 8/2009 | Long |
| 2009/0202661 A1 | 8/2009 | Kirkpatrick |
| 2009/0215658 A1 | 8/2009 | Minsek et al. |
| 2009/0218281 A1 | 9/2009 | Sauvignet |
| 2009/0223904 A1 | 9/2009 | Tanny |
| 2009/0225286 A1 | 9/2009 | Nagasaka et al. |
| 2009/0241807 A1 | 10/2009 | George et al. |
| 2009/0255299 A1 | 10/2009 | Hiro |
| 2009/0258086 A1 | 10/2009 | Myntti |
| 2009/0258160 A1 | 10/2009 | Kumazawa |
| 2009/0263548 A1 | 10/2009 | Sjoholm |
| 2009/0266383 A1 | 10/2009 | Wang |
| 2009/0269240 A1 | 10/2009 | Tanaka |
| 2009/0272999 A1 | 11/2009 | Yoshida et al. |
| 2009/0273103 A1 | 11/2009 | Watanabe |
| 2009/0278076 A1 | 11/2009 | Singh et al. |
| 2009/0283110 A1 | 11/2009 | Yoneda et al. |
| 2009/0284146 A1 | 11/2009 | Yoshida et al. |
| 2009/0285764 A1 | 11/2009 | Singh et al. |
| 2009/0301395 A1 | 12/2009 | Sekimoto |
| 2009/0301951 A1 | 12/2009 | Armour |
| 2009/0321365 A1 | 12/2009 | Eriksson |
| 2010/0001418 A1 | 1/2010 | Hirakui |
| 2010/0010422 A1 | 1/2010 | Watanabe |
| 2010/0018927 A1 | 1/2010 | Poole |
| 2010/0021513 A1 | 1/2010 | Garois |
| 2010/0021598 A1 | 1/2010 | Lynn |
| 2010/0029829 A9 | 2/2010 | Jiang et al. |
| 2010/0029851 A9 | 2/2010 | Jiang et al. |
| 2010/0056773 A1 | 3/2010 | Chandrasekhar |
| 2010/0065530 A1 | 3/2010 | Walker |
| 2010/0068109 A1 | 3/2010 | Comrie |
| 2010/0076128 A1 | 3/2010 | Abhari et al. |
| 2010/0012157 A1 | 4/2010 | Sellmer |
| 2010/0095715 A1 | 4/2010 | Ulger et al. |
| 2010/0100242 A1 | 4/2010 | Frank |
| 2010/0104988 A1 | 4/2010 | Hayasaki |
| 2010/0112677 A1 | 5/2010 | Onishi |
| 2010/0116369 A1 | 5/2010 | Lautzenheiser et al. |
| 2010/0117836 A1 | 5/2010 | Seyed Momen et al. |
| 2010/0119427 A1 | 5/2010 | Suchak |
| 2010/0119670 A1 | 5/2010 | Mazzariello |
| 2010/0127209 A1 | 5/2010 | Singh et al. |
| 2010/0134772 A1 | 6/2010 | Nagasaka et al. |
| 2010/0139691 A1 | 6/2010 | Silberberg et al. |
| 2010/0139709 A1 | 6/2010 | Saefkow et al. |
| 2010/0139779 A1 | 6/2010 | Lautzenheiser et al. |
| 2010/0139864 A1 | 6/2010 | Silberberg et al. |
| 2010/0143201 A1 | 6/2010 | Long |
| 2010/0155416 A1 | 6/2010 | Johnson |
| 2010/0164728 A1 | 7/2010 | Plost |
| 2010/0167973 A1 | 7/2010 | Thonhauser et al. |
| 2010/0170570 A1 | 7/2010 | Rodenbeck et al. |
| 2010/0179268 A9 | 7/2010 | Jiang et al. |
| 2010/0181260 A1 | 7/2010 | Vroom |
| 2010/0188228 A1 | 7/2010 | Hyland |
| 2010/0192987 A1 | 8/2010 | Steffen |
| 2010/0193977 A1 | 8/2010 | Yamamoto et al. |
| 2010/0195068 A1 | 8/2010 | Shibazaki |
| 2010/0209313 A1 | 8/2010 | Davis |
| 2010/0223944 A1 | 9/2010 | Tsujimoto |
| 2010/0224215 A1 | 9/2010 | Mertens |
| 2010/0224495 A1 | 9/2010 | McGuire |
| 2010/0231385 A1 | 9/2010 | Melker et al. |
| 2010/0236269 A1 | 9/2010 | Mamemoto |
| 2010/0243580 A1 | 9/2010 | Lobban |
| 2010/0252415 A1 | 10/2010 | Lynn |
| 2010/0258142 A1 | 10/2010 | Kawaguchi |
| 2010/0262430 A1 | 10/2010 | Gips et al. |
| 2010/0265059 A1 | 10/2010 | Melker et al. |
| 2010/0266445 A1 | 10/2010 | Campagna |
| 2010/0282773 A1 | 11/2010 | Lynn |
| 2010/0298738 A1 | 11/2010 | Felts et al. |
| 2010/0308037 A1 | 12/2010 | Mangiardi |
| 2010/0311573 A1 | 12/2010 | Mestl et al. |
| 2010/0315243 A1 | 12/2010 | Tokhtuev et al. |
| 2010/0315244 A1 | 12/2010 | Tokhtuev et al. |
| 2010/0326476 A1 | 12/2010 | Rho |
| 2010/0328076 A1 | 12/2010 | Kyle et al. |
| 2010/0332022 A1 | 12/2010 | Wegelin et al. |
| 2011/0011886 A1 | 1/2011 | Zaima et al. |
| 2011/0016643 A1 | 1/2011 | DuVal |
| 2011/0030823 A1 | 2/2011 | Seal et al. |
| 2011/0036761 A1 | 2/2011 | Chen et al. |
| 2011/0037016 A1 | 2/2011 | Singh et al. |
| 2011/0046921 A1 | 2/2011 | Sahud |
| 2011/0048038 A1 | 3/2011 | Merritt |
| 2011/0048452 A1 | 3/2011 | Zink et al. |
| 2011/0060257 A1 | 3/2011 | Nakamura |
| 2011/0067730 A1 | 3/2011 | Folz et al. |
| 2011/0068060 A1 | 3/2011 | Hatten |
| 2011/0068930 A1 | 3/2011 | Wildman et al. |
| 2011/0074585 A1 | 3/2011 | Harmon et al. |
| 2011/0075119 A1 | 3/2011 | Ito |
| 2011/0075507 A1 | 3/2011 | Wootan |
| 2011/0076190 A1 | 3/2011 | Tanaka |
| 2011/0079519 A1 | 4/2011 | Widler et al. |
| 2011/0081299 A1 | 4/2011 | Thonhauser |
| 2011/0132749 A1 | 6/2011 | Field |
| 2011/0135548 A1 | 6/2011 | Comrie |
| 2011/0135847 A1 | 6/2011 | Phillips et al. |
| 2011/0136882 A1 | 6/2011 | McNaughton et al. |
| 2011/0140596 A1 | 6/2011 | Yoshida et al. |
| 2011/0150625 A1 | 6/2011 | Enkhbold |
| 2011/0152995 A1 | 6/2011 | Mader et al. |

(56) References Cited

U.S. PATENT DOCUMENTS

| | | |
|---|---|---|
| 2011/0174222 A1 | 7/2011 | Lee |
| 2011/0175351 A1 | 7/2011 | Baarman et al. |
| 2011/0178590 A1 | 7/2011 | Zucker |
| 2011/0186095 A1 | 8/2011 | Kim |
| 2011/0203620 A1 | 8/2011 | Ulger et al. |
| 2011/0207300 A1 | 8/2011 | Brown et al. |
| 2011/0208539 A1 | 8/2011 | Lynn |
| 2011/0209730 A1 | 9/2011 | Varrin, Jr. et al. |
| 2011/0212018 A1 | 9/2011 | Otero |
| 2011/0226292 A1 | 9/2011 | Ulger et al. |
| 2011/0227740 A1 | 9/2011 | Wohltjen |
| 2011/0252899 A1 | 10/2011 | Felts et al. |
| 2011/0256027 A1 | 10/2011 | Chen et al. |
| 2011/0274634 A1 | 11/2011 | Rieth et al. |
| 2011/0274643 A1 | 11/2011 | Yontz |
| 2011/0284476 A1 | 11/2011 | Otero |
| 2011/0289748 A1 | 12/2011 | Singh et al. |
| 2011/0291840 A1 | 12/2011 | Pelland et al. |
| 2011/0291841 A1 | 12/2011 | Hollock et al. |
| 2011/0297696 A1 | 12/2011 | Casares |
| 2011/0298376 A1 | 12/2011 | Kanegae |
| 2011/0300083 A1 | 12/2011 | Yontz et al. |
| 2011/0303247 A1 | 12/2011 | Varrin, Jr. et al. |
| 2012/0012134 A1 | 1/2012 | Tsukamoto |
| 2012/0013465 A1 | 1/2012 | Reeder et al. |
| 2012/0013470 A1 | 1/2012 | Lynn |
| 2012/0016215 A1 | 1/2012 | Condurso et al. |
| 2012/0018386 A1 | 1/2012 | McGuire |
| 2012/0024794 A1 | 2/2012 | Fischmann T. |
| 2012/0031838 A1 | 2/2012 | Noguchi et al. |
| 2012/0055986 A1 | 3/2012 | Sahud |
| 2012/0067738 A1 | 3/2012 | Field |
| 2012/0077877 A1 | 3/2012 | Man et al. |
| 2012/0080451 A1 | 4/2012 | Williams et al. |
| 2012/0091888 A1 | 4/2012 | Yoshida et al. |
| 2012/0094881 A1 | 4/2012 | Thonhauser et al. |
| 2012/0095157 A1 | 4/2012 | Jiang et al. |
| 2012/0096768 A1 | 4/2012 | Johnson |
| 2012/0097201 A1 | 4/2012 | Field |
| 2012/0100701 A1 | 4/2012 | Kawasaki |
| 2012/0108917 A1 | 5/2012 | Libbus et al. |
| 2012/0121488 A1 | 5/2012 | Comrie |
| 2012/0138155 A1 | 6/2012 | Brensing et al. |
| 2012/0142575 A1 | 6/2012 | Lynn |
| 2012/0160660 A1 | 6/2012 | Karlstrom et al. |
| 2012/0167926 A1 | 7/2012 | Nakamura |
| 2012/0167997 A1 | 7/2012 | Brensing et al. |
| 2012/0177803 A1 | 7/2012 | Xu |
| 2012/0179491 A1 | 7/2012 | Liu et al. |
| 2012/0187331 A1 | 7/2012 | Singh et al. |
| 2012/0194338 A1 | 8/2012 | Snodgrass |
| 2012/0198870 A1 | 8/2012 | Erbs |
| 2012/0204594 A1 | 8/2012 | Singh et al. |
| 2012/0205301 A1 | 8/2012 | McGuire |
| 2012/0207664 A1 | 8/2012 | Moore |
| 2012/0207665 A1 | 8/2012 | Moore |
| 2012/0208375 A1 | 8/2012 | Ohmi |
| 2012/0216828 A1 | 8/2012 | Tanaka |
| 2012/0218106 A1 | 8/2012 | Zaima et al. |
| 2012/0225171 A1 | 9/2012 | Garwood |
| 2012/0227586 A1 | 9/2012 | Chan et al. |
| 2012/0228149 A1 | 9/2012 | Boal |
| 2012/0230880 A1 | 9/2012 | Dunkley et al. |
| 2012/0240964 A1 | 9/2012 | Kirkpatrick |
| 2012/0251681 A1 | 10/2012 | Zacharias |
| 2012/0263800 A1 | 10/2012 | Berentsveig et al. |
| 2012/0267295 A1 | 10/2012 | Kim |
| 2012/0279498 A1 | 11/2012 | Nakamura |
| 2012/0285825 A1 | 11/2012 | Benedetto |
| 2012/0303385 A1 | 11/2012 | Darling |
| 2012/0319836 A1 | 12/2012 | Reeder et al. |
| 2012/0330118 A1 | 12/2012 | Lynn et al. |
| 2013/0008870 A1 | 1/2013 | Nogami et al. |
| 2013/0011303 A1 | 1/2013 | Shim |
| 2013/0011520 A1 | 1/2013 | Wang |
| 2013/0014362 A1 | 1/2013 | Bilgen et al. |
| 2013/0019348 A1 | 1/2013 | Crouse et al. |
| 2013/0025714 A1 | 1/2013 | Hermann |
| 2013/0031872 A1 | 2/2013 | Blaiss et al. |
| 2013/0034966 A1 | 2/2013 | Yeh |
| 2013/0041241 A1 | 2/2013 | Felts et al. |
| 2013/0047655 A1 | 2/2013 | White |
| 2013/0061884 A1 | 3/2013 | Yang |
| 2013/0068260 A1 | 3/2013 | Yamakawa |
| 2013/0068701 A1 | 3/2013 | Bain |
| 2013/0070786 A1 | 3/2013 | Liu |
| 2013/0089677 A1 | 4/2013 | Makover |
| 2013/0096444 A1 | 4/2013 | Condurso et al. |
| 2013/0120120 A1 | 5/2013 | Long et al. |
| 2013/0120142 A1 | 5/2013 | Wildman et al. |
| 2013/0121892 A1 | 5/2013 | Furhmann et al. |
| 2013/0130331 A1 | 5/2013 | Binder |
| 2013/0136669 A1 | 5/2013 | Feldain |
| 2013/0140242 A1 | 6/2013 | De Oliveira |
| 2013/0150531 A1 | 6/2013 | Abhari et al. |
| 2013/0169945 A1 | 7/2013 | Kobayashi et al. |
| 2013/0172417 A1 | 7/2013 | Man et al. |
| 2013/0186465 A1 | 7/2013 | Zhou |
| 2013/0204433 A1 | 8/2013 | Gupta et al. |
| 2013/0213899 A1 | 8/2013 | Fahs |
| 2013/0216432 A1 | 8/2013 | Lemons |
| 2013/0217784 A1 | 8/2013 | Singh et al. |
| 2013/0228176 A1 | 9/2013 | Nakamura |
| 2013/0233357 A1 | 9/2013 | Minamihonoki |
| 2013/0240344 A1 | 9/2013 | Johnson |
| 2013/0244320 A1 | 9/2013 | Morgan |
| 2013/0247835 A1 | 9/2013 | Liimatta |
| 2013/0260058 A1 | 10/2013 | Brown et al. |
| 2013/0269518 A1 | 10/2013 | Ilmasti |
| 2013/0269733 A1 | 10/2013 | Chakrabortty |
| 2013/0284217 A1 | 10/2013 | Freer |
| 2013/0284219 A1 | 10/2013 | Yoneda et al. |
| 2013/0285814 A1 | 10/2013 | Snodgrass |
| 2013/0287637 A1 | 10/2013 | Vickery |
| 2013/0288947 A1 | 10/2013 | Huboux et al. |
| 2013/0291632 A1 | 11/2013 | Felts et al. |
| 2013/0300558 A1 | 11/2013 | Reeder et al. |
| 2013/0306532 A1 | 11/2013 | Fischmann T. |
| 2013/0306573 A1 | 11/2013 | Appelbaum |
| 2013/0335717 A1 | 12/2013 | Shiraishi |
| 2013/0337226 A1 | 12/2013 | Curran et al. |
| 2013/0344201 A1 | 12/2013 | Sherwood |
| 2014/0017364 A1 | 1/2014 | Liimatta |
| 2014/0022079 A1 | 1/2014 | Wilson |
| 2014/0034088 A1 | 2/2014 | Padtberg et al. |
| 2014/0035744 A1 | 2/2014 | Wildman et al. |
| 2014/0048719 A1 | 2/2014 | Johnson |
| 2014/0059789 A1 | 3/2014 | Freer |
| 2014/0066567 A1 | 3/2014 | Jiang et al. |
| 2014/0070950 A1 | 3/2014 | Snodgrass |
| 2014/0077124 A1 | 3/2014 | Singh et al. |
| 2014/0080974 A1 | 3/2014 | Jiang et al. |
| 2014/0081654 A1 | 3/2014 | Bechtel et al. |
| 2014/0088014 A1 | 3/2014 | Nishio |
| 2014/0090606 A1 | 4/2014 | Heacox |
| 2014/0100516 A1 | 4/2014 | Hunt |
| 2014/0100868 A1 | 4/2014 | Condurso et al. |
| 2014/0107242 A1 | 4/2014 | Singh et al. |
| 2014/0108041 A1 | 4/2014 | Bechtel et al. |
| 2014/0121316 A1 | 5/2014 | Monsallier et al. |
| 2014/0127107 A1 | 5/2014 | Suchak |
| 2014/0140913 A1 | 5/2014 | Suchak |
| 2014/0158167 A1 | 6/2014 | de Larios |
| 2014/0166588 A1 | 6/2014 | Fischmann |
| 2014/0178312 A1 | 6/2014 | Basu |
| 2014/0191019 A1 | 7/2014 | Chen et al. |
| 2014/0202182 A1 | 7/2014 | Singh et al. |
| 2014/0212334 A1 | 7/2014 | Klein et al. |
| 2014/0213845 A1 | 7/2014 | Bechtel et al. |
| 2014/0216075 A1 | 8/2014 | Singh et al. |
| 2014/0216499 A1 | 8/2014 | Li |
| 2014/0227405 A1 | 8/2014 | Beland |
| 2014/0286831 A1 | 9/2014 | Moore |
| 2014/0292518 A1 | 10/2014 | Wildman et al. |

(56) References Cited

U.S. PATENT DOCUMENTS

| | | |
|---|---|---|
| 2014/0293249 A1 | 10/2014 | Kobayashi et al. |
| 2014/0294744 A1 | 10/2014 | Rieth et al. |
| 2014/0295053 A1 | 10/2014 | Felts et al. |
| 2014/0296350 A1 | 10/2014 | DeMattei et al. |
| 2014/0297313 A1 | 10/2014 | Condurso et al. |
| 2014/0297327 A1 | 10/2014 | Heil et al. |
| 2014/0299552 A1 | 10/2014 | Stewart |
| 2014/0320290 A1 | 10/2014 | Reeder et al. |
| 2014/0320291 A1 | 10/2014 | De Luca et al. |
| 2014/0322089 A1 | 10/2014 | Moore |
| 2014/0322096 A1 | 10/2014 | Pelfrey |
| 2014/0322407 A1 | 10/2014 | Man et al. |
| 2014/0327545 A1 | 11/2014 | Bolling et al. |
| 2014/0329223 A1 | 11/2014 | Morgan |
| 2014/0347185 A1 | 11/2014 | Smith et al. |
| 2014/0353256 A1 | 12/2014 | Kaschek |
| 2014/0354436 A1 | 12/2014 | Nix et al. |
| 2014/0361897 A1 | 12/2014 | Smith et al. |
| 2014/0367417 A1 | 12/2014 | Zaima et al. |
| 2014/0375457 A1 | 12/2014 | Diaz |
| 2015/0000704 A1 | 1/2015 | Yeh |
| 2015/0015417 A1 | 1/2015 | Libbus et al. |
| 2015/0017059 A1 | 1/2015 | Arlemark |
| 2015/0017432 A1 | 1/2015 | Shoseyov |
| 2015/0022361 A1 | 1/2015 | Gaisser et al. |
| 2015/0033295 A1 | 1/2015 | Huster |
| 2015/0044116 A1 | 2/2015 | Suschak |
| 2015/0048160 A1 | 2/2015 | Graydon |
| 2015/0057635 A1 | 2/2015 | Bechtel et al. |
| 2015/0059085 A1 | 3/2015 | Seibt |
| 2015/0064124 A1 | 3/2015 | Yontz et al. |
| 2015/0081335 A1 | 3/2015 | Dixon et al. |
| 2015/0099008 A1 | 4/2015 | Curry |
| 2015/0111284 A1 | 4/2015 | Urbini |
| 2015/0114819 A1 | 4/2015 | Denton |
| 2015/0121628 A1 | 5/2015 | McCullough |
| 2015/0125212 A1 | 5/2015 | Fischmann |
| 2015/0126941 A1 | 5/2015 | Felts et al. |
| 2015/0127365 A1 | 5/2015 | Rizvi et al. |
| 2015/0128993 A1 | 5/2015 | Berg et al. |
| 2015/0136346 A1 | 5/2015 | Bogren |
| 2015/0136666 A1 | 5/2015 | Zamir |
| 2015/0136709 A1 | 5/2015 | Kolstad |
| 2015/0140621 A1 | 5/2015 | Herrema |
| 2015/0144831 A1 | 5/2015 | Mennell |
| 2015/0152352 A1 | 6/2015 | Huboux et al. |
| 2015/0157754 A1 | 6/2015 | Rutter |
| 2015/0158055 A1 | 6/2015 | Kirkpatrick |
| 2015/0182649 A1 | 7/2015 | Dunkley et al. |
| 2015/0183673 A1 | 7/2015 | Musale |
| 2015/0194043 A1 | 7/2015 | Dunn et al. |
| 2015/0197514 A1 | 7/2015 | Crouse et al. |
| 2015/0203360 A1 | 7/2015 | Johnston et al. |
| 2015/0208591 A1 | 7/2015 | Steffen |
| 2015/0213202 A1 | 7/2015 | Amarasingham et al. |
| 2015/0213205 A1 | 7/2015 | Van De Sluis et al. |
| 2015/0213206 A1 | 7/2015 | Amarasingham et al. |
| 2015/0213217 A1 | 7/2015 | Amarasingham et al. |
| 2015/0213222 A1 | 7/2015 | Amarasingham et al. |
| 2015/0213223 A1 | 7/2015 | Amarasingham et al. |
| 2015/0213224 A1 | 7/2015 | Amarasingham et al. |
| 2015/0213225 A1 | 7/2015 | Amarasingham et al. |
| 2015/0221208 A1 | 8/2015 | Knighton et al. |
| 2015/0227705 A1 | 8/2015 | Zaima et al. |
| 2015/0231288 A1 | 8/2015 | Campagna |
| 2015/0232353 A1 | 8/2015 | Denvir |
| 2015/0233022 A1 | 8/2015 | McCullough |
| 2015/0235549 A1 | 8/2015 | Limbert |
| 2015/0235550 A1 | 8/2015 | Pelland et al. |
| 2015/0251921 A1 | 9/2015 | Sobanski |
| 2015/0254964 A1 | 9/2015 | Raichman et al. |
| 2015/0273408 A1 | 10/2015 | Tachibana et al. |
| 2015/0297771 A1 | 10/2015 | Law |
| 2015/0302150 A1 | 10/2015 | Mazar et al. |
| 2015/0302538 A1 | 10/2015 | Mazar et al. |
| 2015/0302539 A1 | 10/2015 | Mazar et al. |
| 2015/0310180 A1 | 10/2015 | Pattekar et al. |
| 2015/0321279 A1 | 11/2015 | Chen et al. |
| 2015/0322540 A1 | 11/2015 | Chen et al. |
| 2015/0322545 A1 | 11/2015 | Chen et al. |
| 2015/0330007 A1 | 11/2015 | Blaiss et al. |
| 2015/0332007 A1 | 11/2015 | Rosebraugh |
| 2015/0332940 A1 | 11/2015 | Wang et al. |
| 2015/0335037 A1 | 11/2015 | Coufal et al. |
| 2015/0343379 A1 | 12/2015 | Tomimatsu et al. |
| 2015/0352486 A1 | 12/2015 | Xu et al. |
| 2015/0361457 A1 | 12/2015 | Medoff et al. |
| 2015/0368137 A1 | 12/2015 | Miller |
| 2015/0368684 A1 | 12/2015 | Medoff et al. |
| 2015/0373954 A1 | 12/2015 | Kuo |
| 2016/0003564 A1 | 1/2016 | Theberge |
| 2016/0005300 A1 | 1/2016 | Laufer et al. |
| 2016/0008769 A1 | 1/2016 | Dubois et al. |
| 2016/0009581 A1 | 1/2016 | Gordon |
| 2016/0017231 A1 | 1/2016 | Singh et al. |
| 2016/0019666 A1 | 1/2016 | Amarasingham et al. |
| 2016/0021903 A1 | 1/2016 | Dull |
| 2016/0023934 A1 | 1/2016 | Smith et al. |
| 2016/0030883 A1 | 2/2016 | Xu et al. |
| 2016/0042634 A1 | 2/2016 | Alhazme |
| 2016/0042635 A1 | 2/2016 | Rosebraugh et al. |
| 2016/0066572 A1 | 3/2016 | Mathieu et al. |
| 2016/0073646 A1 | 3/2016 | Riley |
| 2016/0074436 A1 | 3/2016 | O'Flaherty et al. |
| 2016/0076155 A1 | 3/2016 | Kim |
| 2016/0088846 A1 | 3/2016 | Lemons |
| 2016/0089463 A1 | 3/2016 | Thorn |
| 2016/0093194 A1 | 3/2016 | Herzog |
| 2016/0125723 A1 | 5/2016 | Marra et al. |
| 2016/0137924 A1 | 5/2016 | Mazanec |
| 2016/0140832 A1 | 5/2016 | Moore |
| 2016/0148489 A1 | 5/2016 | Reeder et al. |
| 2016/0151015 A1 | 6/2016 | Condurso et al. |
| 2016/0160053 A1 | 6/2016 | Thevasahayam |
| 2016/0171874 A1 | 6/2016 | Hermann |
| 2016/0180695 A1 | 6/2016 | Levchenko et al. |
| 2016/0183525 A1 | 6/2016 | Curry |
| 2016/0184791 A1 | 6/2016 | Appelbaum |
| 2016/0194224 A1 | 7/2016 | Buchanan |
| 2016/0194584 A1 | 7/2016 | Ngantung |
| 2016/0197564 A1 | 7/2016 | Buchanan |
| 2016/0216612 A1 | 7/2016 | Kobayashi et al. |
| 2016/0220714 A1 | 8/2016 | Weltmann |
| 2016/0250439 A1 | 9/2016 | Klein et al. |
| 2016/0253897 A1 | 9/2016 | Wildman et al. |
| 2016/0295860 A1 | 10/2016 | Dagher et al. |
| 2016/0318780 A9 | 11/2016 | Bain |
| 2016/0340487 A1 | 11/2016 | Singh et al. |
| 2016/0362322 A1 | 12/2016 | Kuo |
| 2017/0004972 A1 | 1/2017 | Suen |
| 2017/0014803 A1 | 1/2017 | Sidheswaran |
| 2017/0021302 A1 | 1/2017 | Galbraith |
| 2017/0032657 A1 | 2/2017 | Gaisser et al. |
| 2017/0049713 A1 | 2/2017 | Hille et al. |
| 2017/0066953 A1 | 3/2017 | Hulse |
| 2017/0086456 A1 | 3/2017 | Man et al. |
| 2017/0089004 A1 | 3/2017 | Youn |
| 2017/0121902 A1 | 5/2017 | Youn |
| 2017/0135619 A1 | 5/2017 | Felts et al. |
| 2017/0139333 A1 | 5/2017 | Dierichs |
| 2017/0191237 A1 | 7/2017 | Fishmann Torres |
| 2017/0197856 A1 | 7/2017 | Kolstad |
| 2017/0206771 A1 | 7/2017 | Hermann |
| 2017/0229003 A1 | 8/2017 | Borke et al. |
| 2017/0233623 A1 | 8/2017 | Singh et al. |
| 2017/0233624 A1 | 8/2017 | Thomas et al. |
| 2017/0235238 A1 | 8/2017 | Shiraishi |

FOREIGN PATENT DOCUMENTS

| | | |
|---|---|---|
| CN | 101137797 | 3/2008 |
| CN | 101448744 | 6/2009 |
| CN | 101509576 | 8/2009 |
| EP | 0 544 744 | 6/1991 |

(56) References Cited

FOREIGN PATENT DOCUMENTS

| | | |
|---|---|---|
| EP | 1841924 | 10/2007 |
| EP | 3002695 | 4/2016 |
| GB | 2458118 | 9/2009 |
| GB | 2492912 | 1/2013 |
| JP | 7060265 | 3/1995 |
| JP | 7290073 | 11/1995 |
| JP | 8071566 | 3/1996 |
| JP | 8108017 | 4/1996 |
| JP | 8281281 | 10/1996 |
| JP | 9075958 | 3/1997 |
| JP | 10005148 | 1/1998 |
| JP | 10219786 | 8/1998 |
| JP | 10328274 | 12/1998 |
| JP | 11009481 | 1/1999 |
| JP | 11021960 | 1/1999 |
| JP | 11036394 | 2/1999 |
| JP | 11047773 | 2/1999 |
| JP | 11047774 | 2/1999 |
| JP | 11140929 | 5/1999 |
| JP | 11157808 | 6/1999 |
| JP | 11236692 | 8/1999 |
| JP | 11247258 | 9/1999 |
| JP | 2000197891 | 7/2000 |
| JP | 2000317474 | 11/2000 |
| JP | 2001040731 | 2/2001 |
| JP | 2001070770 | 3/2001 |
| JP | 2001205059 | 7/2001 |
| JP | 2001276666 | 10/2001 |
| JP | 2002052327 | 2/2002 |
| JP | 2002126481 | 5/2002 |
| JP | 2002331233 | 11/2002 |
| JP | 2003135944 | 5/2003 |
| JP | 2003247255 | 9/2003 |
| JP | 2003320278 | 11/2003 |
| JP | 2004084445 | 3/2004 |
| JP | 2004324190 | 11/2004 |
| JP | 2005021718 | 1/2005 |
| JP | 2005124797 | 5/2005 |
| JP | 2005131489 | 5/2005 |
| JP | 2005169297 | 6/2005 |
| JP | 2006136862 | 6/2006 |
| JP | 2007111689 | 5/2007 |
| JP | 2007236706 | 9/2007 |
| JP | 2008000666 | 1/2008 |
| JP | 2008018327 | 1/2008 |
| JP | 2008086960 | 4/2008 |
| JP | 2008229491 | 10/2008 |
| JP | 2009189279 | 8/2009 |
| JP | 2009209378 | 9/2009 |
| JP | 2010090586 | 4/2010 |
| JP | 2010150630 | 7/2010 |
| JP | 2011004990 | 1/2011 |
| KR | 199614038 | 10/1996 |
| KR | 2009027908 | 3/2009 |
| KR | 2009030783 | 3/2009 |
| KR | 20090086962 | 8/2009 |
| KR | 1026415 | 4/2011 |
| TW | 200516060 | 5/2005 |
| WO | WO 98/16473 | 4/1998 |
| WO | WO 00/35813 | 6/2000 |
| WO | WO 03/040032 | 5/2003 |
| WO | WO 03/068375 | 8/2003 |
| WO | WO 2003033402 | 11/2003 |
| WO | WO 2004/033376 | 4/2004 |
| WO | WO 2006/076149 | 7/2006 |
| WO | WO 2008/044262 | 4/2008 |
| WO | WO 2009028845 | 3/2009 |
| WO | WO 2011/144285 | 11/2011 |
| WO | WO2012076521 | 6/2012 |
| WO | WO2014098861 | 6/2014 |
| WO | WO2015055971 | 4/2015 |
| WO | WO2015166406 | 11/2015 |
| WO | WO2016037290 | 3/2016 |
| WO | WO2016112922 | 7/2016 |

OTHER PUBLICATIONS

US 8,773,268 B2, 07/2014, Wildman et al. (withdrawn)
Scan Unic ApS, CVR-nr. 30 27 94 17, Årsrapporten er godkendt på den ordinaere generalforsamling, d. 19.12.12; Årsrapport for Dec. 2011; 17 pages.
Project-market maturity fund, Market maturation Foundation gives enterprises new products to market faster, "Scan Unic-combat hospital infections", 2016; 2 pages.
Ozone Generator, www.alibaba.com/product-gs/267935887/small_ozone_generator_water_sterilizer_w, Jun. 11, 2012.
Ozone Boy, www.cleanwaterstore.com/OS001630-p-ozone-faucet.html; Jun. 11, 2012.
Medi-Flo$_3$ Sink, available at www.franke-commercial.com, available at least as early as Nov. 27, 2015, 1 page.
International Search Report and Written Opinion, International Application No. PCT/US2012/068283, dated Feb. 8, 2013, 13 pgs.
Piasetzki Nenninger Kvas LLP, Office Action for Canadian Patent Application No. 2,856,196, 3 pages.
Examination Report from Indian Agent on Sep. 15, 2018, 6 pages.

\* cited by examiner

OZONE DISTRIBUTION IN A FAUCET

CROSS-REFERENCE TO RELATED APPLICATIONS

The present application is a continuation application of U.S. patent application Ser. No. 15/850,956, filed Dec. 21, 2017, which is a divisional application of U.S. patent application Ser. No. 14/362,764, filed Jun. 4, 2014, now U.S. Pat. No. 9,919,939, which is a 371 national phase filing of International Application No. PCT/US2012/068283, filed Dec. 6, 2012, which claims the benefit of U.S. Provisional Patent Application Ser. No. 61/567,392, filed Dec. 6, 2011, the disclosures of which are expressly incorporated by reference herein.

BACKGROUND AND SUMMARY OF THE INVENTION

The present invention relates generally to an electronic faucet and, more particularly, to an electronic faucet including a water treatment device.

Fluid delivery devices, such as faucets, may include a fluid treatment device. For example, a treatment device may include a filter or a water softener configured to treat the water before it flows from the faucet. A user input may be provided for controlled use of the fluid treatment device.

Additionally, a faucet may be configured to provide water from an outlet with different flow patterns or modes (e.g., stream, spray, or other aerated flow). A user may toggle between the flow modes using mechanical and/or electrical inputs.

According to an illustrative embodiment of the present disclosure, a faucet comprises a spout, a first valve in fluid communication with the spout, and a second valve spaced apart from the first valve and in fluid communication with the spout. The faucet further comprises a first flow path fluidly coupled to the first valve, a second flow path fluidly coupled to the second valve, and an antibacterial device fluidly coupled to the second flow path. The faucet is configured to selectively flow fluid through one of the first flow path and the second flow path. When in the first flow path, the fluid flows through the first valve in spaced relation to the antibacterial device. When in the second flow path, the fluid flows through the second valve and the antibacterial device.

According to another illustrative embodiment of the present disclosure, a faucet for dispensing a fluid comprises a spout and a pull-out spray head removably coupled to the spout and including an outlet. The faucet further comprises a valve assembly in fluid communication with the outlet and an antibacterial device configured to output a treatment into the fluid.

According to yet another illustrative embodiment of the present disclosure, a fluid delivery device for outputting a fluid comprises a spout supporting an outlet and a valve assembly in fluid communication with the outlet. The fluid delivery device further comprises a controller operably coupled to the valve assembly and a fluid treatment assembly operably coupled to the controller. The controller is configured to detect operation of the fluid treatment assembly based upon a temperature and a flow rate of the fluid. The controller also is configured to control operation of the fluid delivery device when the flow rate is lower than a predetermined minimum flow rate and when the temperature is greater than a predetermined temperature.

According to another illustrative embodiment of the present disclosure, a faucet comprises a spout supporting an outlet and a valve assembly in fluid communication with the outlet. The faucet further comprises a water treatment assembly having a water treatment device and a housing. A first portion of water is configured to flow through the water treatment device and a second portion of water is configured to flow around the water treatment device. The first and second portions of water are generally coaxial in the housing. The water treatment device is configured to output a treatment to the first portion of water.

According to another illustrative embodiment of the present disclosure, a housing for a fluid treatment device of a faucet comprises an inlet tube, a first cavity fluidly coupled to the inlet tube, a second cavity fluidly coupled to the first cavity and supporting the fluid treatment device, and an electrically operable valve supported within the first cavity. A fluid treatment assembly is supported within the second cavity and is fluidly coupled to the electrically operable valve. An outlet tube is fluidly coupled to the second cavity. The first cavity is substantially aligned with the second cavity. The fluid in the first cavity flows through the electrically operable valve and is directed into the second cavity.

According to a further illustrative embodiment of the present disclosure, a faucet for delivering fluid comprises a spout, an electrically operable valve fluidly coupled to the spout, and an ozone treatment device configured to provide ozone in the fluid. The faucet further comprises a capacitive sensor operably coupled to the ozone treatment device. The capacitive sensor provides an output signal. The faucet also comprises a controller operably coupled to the capacitive sensor. The controller is configured to monitor the output signal from the capacitive sensor to selectively operate the ozone treatment device.

According to a further illustrative embodiment of the present disclosure, a faucet comprises a spout, a first valve assembly in fluid communication with the spout, and a second valve assembly in fluid communication with the spout and the first valve assembly. The faucet further comprises a third valve assembly in fluid communication with the spout, a fluid treatment assembly in fluid communication with the third valve assembly, and a user input. The user input is configured to selectively flow fluid through the first and second valve assemblies when in a non-treatment mode, and is configured to selectively flow fluid through the third valve assembly and the fluid treatment assembly when in a treatment mode.

According to another illustrative embodiment of the present disclosure, an electronic fluid delivery device comprises a spout configured to deliver fluid from an outlet, a valve assembly in fluid communication with the spout, and a sensor operably coupled to the spout and configured to detect a flow mode at the outlet. The electronic fluid delivery device further comprises a user input operably coupled to the sensor and a controller in electronic communication with the sensor and the user input. The sensor is configured to provide an electrical signal to the controller indicative of the detected flow mode at the outlet.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying FIGURES in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional types of fluids may be used.

Figure 1:
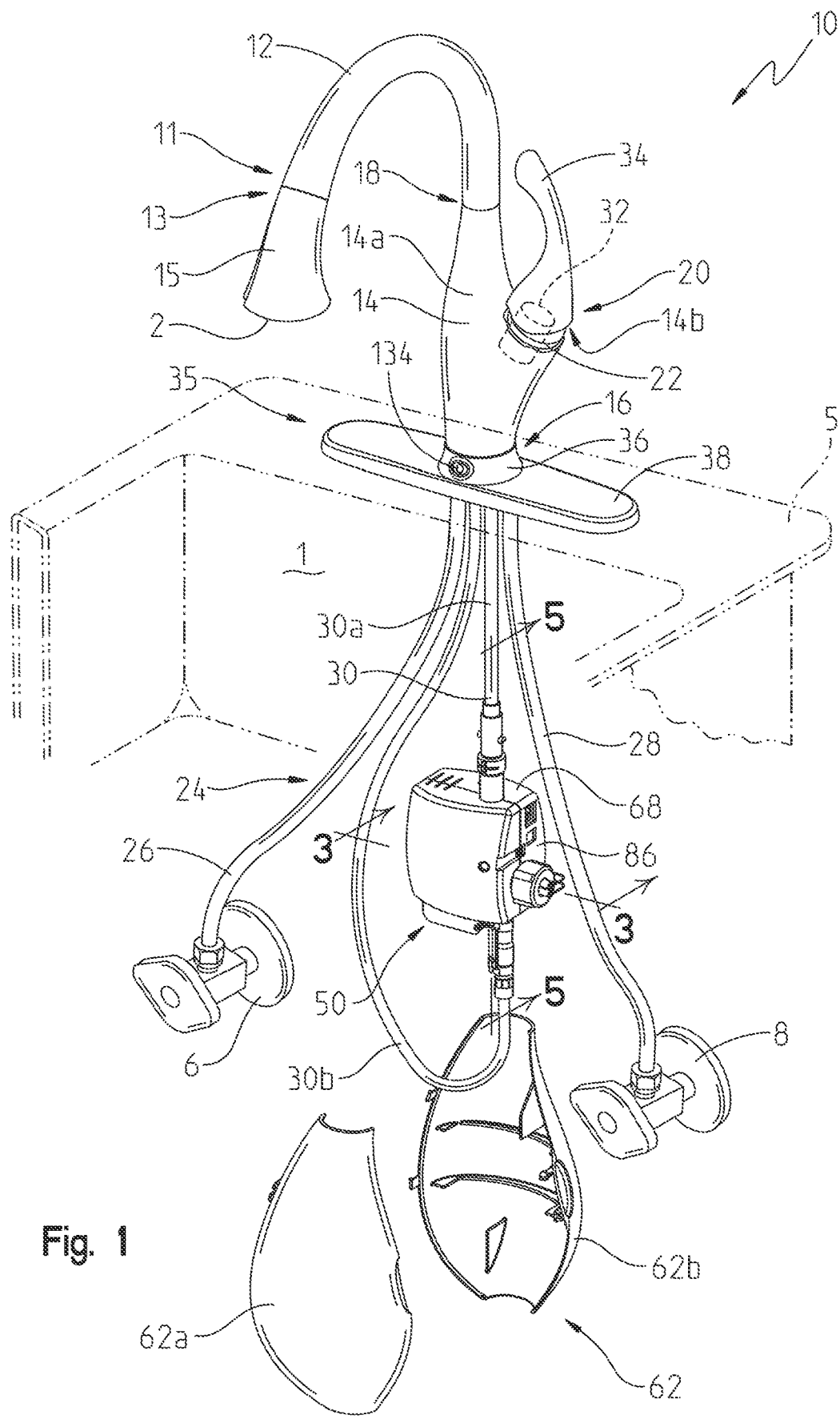
FIG. 1 is a perspective view of an illustrative embodiment faucet of the present disclosure.
Figure 2A:
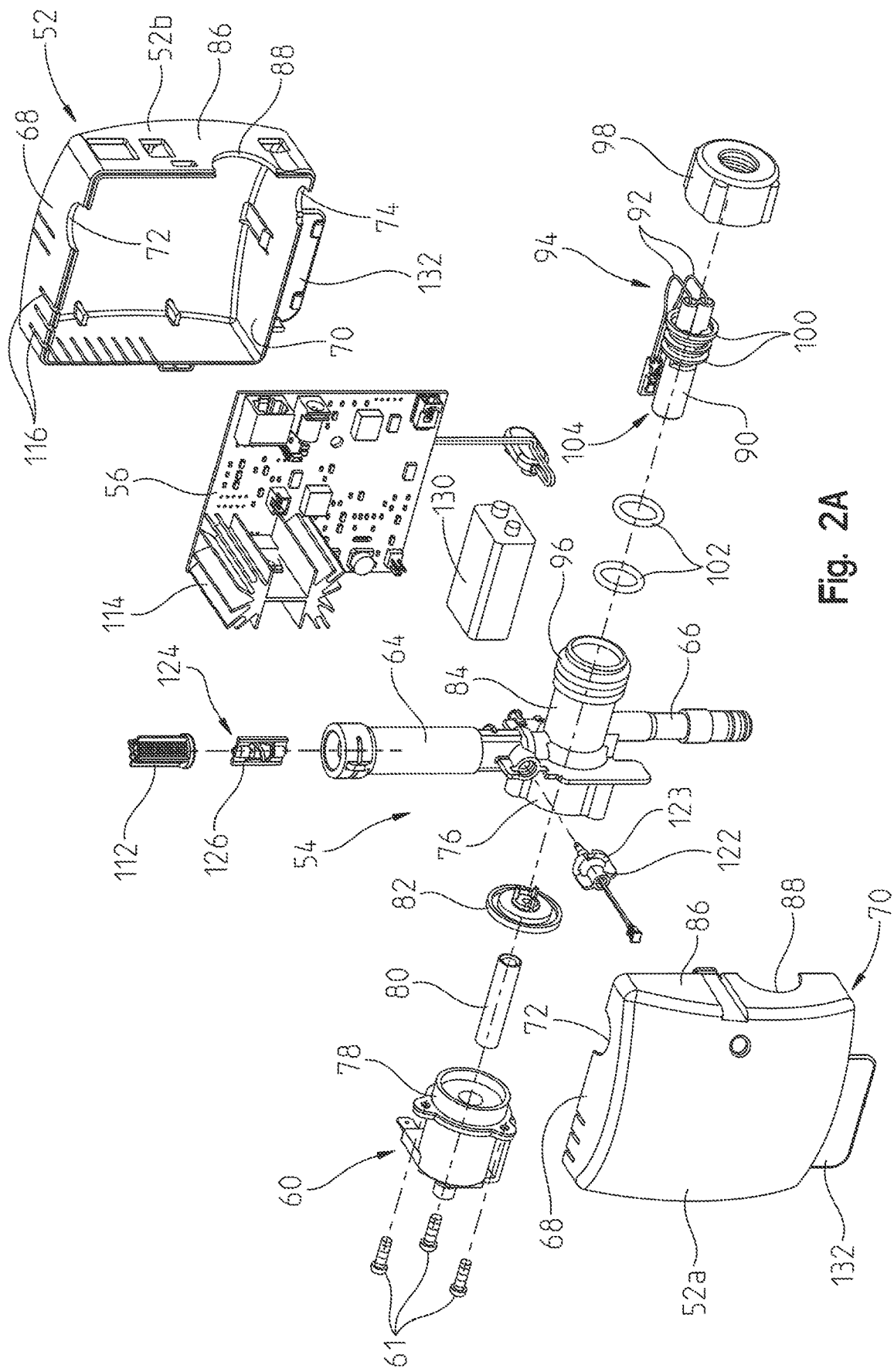
FIG. 2A is an exploded perspective view of a water treatment assembly of the faucet of FIG. 1.
Figure 2B:
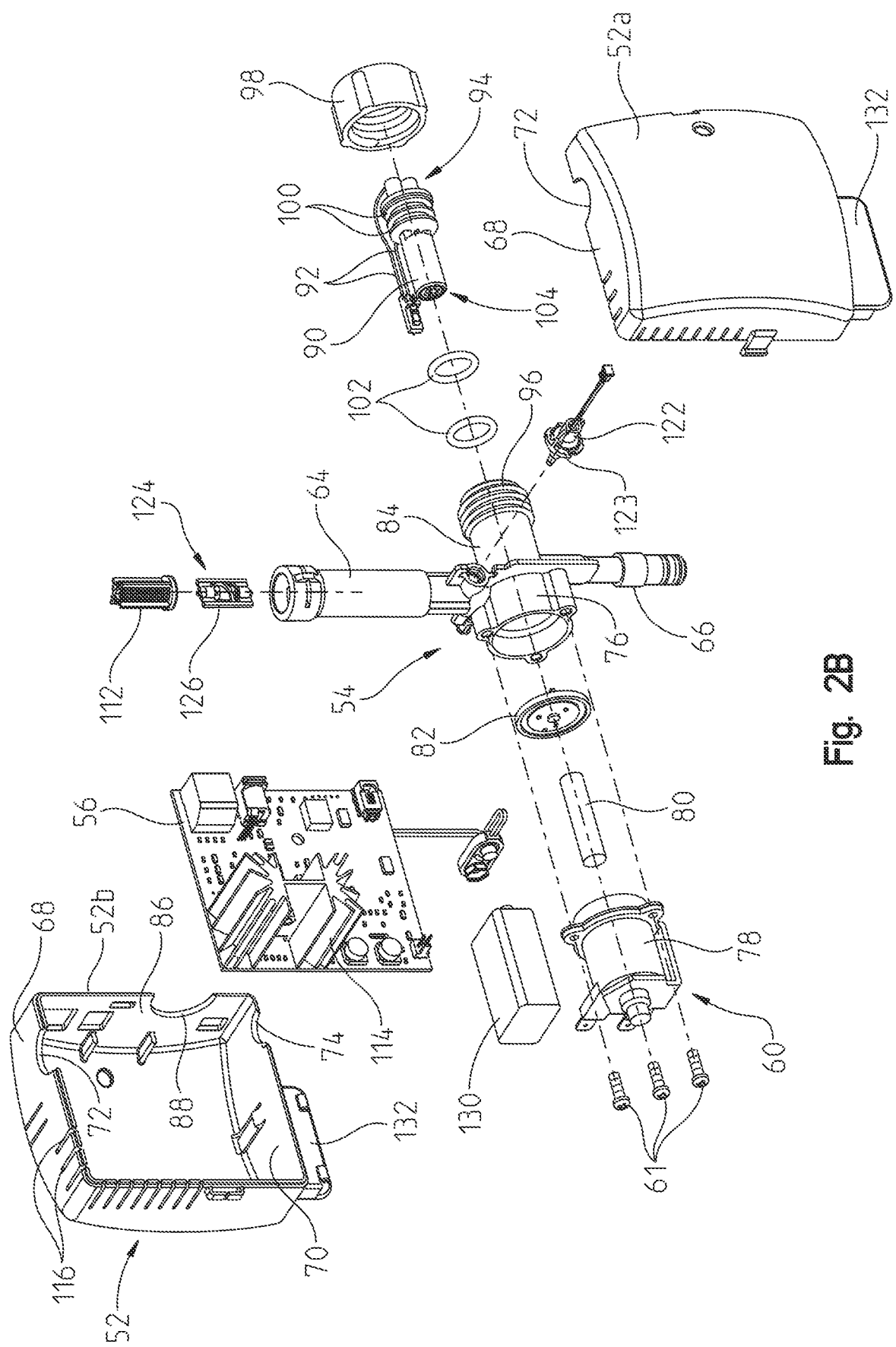
FIG. 2B is a further exploded perspective view of the water treatment assembly of the faucet of FIG. 1.
Figure 7:
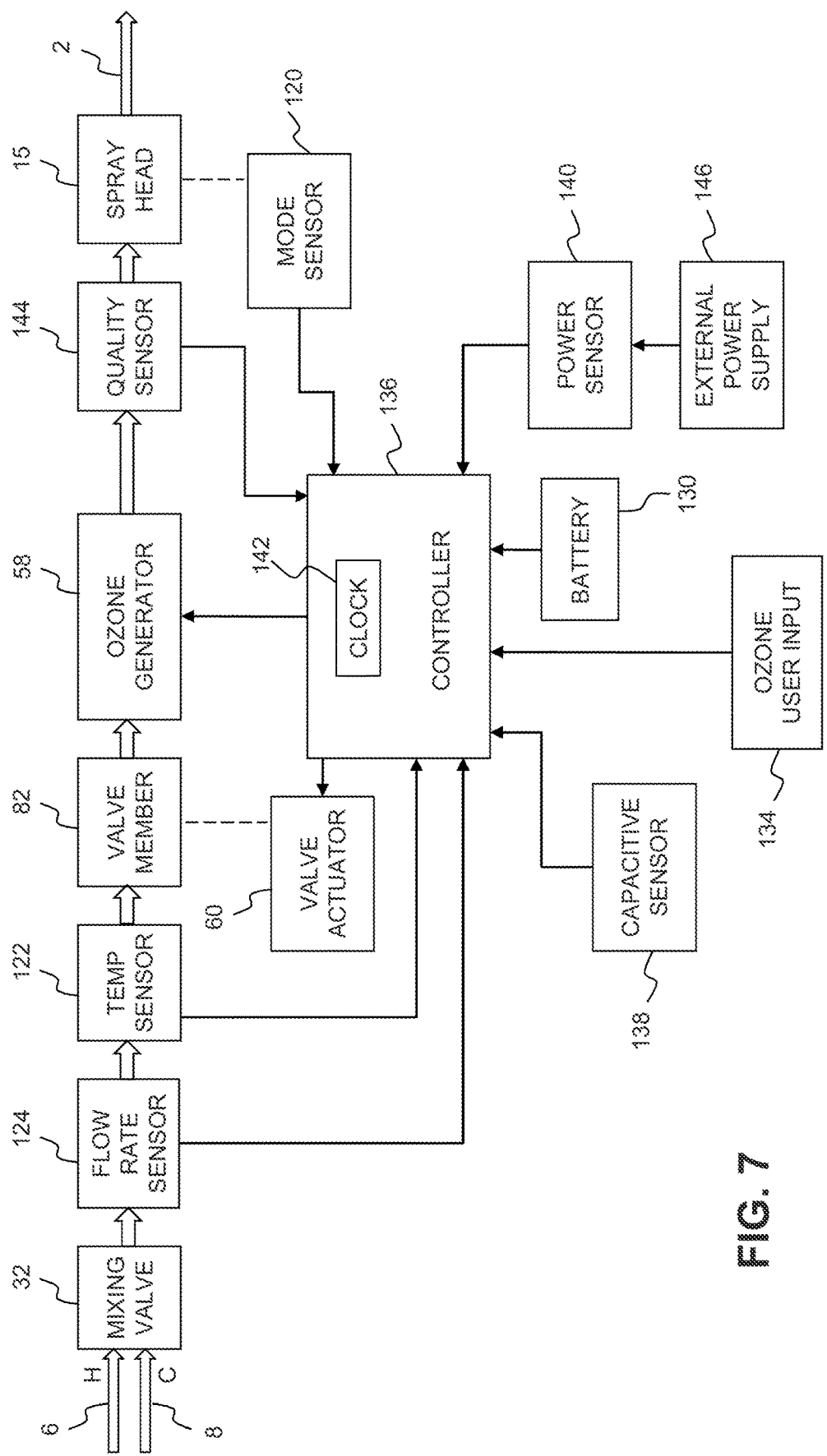
FIG. 7 is a diagrammatic view of the present disclosure, illustrating a plurality of inputs and at least one output.

Referring to FIGS. 1 and 2, an illustrative embodiment faucet 10 is shown including a spout body 12, a hub 14, a spray head 15, a valve assembly 20, a waterway assembly 24, a mounting assembly 35, a water treatment assembly 50, and a controller 136 (FIG. 7). In operation, faucet 10 receives water from hot and cold water supplies 6 and 8, respectively, and selectively mixes the incoming water to provide water to an outlet 2 at spray head 15. Faucet 10 may be mounted to a sink deck 5 or other suitable surface with outlet 2 positioned to direct water into a sink basin 1, for example.

The illustrative hub 14 of faucet 10 is a generally hollow component having a vertically disposed body portion 14a and an angled valve portion 14b extending therefrom. As shown in FIG. 1, open ends 16, 18 of body portion 14a are longitudinally disposed and open end 22 of valve portion 14b is laterally disposed at an angle from open ends 16, 18. In particular, valve portion 14b is illustratively positioned at any angle greater than 00 and less than or equal to 90° relative to body portion 14a. Body portion 14a of hub 14 includes an open bottom end 16 that is configured to be supported above sink deck 5. Body portion 14a of hub 14 also includes an open top end 18 that is configured to mate with spout body 12. For example, top end 18 of body portion 14a may include an internally threaded bore (not shown) that is sized to receive and engage an externally threaded end (not shown) of spout body 12, thereby securing spout body 12 onto hub 14.

Referring to FIG. 1, similar to body portion 14a of hub 14, valve portion 14b also includes an open end 22 for coupling with a handle 34 of valve assembly 20. The illustrative valve assembly 20 of faucet 10 includes handle 34 and at least a valve body 32. Valve assembly 20 is supported by valve portion 14b of hub 14 and may be removably coupled thereto. In this illustrative embodiment, valve assembly 20 may be removed from the open end 22 of valve portion 14b for cleaning or servicing. Valve body 32 may be a conventional mixing valve that uniformly mixes the hot and cold water entering valve assembly 20 from inlet tubes 26, 28, respectively. For example, valve body 32 may be a movable disc variety or a ball-type variety. Furthermore, valve assembly 20 and mixing valve 32 may be of the type described in U.S. Pat. No. 7,753,074 to Rosko et al., issued on Jul. 13, 2010, which is expressly incorporated by reference herein.

Hub 14 of faucet 10 may be formed of a traditional metallic material, such as zinc or brass. It is also within the scope of the present disclosure that hub 14 may be formed of a non-metallic material, such as a polymer. Suitable non-metallic materials that may be used to construct hub 14 include cross-linkable polyethylene (PEX), polybutylene terephthalate (PBT), polyester, melamine, melamine urea, and melamine phenolic.

As shown in FIG. 1, hub 14 is coupled to mounting assembly 35 above sink deck 5. Mounting assembly 35 includes at least a pedestal 36, which is coupled to hub 14 above sink deck 5, and a base plate 38. Pedestal 36 is positioned intermediate bottom end 16 of hub 14 and base plate 38. Conventional sealing members, such as o-rings (not shown), may be positioned between pedestal 36 and hub 14, and similarly, between pedestal 36 and base plate 38. Base plate 38 is supported above sink deck 5 and a conventional sealing member (not shown) may be positioned between base plate 38 and sink deck 5. Conventional fasteners (such as threaded shanks and nuts) may be used to stabilize hub 14 and couple base plate 38 to sink deck 5.

With continued reference to FIG. 1, illustrative waterway assembly 24 of faucet 10 includes a hot water inlet tube 26, a cold water inlet tube 28, and an outlet tube 30. Hot and cold water inlet tubes 26, 28 of waterway assembly 24 may be fluidly coupled to hot and cold water supplies 6, 8, respectively, for receiving water into faucet 10. Illustratively, outlet tube 30 includes a first portion 30a and a second portion 30b. Both first and second portions 30a, 30b of outlet tube 30 are fluidly coupled to water treatment assembly 50. More particularly, first portion 30a extends between valve assembly 20 and a water treatment housing 54 of water treatment assembly 50. Second portion 30b extends below water treatment housing 54 and bends upwardly to pass through spout body 12 and couple with spray head 15 to deliver water from outlet 2.

As shown in FIG. 1, inlet tubes 26, 28 extend beneath hub 14 and may include conventional fluid couplings, such as nuts, for fluidly coupling hot and cold inlet tubes 26, 28 onto hot and cold water supplies 6, 8, respectively. Likewise, first portion 30a of outlet tube 30 may include conventional fluid couplings for fluidly coupling to water treatment housing 54 and valve assembly 20. Additionally, second portion 30b may include conventional fluid couplings for coupling to water treatment housing 54. Furthermore, conventional sealants (e.g., o-rings) may be included with the conventional fluid couplings. For example, waterway assembly may be constructed by the method set forth in International Patent Application No. PCT/US10/25524 to Nelson et al., filed Feb. 26, 2010, the disclosure of which is expressly incorporated by reference herein.

To limit contact between the water in faucet 10 and metallic components, waterway assembly 24 may be formed of a flexible, non-metallic material, such as a polymer, illustratively a cross-linkable polymer. Alternatively, waterway assembly 24 may be lined with a non-metallic material. As such, waterway assembly 24 is illustratively electrically non-conductive. In one illustrative embodiment, substantially the entire waterway assembly 24, including inlet tubes 26, 28, and outlet tube 30 is formed of a polyethylene which is subsequently cross-linked to form cross-linked polyethylene (PEX). Other suitable materials that may be used to construct waterway assembly 24 include polyethylene (PE) (such as raised temperature resistant polyethylene (PE-RT)), polypropylene (PP) (such as polypropylene random (PPR)), and polybutylene (PB). It is further envisioned that waterway assembly 24 may be constructed of cross-linked polyvinyl chloride (PVCX) using siline free radical initiators, cross-linked polyurethane, or cross-linked propylene (XLPP) using peroxide or siline free radical initiators. It is within the scope of the present disclosure that the polymer material used to construct waterway assembly 24 may include reinforcing members, such as glass fibers.

As shown in FIG. 1, spray head 15 is removably coupled to spout body 12 and is in fluid communication with second portion 30b of outlet tube 30. Illustrative spray head 15 is a pull-down type but it is appreciated that spray head 15 may embody other types of spray heads. Spray head 15 is operably coupled to spout body 12 through a coupling (not shown), for example resilient fingers, bayonet coupling, or magnetic coupling. In operation, spray head 15 may be configured in a first position or a second position. More particularly, in the first position, an end 13 of spray head 15 is proximately coupled to an end 11 of spout body 12. Conversely, in the second position, spray head 15 extends from spout body 12 via second portion 30b of outlet tube 30 such that end 11 of spout body 12 and end 13 of spray head 15 are spaced apart. Although the disclosure is described in connection with a pull-out spray head, it should be understood that additional types of spray heads or spout bodies may be used. For example, faucet 10 may include a spout having an outlet with a fixed aerator thereto.

Referring to FIGS. 1 and 7, spray head 15 may be configured to adjust the flow mode of the water at outlet 2. The flow mode of operation may be a spray, a stream, or an aerated mode, or any combination thereof, and may include additional flow outlet patterns. Spray head 15 or hub 14 may be mechanically or electrically coupled to a mode sensor 120 in order to communicate the flow mode to controller 136. More particularly, mode sensor 120 may be positioned on or within faucet 10 and may include a user input (not shown) to electrically toggle or switch between a stream mode, a spray mode, or other aerated modes, for example. A stream mode may output water from outlet 2 in a laminar, less turbulent manner than a spray mode. Mode sensor 120 may be configured to detect changes in specific characteristics of the water or the flow pattern, for example the turbulence of the water, in order to determine the mode.

Mode sensor 120 may be a piezoelectric element, a radio frequency ("RF") device, a mechanical latching switch, a wireless sensor, a turbine generator for detecting flow rate, a deflection switch, a magnetic or Hall-Effect sensor, or a capacitive sensor, for example, in electronic communication with the user input in order to vary the flow mode of water at outlet 2. In one illustrative embodiment, mode sensor 120 is a piezoelectric element for detecting changes in pressure pulses or vibrations to indicate when the mode changes between stream and spray. For example, faucet 10 may be configured to start in a default or baseline mode, such as the spray mode, and mode sensor 120 is configured to detect a change in pressure and/or vibrations which indicate that the mode has changed. In a further illustrative embodiment, mode sensor 120 may operate in conjunction with a capacitive sensor 138, using touch or proximity sensing, in order to toggle between the stream mode and the spray mode. Additionally, capacitive sensor 138 may be used to turn faucet 10 on and off (i.e., start and stop the flow of water through waterway assembly 24), as detailed further hereinafter.

Outlet 2 may also include an aerator of the laminar-type (not shown) to change the water at outlet 2 between an aerated flow and a laminar flow. The aerator may include a plurality of openings that are configured to rotate and form various patterns or adjust the flow mode to promote either an aerated or a laminar flow. For example, rotating the aerator to align all of the openings may produce a laminar flow. Additionally, the aerator may include electronic sensors or mechanical couplings to toggle between aerated and laminar flow.

Figure 3:
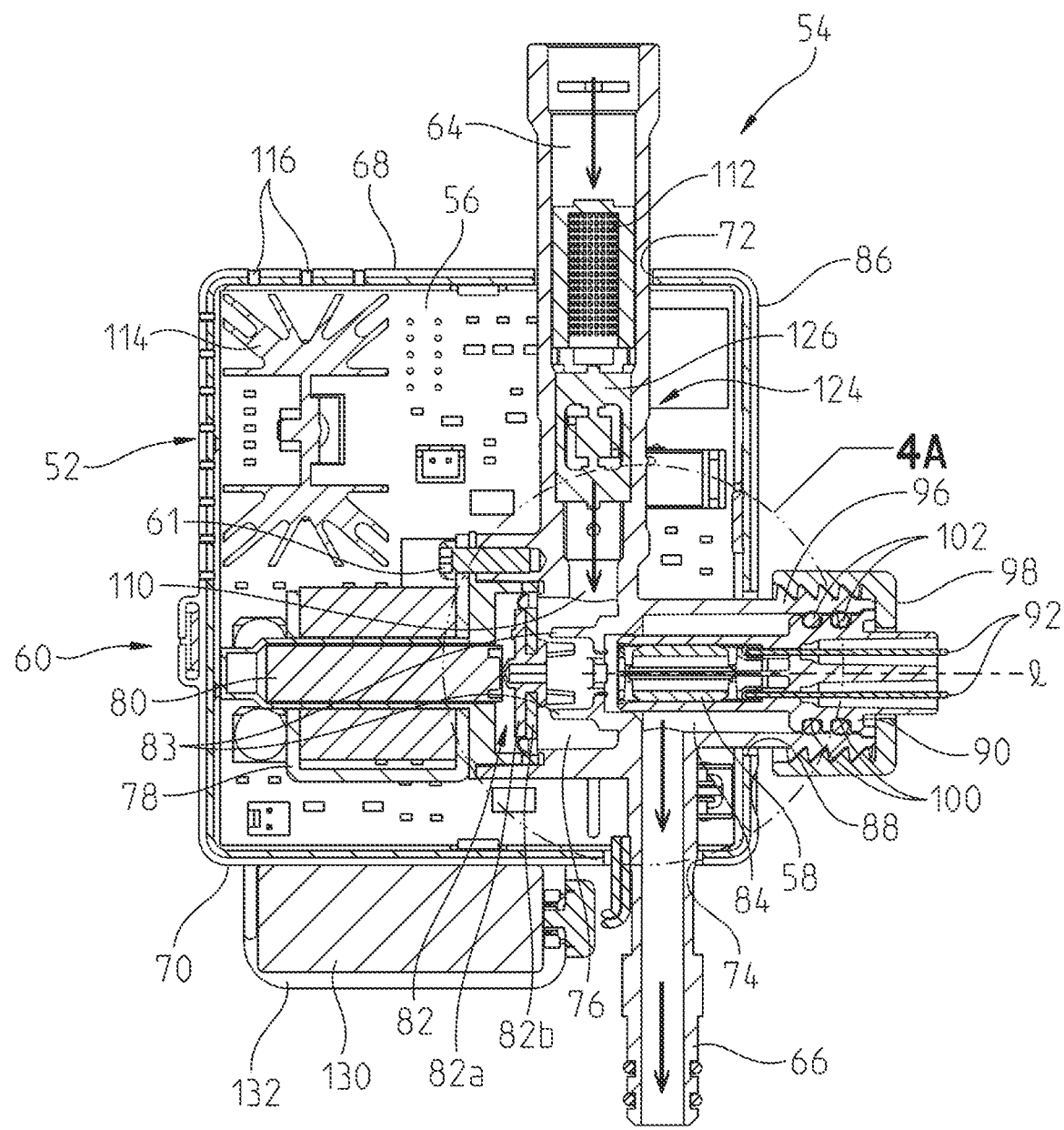
FIG. 3 is a cross-sectional view of a water treatment housing of the water treatment assembly of FIG. 2, taken along line 3-3 of FIG. 1.

As shown in FIGS. 1-3, water treatment assembly 50 of faucet 10 further comprises a cover 52 supported under sink deck 5, a printed circuit board 56, a water treatment device 58, illustratively an antibacterial device such as an ozone generator, and an electrically operable valve 60. Water treatment housing 54 is positioned within cover 52. Optionally, cover 52 may be surrounded by a shell 62 (FIG. 1). Shell 62 may be formed as a single unit or may include first and second sides 62a, 62b that couple together about the perimeter of shell 62. Although the disclosure is described in connection with ozone treatment, it should be understood that additional types of fluid treatment may be used.

Figure 5:
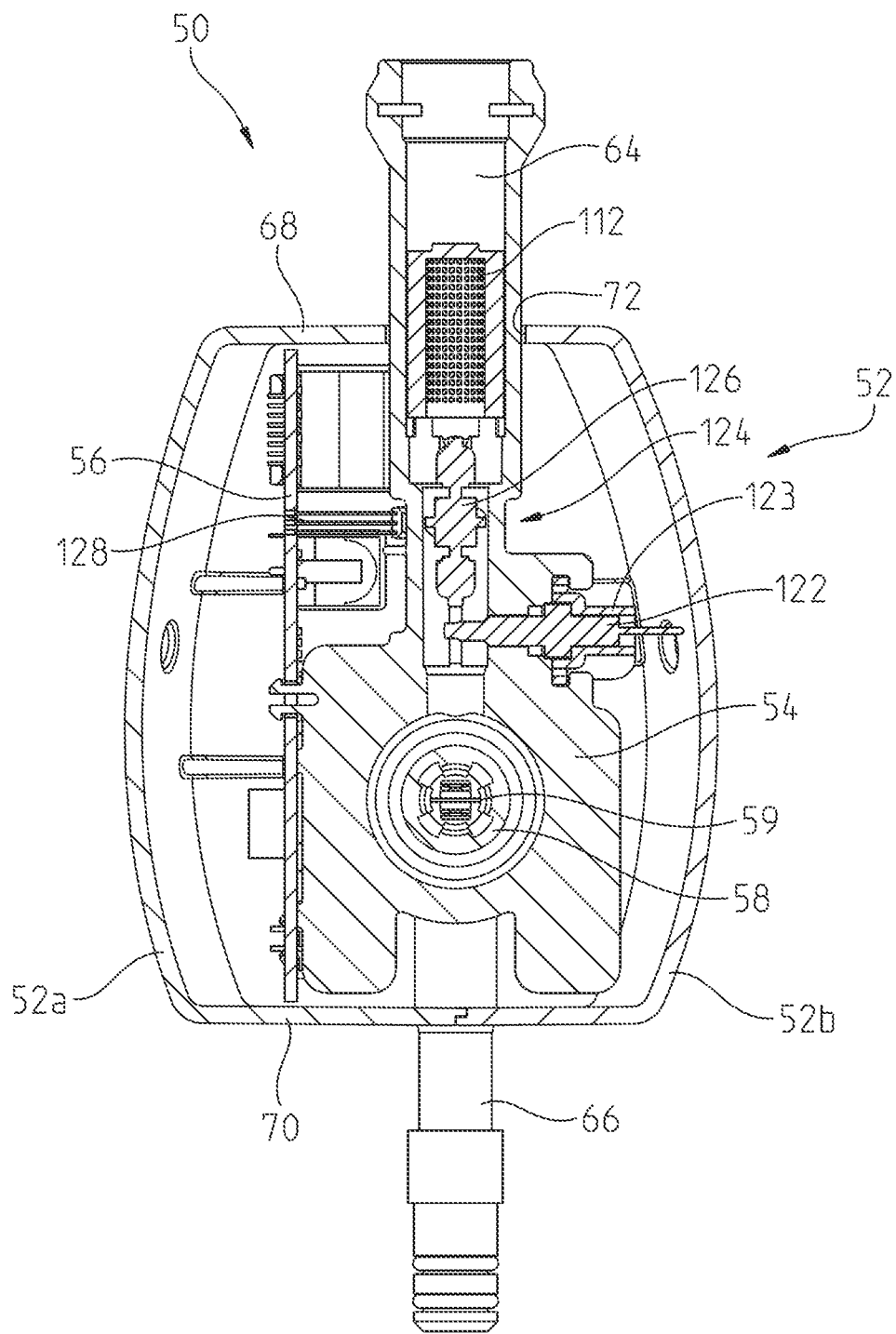
FIG. 5 is a cross-sectional view of the water treatment assembly of FIG. 2, taken along line 5-5 of FIG. 1.

With respect to FIGS. 2 and 5, cover 52 illustratively includes a first side 52a and a second side 52b which are generally mirror images and represent approximately half of cover 52. First and second sides 52a, 52b are coupled about the perimeter of cover 52 to illustratively form a cube having a generally square cross-section. However, cover 52 may form other shapes. Alternatively, cover 52 may be formed as a single unit. Additionally, cover 52 and shell 62 may be formed of non-conductive materials, such as polymers.

Referring to FIGS. 2-6, water treatment housing 54 includes an inlet waterway 64 and an outlet waterway 66. Inlet and outlet waterways 64, 66 may be oriented in close proximity to each other but not directly aligned. More particularly, illustrative inlet waterway 64 may be laterally offset from outlet waterway 66 such that inlet waterway 64 and outlet waterway 66 are substantially parallel. By positioning inlet and outlet waterway 64, 66 in close proximity to each other, water treatment housing 54 may be more compact. Alternatively, inlet and outlet waterways 64, 66 of water treatment housing 54 may be angled relative to each other.

As shown in FIGS. 2, 3, 5, and 6, a filter or screen 112 may be positioned within inlet waterway 64 of water treatment housing 54. Filter 112 may be comprised of a finely-woven mesh material in order to remove impurities and other particulate matter from the water. As such, filter 112 may improve the quality of the water. Additionally, filter 112 may increase the uniformity of the water.

Referring to FIGS. 2-5, water treatment housing 54 extends from above an upper surface 68 of cover 52 and below a lower surface 70 of cover 52. More particularly, upper surface 68 of cover 52 includes an aperture 72 through which inlet waterway 64 of water treatment housing 54 extends and lower surface 70 of cover 52 includes an aperture 74 through which outlet waterway 66 of water treatment housing 54 extends. Water treatment housing 54 may include a valve cavity 76 and a treatment cavity 84. Treatment cavity 84 is aligned with valve cavity 76 and may be spaced apart therefrom by a wall 106 of water treatment housing 54. More particularly, valve cavity 76 and treatment cavity 84 are substantially perpendicular to inlet and outlet waterways 64, 66 of water treatment housing 54. Treatment cavity 84 extends toward a lateral surface 86 of cover 52 and extends through an aperture 88 in lateral surface 86.

Referring to FIGS. 2A-4A, valve cavity 76 supports electrically operable valve 60, which may be coupled to water treatment housing 54 and circuit board 56 via conventional fasteners, for example a plurality of screws 61, and/or adhesive materials. Electrically operable valve 60 extends substantially perpendicularly to inlet waterway 64 and outlet waterway 66 of water treatment housing 54. Electrically operable valve 60 may be an electromechanical valve, illustratively a solenoid valve, that converts energy into linear motion. Illustratively, electrically operable valve 60 includes a magnetic portion 78, a plunger 80, and a valve member 82. More particularly, plunger 80 is positioned within magnetic portion 78 and valve member 82 is spaced apart from magnetic portion 78. Valve member 82 includes a first side 82a that is comprised of magnetic material (e.g., metal) and a second side 82b that is comprised of a non-conductive sealing material (e.g., rubber). Electrically operable valve 60 is electrically coupled to an external power supply 146 (e.g., the electrical system of the house, building, or other structure in which faucet 10 is used) (not shown).

Figure 4A:
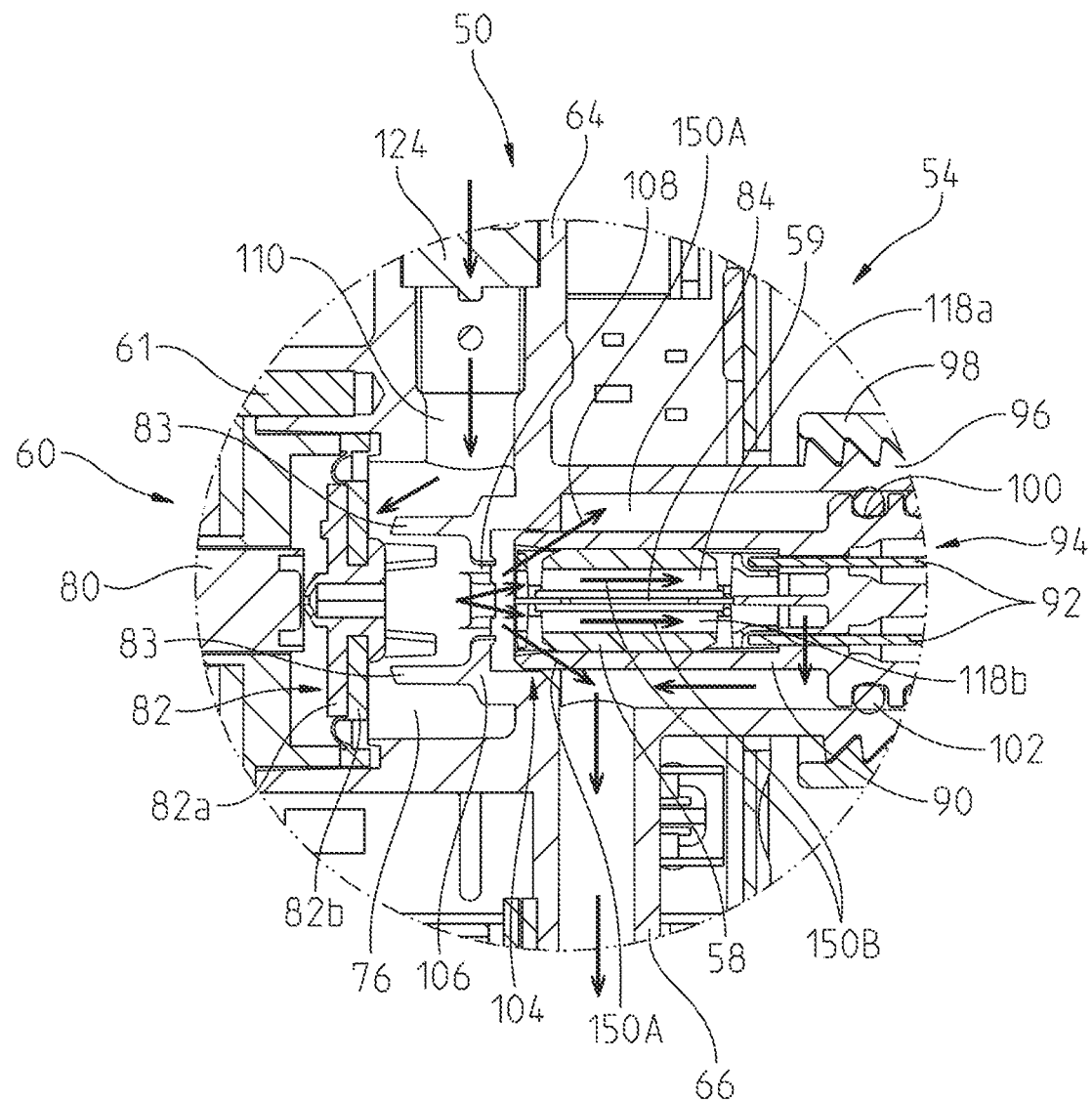
FIG. 4A is a detailed view of the water treatment housing of FIG. 3 when the faucet is operating.
Figure 4B:
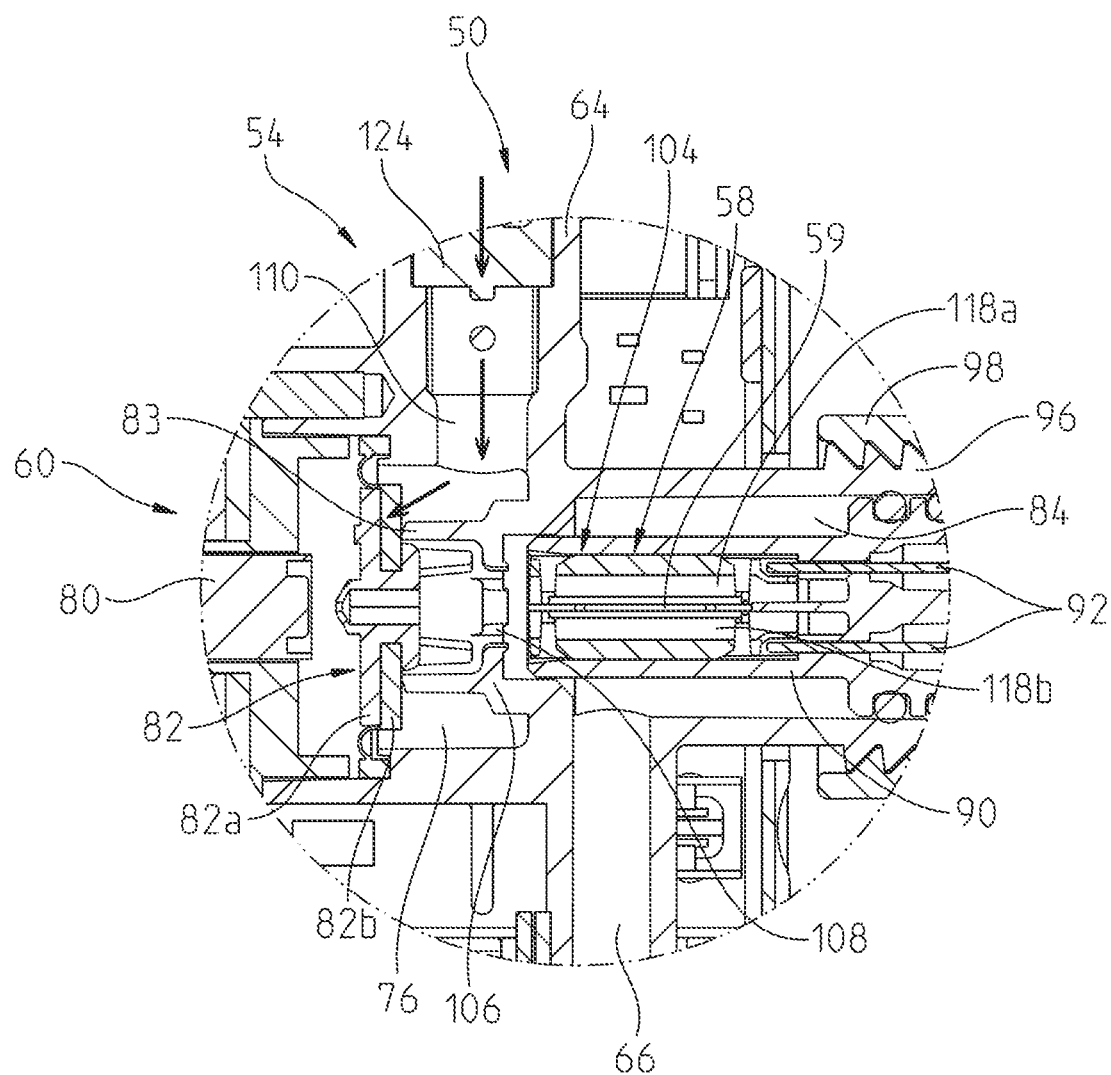
FIG. 4B is a detailed view of the water treatment housing when the faucet is not operating.

Illustratively, electrically operably valve 60 further includes a spring mechanism 275 (FIG. 11) within magnetic portion 78 that is adjacent to an end of plunger 80, such that plunger 80 is spring-biased within magnetic portion 78. In particular, plunger 80 is spring-biased toward a closed position. In other words, electrically operable valve 60 is closed when no power is supplied thereto and plunger 80 may extend from magnetic portion 78. Additionally, spring mechanism 275 (FIG. 11) is extended and not compressed by plunger 80. More particularly, in the closed position, plunger 80 contacts first side 82a of valve member 82, thereby pushing or propelling valve member 82 toward a valve seat 83 of wall 106 (FIGS. 4A, 4B). As such, second side 82b of valve member 82 is sealingly engaged with valve seat 83 to prevent water from flowing into valve cavity 76.

Figure 11:
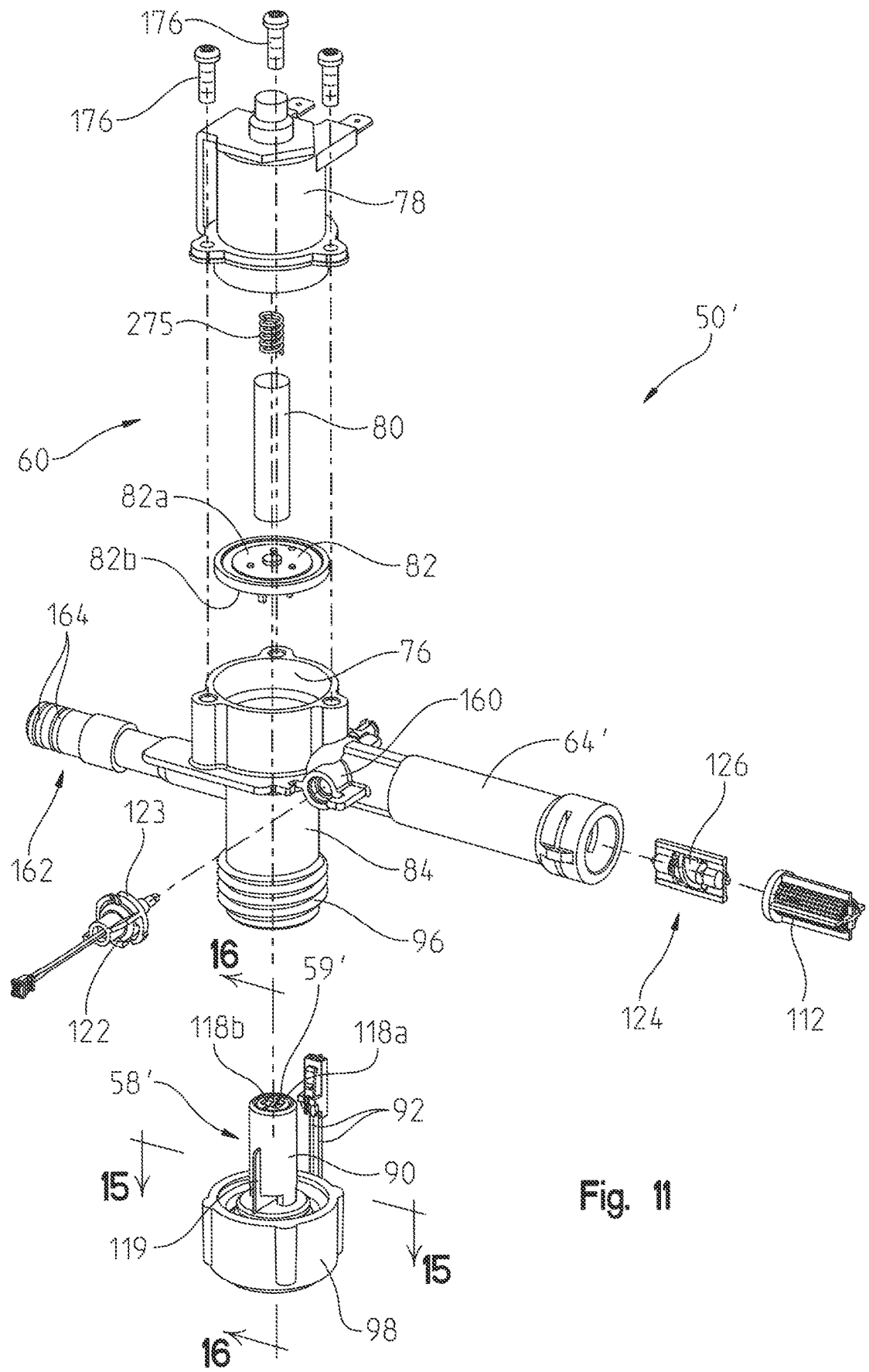
FIG. 11 is an exploded perspective view of the water treatment assembly of FIG. 10

Conversely, during operation, a voltage is applied to magnetic portion 78 to form a magnetic field along plunger 80 when faucet 10 is operating. The magnetic field causes plunger 80 to slide or retract within magnetic portion 78 to open or actuate electrically operable valve 60. When electrically operable valve 60 is in the open position, plunger 80 retracts within magnetic portion 78 and compresses spring mechanism 275 (FIG. 11). As such, when electrically operable valve 60 is operating, plunger 80 is spaced apart from valve member 82, thereby allowing the water pressure of the water in inlet waterway 64 to create a pressure differential in valve cavity 76 and push valve member 82 away from valve seat 83 and toward plunger 80 and magnetic portion 78. During operation, electrically operable valve 60 may generate heat and, therefore, a heat sink 114 may be coupled to circuit board 56 and positioned near electrically operable valve 60. Cover 52 may include a plurality of narrow openings or slits 116 in at least upper surface 68 adjacent heat sink 114 to vent heat produced by electrically operable valve 60.

With continued to reference to FIGS. 3, 4A, and 4B, treatment cavity 84 removably supports a treatment device, illustratively water treatment device 58, therein. Illustrative water treatment device 58 may be a filter device, an anti-bacterial device, or any other device configured to treat a fluid within faucet 10. Antibacterial devices are configured to kill or inhibit the growth of bacteria, for example in foods or on inanimate surfaces or hands (See http://www.fda.govI-Food/ResourcesForYou/StudentsTeachers/Science andThe-FoodSupply/ucm2 15830.htm). Illustratively, antibacterial devices may use chemical treatments (e.g., chlorine), additives, ozone, UV, and other known methods to kill or inhibit growth of bacteria.

Figure 6:
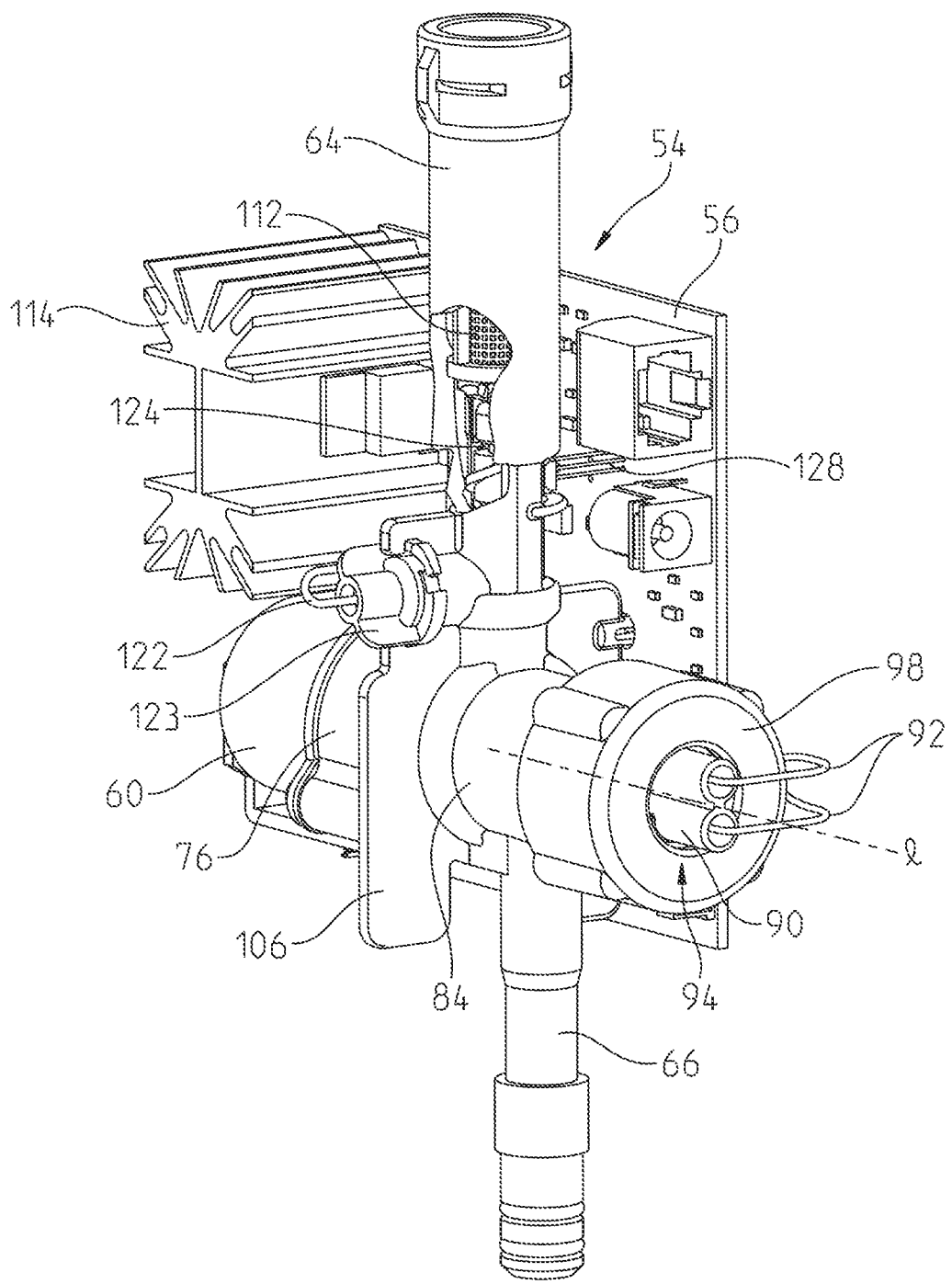
FIG. 6 is a perspective view of the water treatment housing of FIG. 4A.

Illustratively, water treatment device 58 is an antibacterial ozone generator configured to output a treatment with activity against bacteria into the water. Water treatment device 58 is positioned upstream from outlet tube 30 and is housed within a sleeve 90. Sleeve 90 and water treatment device 58 extend along a longitudinal axis (of treatment cavity 84 (FIGS. 3 and 6). An open threaded end 96 of treatment cavity 84 is threadedly coupled to a threaded fastener or cap 98 (e.g., a nut) to retain sleeve 90 within treatment cavity 84. Sleeve 90 may further include at least one groove 100 to receive a sealing member 102. Illustratively, a first end 94 of sleeve 90 includes first and second grooves 100 to receive first and second sealing members 102 (e.g., o-rings).

Water treatment device 58 illustratively includes at least one channel 118, an ozone production device, illustratively a pill 59, and electric couplers, illustratively cables or wires 92. Wires 92 extend from first end 94 of sleeve 90. Illustratively, water treatment device 58 includes first and second channels 118a, 118b that may be substantially parallel to longitudinal axis (of treatment cavity 84 (FIG. 3). Additionally, pill 59 of water treatment device 58 may be intermediate channels 118a, 118b. In operation, water flows between valve cavity 76 and treatment cavity 84 and is separated such that a portion of the water flows through water treatment device 58 and a portion of the water side streams through channels 118a, 118b. As shown in FIG. 4A, side streaming water is illustratively denoted by arrows 150A and as such, bypasses water treatment device 58. The water flowing through water treatment device 58 is illustratively denoted by arrows 150B and may be treated, for example with ozone, if water treatment device 58 is operating. As shown in FIG. 4A, arrows 150A and 150B indicate that the treated water and the non-treated water flow in generally coaxial directions during operation of faucet 10.

The side streaming water 150A and the water 150B flowing through water treatment device 58 mix together in second portion 30b of outlet tube 30. When faucet 10 of the present disclosure is operating (i.e., electrically operable valve 60 is in the open position), a portion of the water flowing through water treatment housing 54 side streams and a portion of the water flows through water treatment device 58, regardless of whether water treatment device 58 is operating. In particular, the side streaming water 150A may minimize the pressure drop within a water passageway 110 of water treatment housing 54.

With continued reference to FIGS. 4A and 4B, wall 106 of water treatment housing 54 is positioned intermediate treatment cavity 84 and valve cavity 76. Wall 106 may abut a second end 104 of sleeve 90 to prevent sleeve 90 and water treatment device 58 from extending into valve cavity 76. More particularly, wall 106 includes openings 108 that regulate and control water flowing between valve cavity 76 and treatment cavity 84. Optionally, a spacer (not shown) having at least one opening or window may be positioned between second end 104 of sleeve 90 and wall 106 in order to further regulate and control the volume of water that flows between valve cavity 76 and treatment cavity 84. In particular, openings 108 control and regulate the volume of water 150B that flows through water treatment device 58 and the volume of water 150A that side streams.

Referring to FIGS. 3, 4A, and 4B, water passageway 110 of water treatment housing 54 extends between inlet waterway 64 and outlet waterway 66 and between valve cavity 76 and treatment cavity 84. Illustratively, water passageway 110 has a generally serpentine shape. More particularly, water passageway 110 is substantially vertical through inlet waterway 64 and includes a substantially right-angle bend and continues into valve cavity 76. Water passageway 110 continues from valve cavity 76, through openings 108 in wall 106, and extends into treatment cavity 84. Water passageway 110 includes another substantially right-angle bend in treatment cavity 84 and is substantially vertical through outlet waterway 66. By including another substantially right-angle bend, a return passageway of water passageway 110 reverses the flow direction of the water, which illustratively reduces the distance between inlet waterway 64 and outlet waterway 66. Additionally, the return passageway may be approximately parallel to treatment cavity 84, thereby further decreasing the size of water treatment housing 54.

To limit contact between the water in faucet 10 and metallic components, water treatment housing 54 may be formed of a flexible, non-metallic material, such as a polymer, illustratively a cross-linkable polymer. Alternatively, water treatment housing 54 may be lined with a non-metallic material. As such, water treatment housing 54 is illustratively electrically non-conductive. In one illustrative embodiment, substantially the entire water treatment housing 54 is formed of a polyethylene which is subsequently cross-linked to form cross-linked polyethylene (PEX). Other suitable materials that may be used to construct water treatment housing 54 include polyethylene (PE) (such as raised temperature resistant polyethylene (PE-RT)), polypropylene (PP) (such as polypropylene random (PPR)), and polybutylene (PB). It is further envisioned that water treatment housing 54 may be constructed of cross-linked polyvinyl chloride (PVCX) using silane free radical initiators, cross-linked polyurethane, or cross-linked propylene (XLPP) using peroxide or silane free radical initiators. It is within the scope of the present disclosure that the polymer material used to construct water treatment housing 54 may include reinforcing members, such as glass fibers.

Water treatment device 58 may be used to produce ozone (O3) that absorbs into the water in water treatment housing 54. Water treatment device 58 may be configured to produce ozone through conventional methods (e.g., corona discharge or "hot spark," electrolysis, plasma, UV). Faucet 10 may further include an aspirator (not shown) to facilitate the treatment of the water.

Illustratively, water treatment device 58 uses an electrolytic process which allows ozone to be produced under pressure, and therefore, may increase the concentration of ozone in the water relative to other ozone production methods. In particular, an electric current is supplied to wires 92 and is transmitted to pill 59 of water treatment device 58 in order to produce ozone. Wires 92 are electrically coupled to external power supply 146. Exemplary ozone generators 58 may be available from EOI Electrolytic Ozone Inc. or Klaris Corporation Inc. Because water treatment device 58 is positioned under sink deck 5, sufficient time is permitted for the ozone to be absorbed by the water in second portion 30b of outlet tube 30 before the ozone-treated water is delivered from outlet 2. For example, outlet tube 30 may be approximately 36 inches in length in order to allow the ozone to be dissolved or absorbed in the water before reaching outlet 2. In addition to ozone, water treatment device 58 also may be configured to treat the water in other ways and/or with other chemicals. For example, controller 136 may be configured to alter the treatment produced by water treatment device 58 in response to a user input or desired fluid application.

When water treatment device 58 is configured to produce ozone, the ozone-treated water at outlet 2 is preferably used as a disinfectant or cleaning agent. Additionally, the ozone-treated water may be used to disinfect drinking water. More particularly, until the ozone dissolved in the water is destroyed or otherwise destructed, the ozone-treated water performs a disinfecting function (i.e., actively disinfects objects in contact with the water). Alternatively, if the ozone dissolved in the water is destroyed, the ozone-treated water remains disinfected or clean; however, the ozone-treated water no longer actively performs a disinfecting function. For example, disinfected ozone-treated water may be preferable for clean drinking water applications, whereas ozone-treated water that actively performs a disinfecting function may be preferable as a cleaning agent.

Faucet 10, and in particular waterway assembly 24, may include a filter 113 (FIGS. 17A and 17B) downstream from water treatment device 58. Filter 113 may be configured to further improve the quality of the water by removing impurities or other particles. Additionally, filter 113 may be, for example, a carbon black filter, may be configured to destroy or destruct the ozone in the water in second portion 30b of outlet tube 30. As such, the water in second portion 30b of outlet tube 30 is treated with ozone and is disinfected or clean as it is delivered from outlet 2. However, when the ozone in the water is destroyed by filter 113, the water delivered from outlet 2 no longer actively disinfects objects in contact with the water. Controller 136 may be operably coupled to filter 113 to control operation of filter 113 and/or the flow of water through filter 113 (i.e., through a bypass valve). As such, a user may selectively operate filter 113 in order to produce disinfected water for particular clean water applications (e.g., drinking) and disinfecting water for other water applications (e.g., cleaning).

Referring to FIGS. 1, 3, and 7, controller 136 may receive input from sensors or other ozone user inputs 134 to turn water treatment device 58 on and off. Illustratively, user input 134 is a mechanical push button on pedestal 36. Alternatively, user input 134 may be a capacitive sensing button. Controller 136 electrically controls the operation of water treatment device 58 and may include a timer or clock 142 to turn off water treatment device 58 after a predetermined length of time of operation. For example, controller 136 may be configured to turn off water treatment device 58 after four consecutive minutes of operation. Additionally, clock 142 may record a cumulative amount of time that water treatment device 58 has been operating within a predetermined period. For example, when water treatment device 58 cumulatively operates for approximately 15 minutes during a 60-minute period, clock 142 may send a signal to controller 136. In response thereto, controller 136 may prevent water treatment device 58 from operating until water treatment device 58 has been inactive for a predetermined time.

Additionally, clock 142 may be configured as a water treatment retention timer. More particularly, controller 136 may cooperate with clock 142 to continue operation of water treatment device 58 when a user accidentally bumps or taps spout 12, thereby accidentally turning off the water. For example, when water flows from outlet 2 and user input 134 is activated, controller 136 activates water treatment device 58 to deliver treated water from outlet 2. However, if a user accidentally bumps or taps spout 12 while water treatment device 58 is operating, thereby turning off the water, and then subsequently taps spout 12 again within a predetermined time period, the water will turn on and treated water will continue to flow from outlet 2. As such, controller 136 continues operation of water treatment device 58 for a predetermined time (e.g., 30 seconds) after spout 12 receives a tap to turn water off. If the user does not tap spout 12 within the predetermined time period to turn on the water again, thereby indicating that the user did not accidentally turn off the water, controller 136 will stop operation of water treatment device 58. It may be appreciated that controller 136 may differentiate between a tap on spout 12 for controlling operation of faucet 10 and a grab on spout 12 for adjusting the position of spout 12. In particular, spout 12 is configured to swivel or rotate and a user may adjust the position of spout 12 without turning on/off the water.

Faucet 10 also may include a display or other signal (not shown) operably coupled to user input 134 to indicate to a user whether water treatment device 58 is operating. For example, faucet 10 may include a light-emitting diode ("LED") display on pedestal 36 that may use a specific color to indicate if water treatment device 58 is active (i.e., turned on). In other illustrative embodiments of the present disclosure, user input 134 may be backlit and illuminates to indicate that water treatment device 58 is operating. For example, user input 134 may be backlit to illuminate a white light when water treatment device 58 is operating. Additionally, user input 134 may include a temperature indicator, for example a blue light for cold water and a red light for hot water. Additionally, user input 134 may be configured to gradually change from red to blue or blue to red to indicate a respective decrease or increase in the temperature of the water, as measured by thermistor 122.

Alternatively, capacitive sensor 138 and controller 136 may be used to operate water treatment device 58 and/or actuate electrically operable valve 60 through touch or proximity sensing technology. As such, capacitive sensor 138, in combination with controller 136, may be configured to monitor and control the operation of both electrically operable valve 60 and water treatment device 58. Capacitive sensor 138 may comprise a hands-free proximity sensor, such as an infrared sensor coupled to spout 12, or a touch sensor, such as an accelerometer, force sensor, or push button, to control activation of electrically operable valve 60 and/or water treatment device 58 in a manner similar to that disclosed in U.S. Patent Application Publication No. 2011/0253220 to Sawaski et al., the disclosure of which is expressly incorporated by reference herein. More particularly, capacitive sensor 138 also may comprise an electrode (not shown) coupled to spout body 12. The side wall of spout body 12 may be formed of an electrically conductive material (e.g., metal) and define the electrode. In other illustrative embodiments, the electrode may be defined by a separate electrically conductive element, such as a metal plate. Any suitable capacitive sensor 138 may be used, such as a CapSense capacitive sensor available from Cypress Semiconductor Corporation.

An output from capacitive sensor 138 is coupled to controller 136. More particularly, controller 136 may determine whether a touch (tap or grab) is detected on spout body 12 and/or whether a user's hands or other object is within a detection area proximate spout body 12. For example, if capacitive sensor 138 is operating with the touch sensor, when a touch is detected on spout body 12, controller 136 determines the touch pattern (number of touches) before implementing different functions of faucet 10. Controller 136 may determine that a single tap was detected on spout body 12, thereby indicating that electrically operable valve 60 should be turned on or off. Alternatively, controller 136 may determine that two taps (a double tap) were detected on spout body 12 within a predetermined time period (e.g., one second), thereby indicating that water treatment device 58 should be turned on or off.

The illustrative embodiment faucet 10 may operate according to the following example. When electrically operable valve 60 is closed, faucet 10 does not operate. A single tap on spout body 12 may activate operating electrically operable valve 60. However, a double tap on spout body 12 may activate both electrically operable valve 60 and water treatment device 58, such that the water at outlet 2 is treated with ozone. Only a single tap on spout body 12 may be required to simultaneously turn off both electrically operable valve 60 and water treatment device 58. Furthermore, if electrically operable valve 60 is activated, a double tap on spout body 12 may turn water treatment device 58 on and off. However, a double tap on spout body 12 will not turn off electrically operable valve 60, such that only operation of water treatment device 58 may be affected by a double tap on spout body 12. As is further detailed below, water treatment device 58 will not operate when electrically operable valve 60 is not operating.

The effectiveness of water treatment device 58 is proportional to the concentration of ozone in the water. For example, the oxidation-reduction potential ("ORP") (i.e., the cleanliness) of the water treated with ozone may be one method of determining the effectiveness of water treatment device 58. Similarly, the "kill-rate" of the ozone in the water indicates the effectiveness of water treatment device 58 and measures the amount of contaminants in the water. Faucet 10 may include a quality sensor 144 (FIG. 7) to measure the ORP and/or the kill-rate, thereby monitoring the effectiveness of water treatment device 58.

Referring to FIGS. 2, 3, and 5-7, the concentration of ozone in the water, and therefore, the effectiveness of water treatment device 58, may be affected by parameters or properties of the water, such as flow rate, temperature, the flow mode at outlet 2, and the amount of power supplied to water treatment device 58. As such, faucet 10 further includes a temperature sensor, illustratively a thermistor 122, and a flow rate sensor assembly 124, which illustratively includes a turbine 126 and a Hall-Effect sensor 128. Controller 136 monitors and controls the operation of water treatment device 58 in response to signals sent by thermistor 122 and flow rate sensor assembly 124 indicating the corresponding values for the water. Additionally, faucet 10 may include a power sensor 140 to monitor the power available to electrically operable valve 60 and water treatment device 58.

Thermistor 122 may be positioned within a thermistor retainer 123 coupled to inlet waterway 64 of water treatment housing 54. More particularly, thermistor 122 is positioned upstream to valve cavity 76 and treatment cavity 84 in order to monitor the temperature of the water before it flows to water treatment device 58. Illustratively, thermistor 122 is oriented perpendicularly to inlet waterway 64 of water treatment housing 54, however thermistor 122 may be positioned in a different orientation, depending on the configuration of water treatment housing 54.

The temperature of the water is inversely related to the concentration of ozone in the water. In particular, as the temperature of the water increases, the concentration of ozone in the water may decrease due to undesirable off-gassing. When controller 136 receives a temperature measurement from thermistor 122 that is greater than a predetermined maximum temperature, such that the temperature of the water will adversely affect the concentration of ozone in the water, controller 136 may prevent water treatment device 58 from operating. As such, if water treatment device 58 is activated when the water temperature is equal to or greater than the predetermined maximum temperature, user input 134 may indicate to a user that water treatment device 58 has not been turned on. Additionally, due to the inverse relationship between ozone concentration and temperature of the water, water treatment device 58 is positioned downstream of valve assembly 20. More particularly, if an ozone production device is positioned within hot and cold inlet tubes 26, 28, the water would not yet be mixed in valve assembly 20 and the concentration of ozone in the hot water may be diminished relative to the concentration of ozone in the cold water. By positioning water treatment device 58 downstream from valve assembly 20, the concentration of ozone in the water may be more uniform and the effectiveness of water treatment device 58 may increase. Further, turbine 126 of flow rate sensor assembly 124 helps mix hot and cold water and is, therefore, upstream of thermistor 122.

Similarly, and as shown in FIGS. 2 and 5-7, the flow rate of the water may affect the concentration of ozone in the water, and therefore, the effectiveness of water treatment device 58. More particularly, when the flow rate of the water is low, undesirable off-gassing may occur. Additionally, when the flow rate of the water is high, the concentration of the ozone in the water may be adversely affected (i.e., too low), thereby also decreasing the effectiveness of water treatment device 58. As such, in certain illustrative embodiments, controller 136 may be operably coupled to flow rate sensor assembly 124 and water treatment device 58 in order to proportionally adjust the ozone output relative to the flow rate. Furthermore, the flow rate may be correlated to the volume of water requested and/or the capacity of faucet 10 and water treatment device 58.

Turbine 126 of flow rate sensor assembly 124 may be positioned within inlet waterway 64 of water treatment housing 54 and aligned with Hall-Effect sensor 128, which is external to inlet waterway 64. More particularly, Hall-Effect sensor 128 is positioned intermediate inlet waterway 64 and circuit board 56. Additionally, flow rate sensor assembly 124 may be adjacent to and downstream from filter 112. Flow rate sensor assembly 124 is positioned upstream to valve cavity 76 and treatment cavity 84 in order to monitor the flow rate of the water before entering treatment cavity 84.

During operation, when water flows through inlet waterway 64 of water treatment housing 54, flow rate sensor assembly 124 monitors the flow rate of the water and electrically communicates a signal to controller 136. More particularly, turbine 126 facilitates mixing of the hot and cold water entering water treatment housing 54 by rotating as the water passes through. Hall-Effect sensor 128 detects the number of rotations made by turbine 126 during a predetermined time period and transmits a signal to controller 136 indicative thereof. Controller 136 is configured to equate the number of rotations of turbine 126 to a particular flow rate of the water. When the flow rate of the water is within a desired operating range, for example between 0.01-2.5 gallons/minute, water treatment device 58 will not operate. For example, if water treatment device 58 is turned on while the flow rate is lower than the predetermined minimum rate (e.g., 0.01 gallons/minute), controller 136 prevents water treatment device 58 from operating. Similarly, if ozone generator is turned on while the flow rate is greater than the predetermined maximum rate (e.g., 2.5 gallons/minute), controller 136 also prevents water treatment device 58 from operating. Alternatively, the maximum flow rate may be controlled by a flow restrictor, for example flow restrictor 200 (FIG. 17A), which maintains the flow rate at or below the predetermined maximum flow rate. If the flow rate is not within the operating range, user input 134 may indicate to a user that water treatment device 58 has not been activated. Also, it may be understood that water treatment device 58 will not operate if electrically operable valve 60 is not operating.

In alternative embodiments, controller 136 may be configured to control operation of water treatment device 58 to proportionally increase or decrease the production of ozone relative to the flow rate and/or the temperature of the water. In particular, pill 59 of water treatment device 58 may be operated by controller 136 to optimize the production of ozone such that the concentration of ozone absorbed into the water also is optimized based upon the detected flow rate and temperature of the water.

The flow modes of the water at outlet 2, or variations thereof, also may affect the concentration of ozone in the water. More particularly, the turbulence of the water is inversely related to the concentration of ozone in the water. As the turbulence of the water increases, the concentration of ozone in the water may decrease. As detailed above, the stream mode produces a more laminar, less turbulent flow of water at outlet 2 when compared to the spray mode. Additionally, the water is less turbulent when the aerator produces a laminar stream. As such, mode sensor 120 may send a signal to controller 136 to prevent water treatment device 58 from operating when spray head 15 is in a spray mode, when the aerator is in an aerated mode, or in another mode that may increase the turbulence of the water. If water treatment device 58 is turned on when spray head 15 is in the spray mode, for example, controller 136 will prevent water treatment device 58 from operating and user input 134 may indicate to a user that water treatment device 58 has not been activated.

Furthermore, it may be appreciated that water treatment device 58 is positioned in an unrestricted portion of waterway assembly 24. For example, filter 112, flow rate assembly 124, and electrically operable valve 60 may restrict water flow or narrow water passageway 110, which may increase the turbulence of the water. However, water treatment device 58 is positioned downstream of filter 112, flow rate assembly 124, and electrically operable valve 60, thereby ensuring that the turbulence in the water is minimized before the water enters water treatment device 58. Additionally, ozone in the water may adversely affect components of faucet 10, for example valve disc 82. In particular, ozone may erode the material comprising valve disc 82. Therefore, by positioning water treatment device 58 downstream from electrically operable valve 60, damage to valve disc 82 and other components of faucet 10 may be minimized.

Additionally, power sensor 140 is illustratively in electrical communication with controller 136 and wires 92 of water treatment device 58 (FIG. 7). As such, power sensor 140 monitors the power (e.g., electric current) supplied to water treatment device 58 because the current flowing through pill 59 is proportional to the concentration of ozone produced by water treatment device 58. More particularly, if the current is lower than a predetermined amount, no ozone may be produced by water treatment device 58. As detailed above, a low concentration of ozone decreases the effectiveness of water treatment device 58. Therefore, if water treatment device 58 is turned on when the current supplied to water treatment device 58 is below a predetermined minimum level, controller 136 will prevent water treatment device 58 from operating. User input 134 may indicate to a user that water treatment device 58 has not been activated. For example, if external power supply 146 loses power, no current is supplied to water treatment device 58, and controller 136 prevents water treatment device 58 from operating.

Controller 136 also may communicate with a secondary or back-up power source, illustratively battery 130, coupled to cover 52 and electrically coupled to electrically operable valve 60. More particularly, if external power supply 146 loses power, electrically operable valve 60 may be prevented from operating. However, battery 130 or other secondary power system may provide electricity to electrically operable valve 60 in the event of a power loss. Battery 130 is illustratively a qV battery that is coupled to lower surface 72 of cover 52. More particularly, lower surface 72 of cover 52 includes a cover 132 extending downwardly therefrom and generally surrounding battery 130. The illustrative embodiment of cover 132 includes a first side 132*a* and a second side 132*b* that are coupled together to form cover 132 around battery 130. However, cover 132 may be constructed as a single piece that is configured to receive battery 130. Illustrative battery 130 is not coupled to water treatment device 58 and, therefore, may not supply power to water treatment device 58. As such, water treatment device 58 will not operate during a power loss even when electrically operable valve 60 is operating via battery 130 and water is flowing from outlet 2.

As detailed herein, and with reference to FIG. 7, controller 136 monitors and controls the operation of water treatment device 58. More particularly, controller 136 receives input signals from at least thermistor 122, flow rate sensor assembly 124, mode sensor 120, and power sensor 140 in order to determine when, and if, water treatment device 58 may be prevented from operating. For example, when the temperature of the water is greater than a predetermined maximum, when the flow rate of the water is not within the operating range, when the flow mode at outlet 2 is defines a spray mode, and when no power is supplied to water treatment device 58, controller 136 will output a signal to prevent water treatment device 58 from operating. Controller 136 also may be in electrical communication with quality sensor 144.

Referring to FIGS. 1, 3, 4A, 4B, and 7, in use, hot and cold water flows from hot and cold water supplies 6, 8, through hot and cold inlet tubes 26, 28, to valve assembly 20 of faucet 10. The water mixes in valve assembly 20 and flows downward through first portion 30*a* of outlet tube 30 toward water treatment housing 54. The water enters inlet waterway 64 of water treatment housing 54 flowing through filter 112 and turbine 126 of flow rate sensor assembly 124, and flowing past thermistor 122. The water bends at a generally right angle to enter valve cavity 76. Electrically operable valve 60 is operated and the water pressure pushes valve member 82 toward plunger 80, thereby allowing water to flow through valve cavity 76 and openings 108 in wall 106 toward treatment cavity 84.

Water enters treatment cavity 84 and a portion of the water 150A (FIG. 4A) side streams, or bypasses water treatment device 58, and a portion of the water 150B (FIG. 4A) enters channels 118*a*, 118*b* of water treatment device 58. The water flows from treatment cavity 84 and bends at a generally right angle to flow downwardly toward outlet waterway 66 of water treatment housing 54. The water 150A, 150B leaving treatment cavity 84 flows in a reverse direction relative to the water entering treatment cavity 84. The water continues to flow through second portion 30*b* of outlet tube 30 toward spray head 15 and outlet 2. The water at outlet 2 may be a spray, a stream, or aerated, depending on the mode selected.

Referring to FIG. 4A, as water flows through water treatment housing 54, flow rate sensor assembly 124 and thermistor 122 may each electrically communicate a signal to controller 136 indicative of the respective flow rate and temperature of the water. Additionally, controller 136 may receive a signal from mode sensor 120 indicative of the flow mode of the water. If water treatment device 58 is not operating (i.e., user input 134 or capacitive sensor 138 was not activated and no signal was sent to controller 136 to activate water treatment device 58), no ozone is generated as water flows through channels 118*a*, 118*b* of water treatment device 58. The side streaming water then mixes with the water exiting channels 118*a*, 118*b* and combines to flow toward outlet waterway 66, through outlet tube 30, and toward spray head 15 and outlet 2.

However, if user input 134 or capacitive sensor 138 sends a signal to controller 136 indicating that ozone generation is requested, controller 136 determines if the flow rate is within the operating range and, likewise, if a temperature of the water is below a predetermined maximum temperature. Additionally, controller 136 determines if the flow mode of the water defines a stream and if power is available for water treatment device 58. If the flow rate is within the operating range, the temperature of the water is below the predetermined maximum temperature, the flow mode is a stream, and power is available, controller 136 will activate water treatment device 58. As such, and with reference to FIG. 4A, power is supplied to water treatment device 58, in particular to pill 59, in order to produce ozone as the water flows through water treatment device 58. Pill 59 mixes ozone into the water in channels 118*a*, 118*b*. The ozone-treated water mixes with the side streaming water flowing around sleeve 90 water in second portion 30*b* of outlet tube 30 to deliver water to outlet 2.

Conversely, if controller 136 determines that the temperature of the water is greater than the predetermined temperature, that the flow rate is not within the operating range, that the water at outlet 2 is in the spray mode, or that insufficient power is available to water treatment device 58, controller 136 prevents water treatment device 58 from operating. User input 134 may indicate that water treatment device 58 is not operating. As such, water flowing through channels 118*a*, 118*b* of water treatment device 58 is not treated with ozone.

As shown in FIG. 4B, when faucet 10 is turned off, electrically operable valve 60 does not operate and no power is supplied to electrically operable valve 60. As such, valve member 82 seals against valve seat 83 to prevent water from entering valve cavity 76. When electrically operable valve 60 is not operating, water may not flow through outlet tube 30 or spray head 15 and water treatment device 58 is not activated.

With reference to FIGS. 2 and 3, to service or replace water treatment device 58, cap 98 is removed from first end 96 of treatment cavity 84. Sleeve 90, including water treatment device 58 positioned therein, may be slidably removed from treatment cavity 84 along longitudinal axis C. As such, sleeve 90 allows water treatment device 58 to be removed from water treatment housing 54 without accessing the interior of cover 52. Similarly, water treatment device 58 and sleeve 90 may be coupled to water treatment housing 54 by sliding sleeve 90 along longitudinal axis 1 and coupling cap 98 to first end 96 of treatment cavity 84.

Referring next to FIGS. 8-13, another illustrative embodiment faucet 10' is shown. Faucet 10' of FIGS. 8-13 includes features similar to those of faucet 10 of FIGS. 1-7, with like reference numerals indicating like elements, except as described below. Similar to faucet 10, illustrative faucet 10' includes spout body 12, hub 14, spray head 15, valve assembly 20, a waterway assembly 24', mounting assembly 35, a water treatment assembly 50', and controller 136 (FIG. 7). In operation, faucet 10' receives water from hot and cold water supplies 6 and 8, respectively, and selectively mixes the incoming water in valve body 32 to provide water to outlet 2 at spray head 15. Faucet 10' may be mounted to sink deck 5 with mounting assembly 35 and is arranged to direct water from outlet 2 into sink basin 1, for example. Water treatment assembly 50' may be easily added to faucet 10' without disrupting the configuration of other components of faucet 10'.

Figure 8:
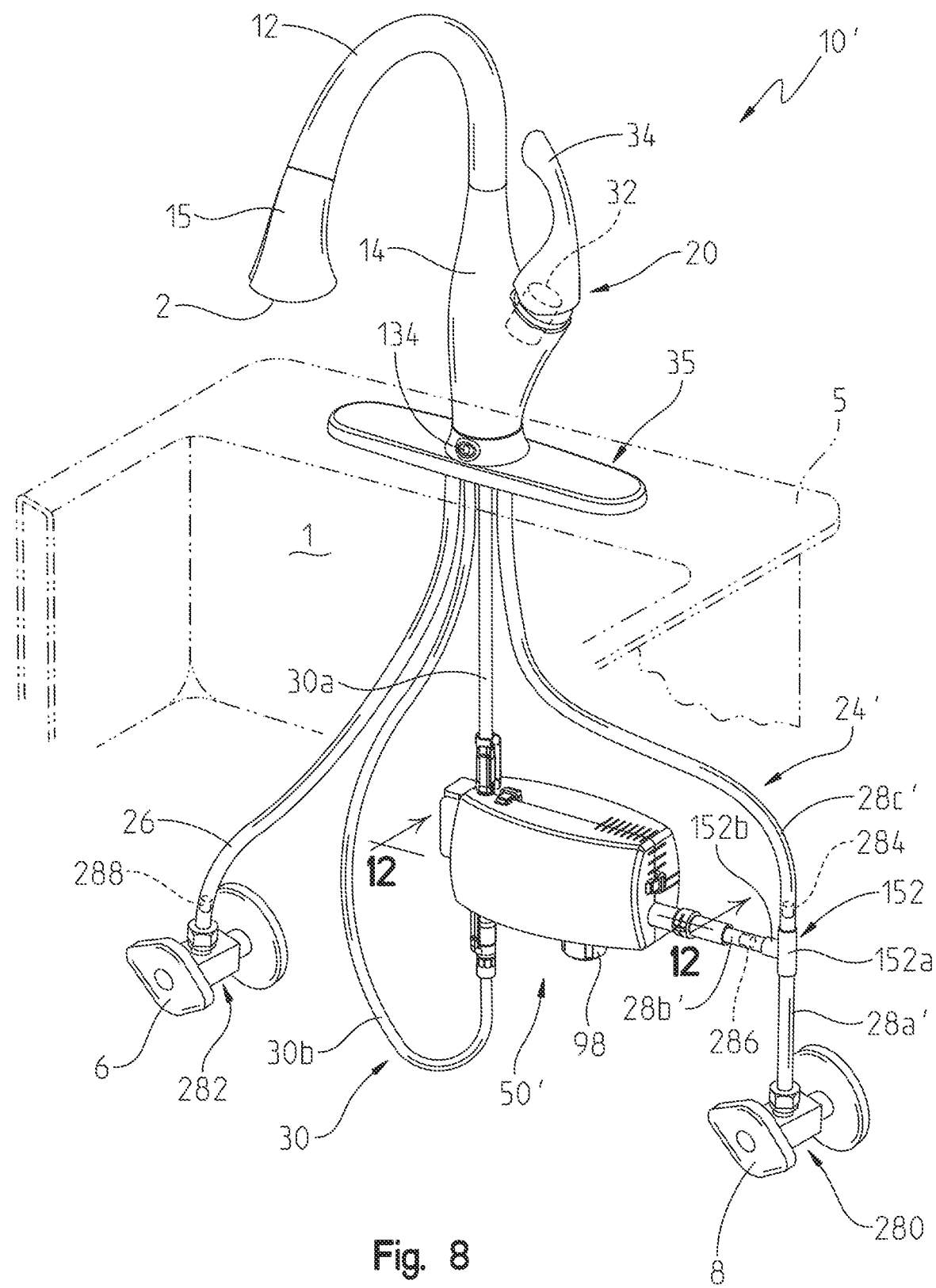
FIG. 8 is a perspective view of an alternative embodiment faucet of the present disclosure.
Figure 17A:
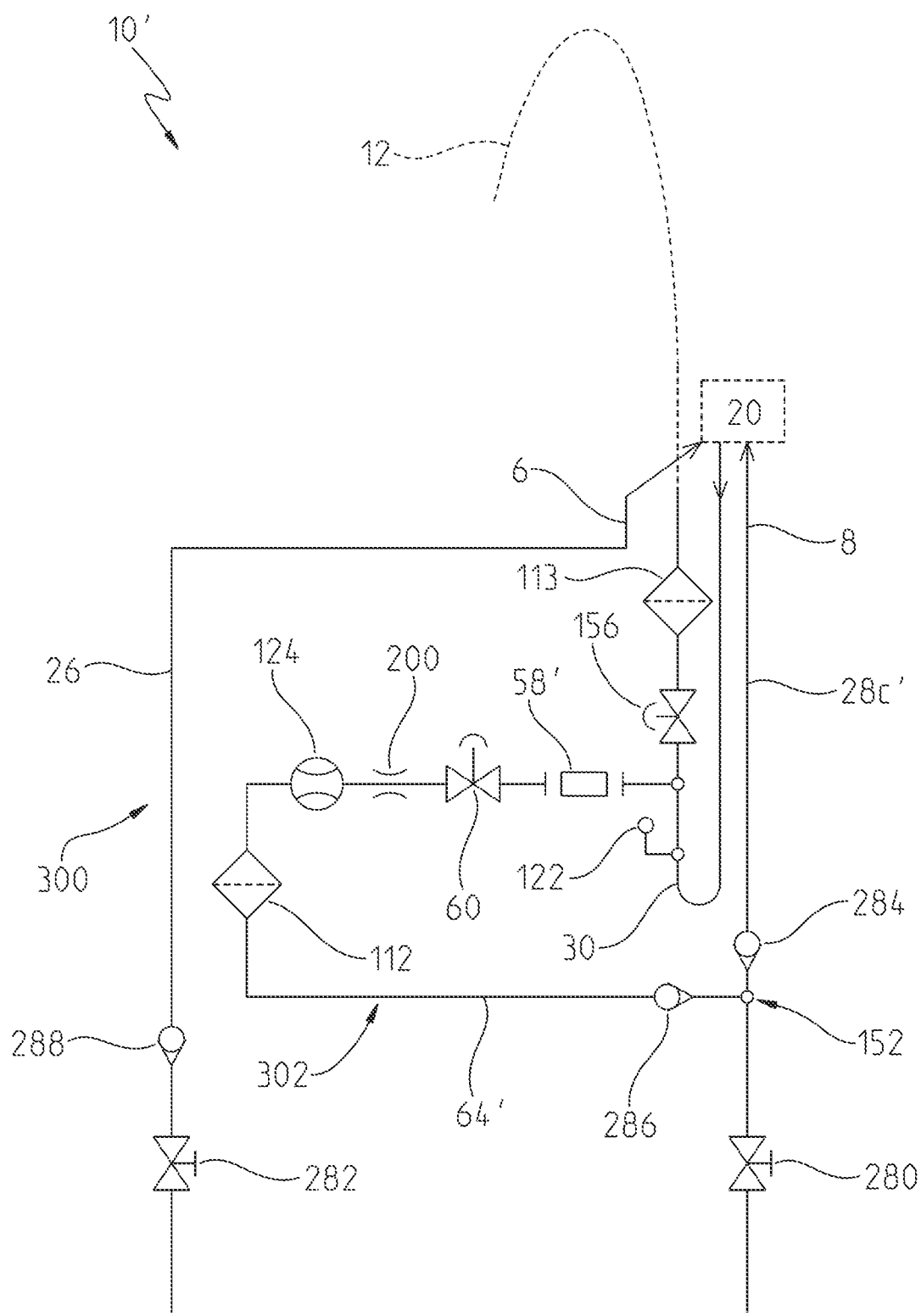
FIG. 17A is a schematic view of the illustrative water treatment assembly of FIG. 10.
Figure 17B:
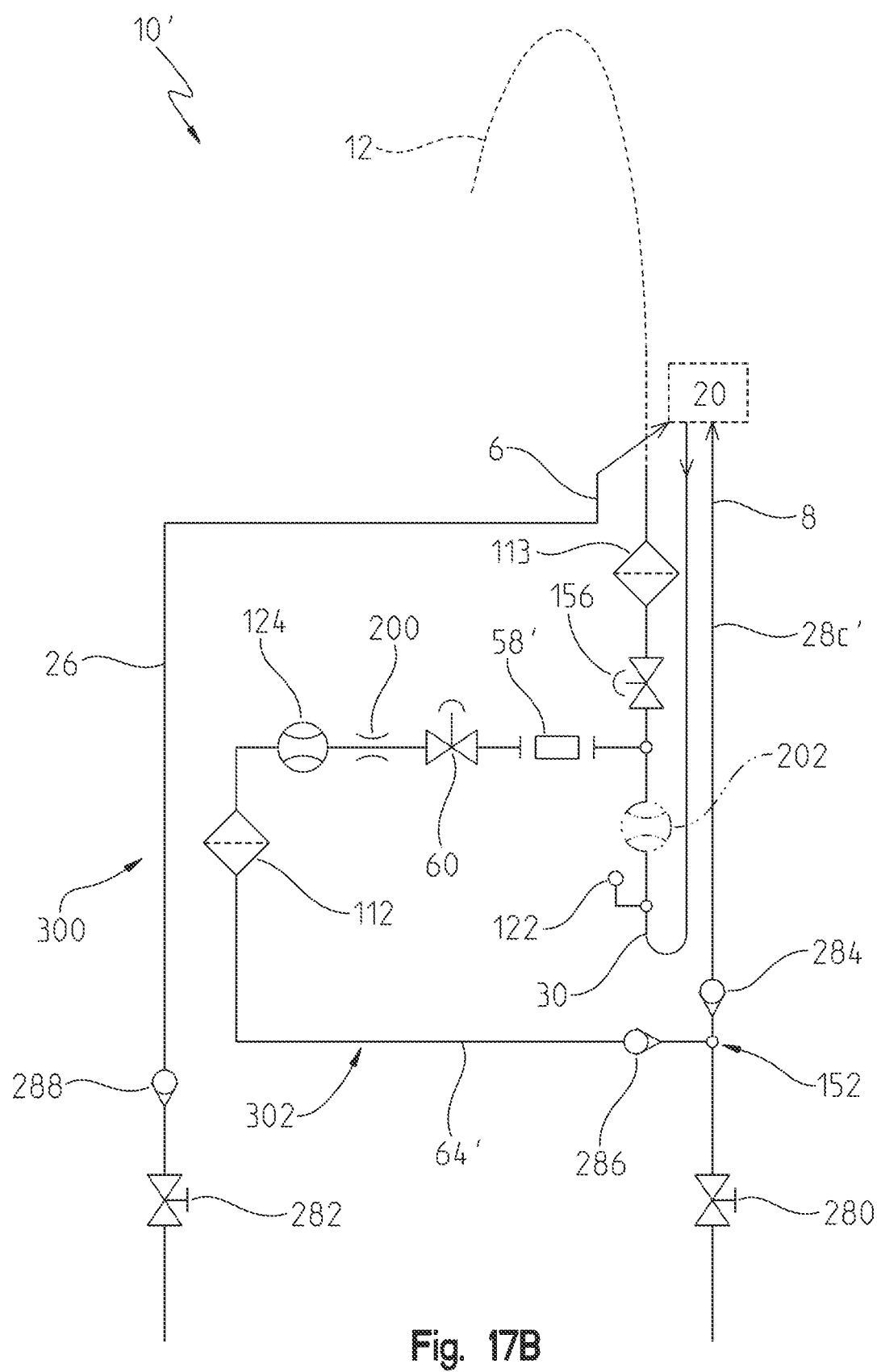
FIG. 17B is a schematic view of an alternative embodiment of the water treatment assembly of FIG. 17A.

With reference to FIG. 8, illustrative waterway assembly 24' of faucet 10' includes hot water inlet tube 26 fluidly coupled to a stop valve 282 (FIGS. 17A and 17B), a cold water inlet tube 28' fluidly coupled to a stop valve 280 (FIGS. 17A and 17B), and outlet tube 30. Hot and cold water inlet tubes 26, 28' of waterway assembly 24' are fluidly coupled to hot and cold water supplies 6, 8, respectively, for receiving water into faucet 10'. Hot water inlet tube 26 may include a check valve 288 (FIGS. 17A and 17B). Cold water inlet tube 28' includes a first portion 28*a'*, a second portion 28*b'*, and a third portion 28*c'*. Cold water inlet tube 28' also includes a multi-directional flow member, illustratively a T-member 152. T-member 152 includes a first portion 152*a* extending in an illustratively vertical direction and a second portion 152*b* extending generally perpendicularly from first portion 152*a*. First portion 28*a'* of cold water inlet tube 28' extends between cold water supply 8 and a bottom end of first portion 152*a* of T-member 150. Third portion 28*c'* of cold water inlet tube 28' may include a check valve 284 (FIGS. 17A and 17B) and is fluidly coupled to valve assembly 20 and a top end of first portion 152*a* of T-member 150. Both top and bottom ends of first portion 152*a* may include sealing members (not shown) for preventing water leaks between T-member 152 and cold water inlet tube 28'.

Second portion 28*b'* of cold water inlet tube 28' may include a check valve 286 (FIGS. 17A and 17B) and is fluidly coupled to water treatment assembly 50' and second portion 152*b* of T-member 152. Second portion 152*b* of T-member 152 may include sealing members (not shown) for preventing water leaks between T-member 152 and cold water inlet tube 28'.

Illustratively, outlet tube 30 includes first portion 30*a* and second portion 30*b*. Both first and second portions 30*a*, 30*b* of outlet tube 30 are fluidly coupled to water treatment assembly 50'. More particularly, first portion 30*a* extends between valve assembly 20 and a water treatment housing 54' of water treatment assembly 50'. Second portion 30*b* extends below water treatment housing 54' and bends upwardly to pass through spout body 12 in order to couple with spray head 15 and deliver water from outlet 2.

To limit contact between the water in faucet 10' and metallic components, waterway assembly 24', including inlet tubes 26, 28', outlet tube 30, and T-member 152, may be formed of, or lined with, a flexible, non-metallic material, such as a polymer, illustratively a cross-linkable polymer, as detailed above with respect to waterway assembly 24. As such, waterway assembly 24' is illustratively electrically non-conductive.

Referring to FIG. 8, spray head 15 may be a pull-down spray head, as detailed above, and is fluidly coupled to second portion 30*b* of outlet tube 30. Spray head 15 may be configured to adjust the flow mode of the water at outlet 2. The flow mode of operation may be a spray, a stream, an aerated mode, or any combination thereof, and may include additional flow outlet patterns. Spray head 15 may be mechanically or electrically coupled to mode sensor 120 in order to communicate the flow mode to controller 136. More particularly, mode sensor 120 may be positioned on or within faucet 10 and may include a user input (not shown) to electrically toggle or switch between a stream mode, a spray mode, or other aerated modes, for example. A stream mode may output water from outlet 2 in a laminar, less turbulent manner than a spray mode.

Figure 9:
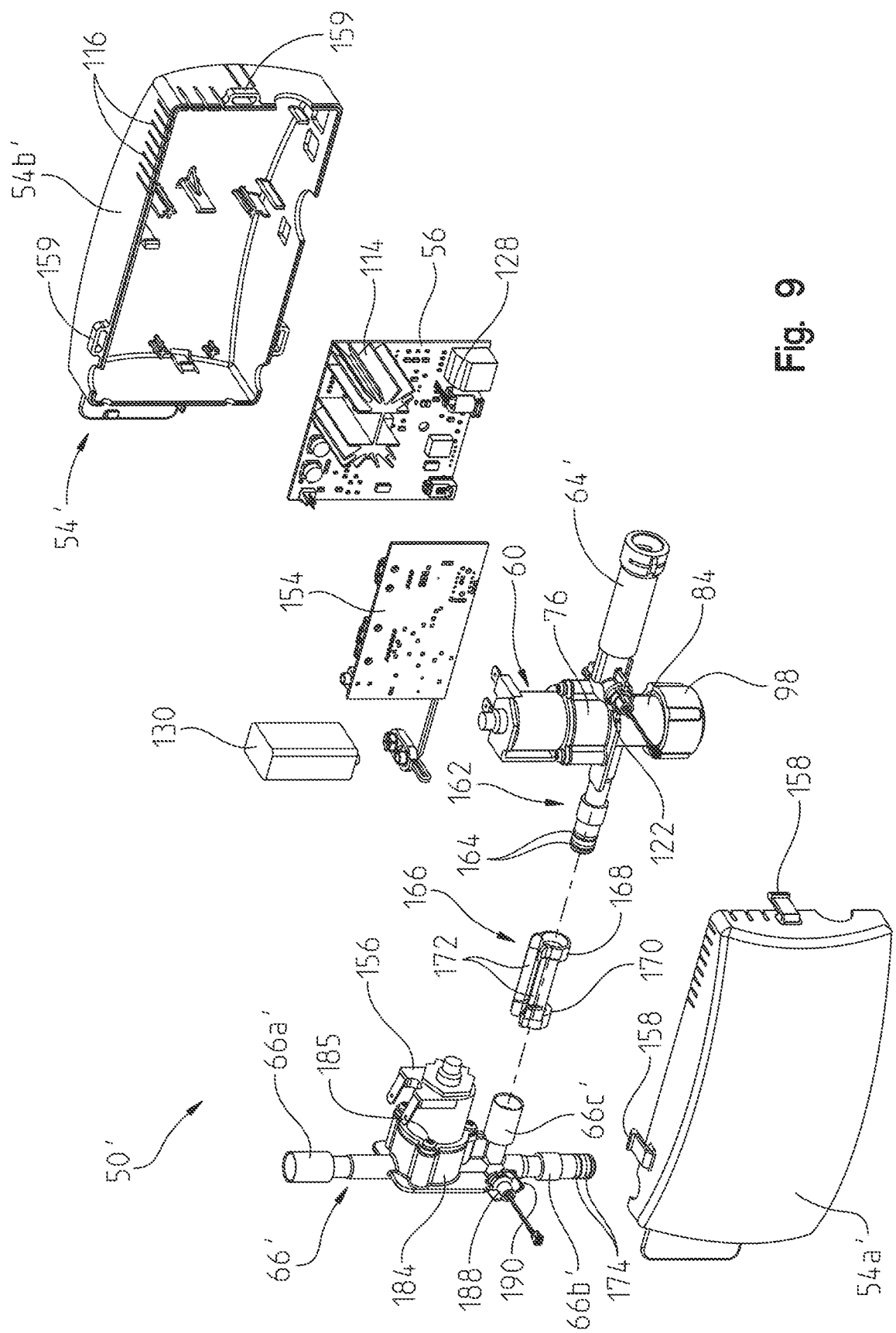
FIG. 9 is an exploded perspective view of an alternative water treatment assembly of the faucet of FIG. 8.
Figure 10:
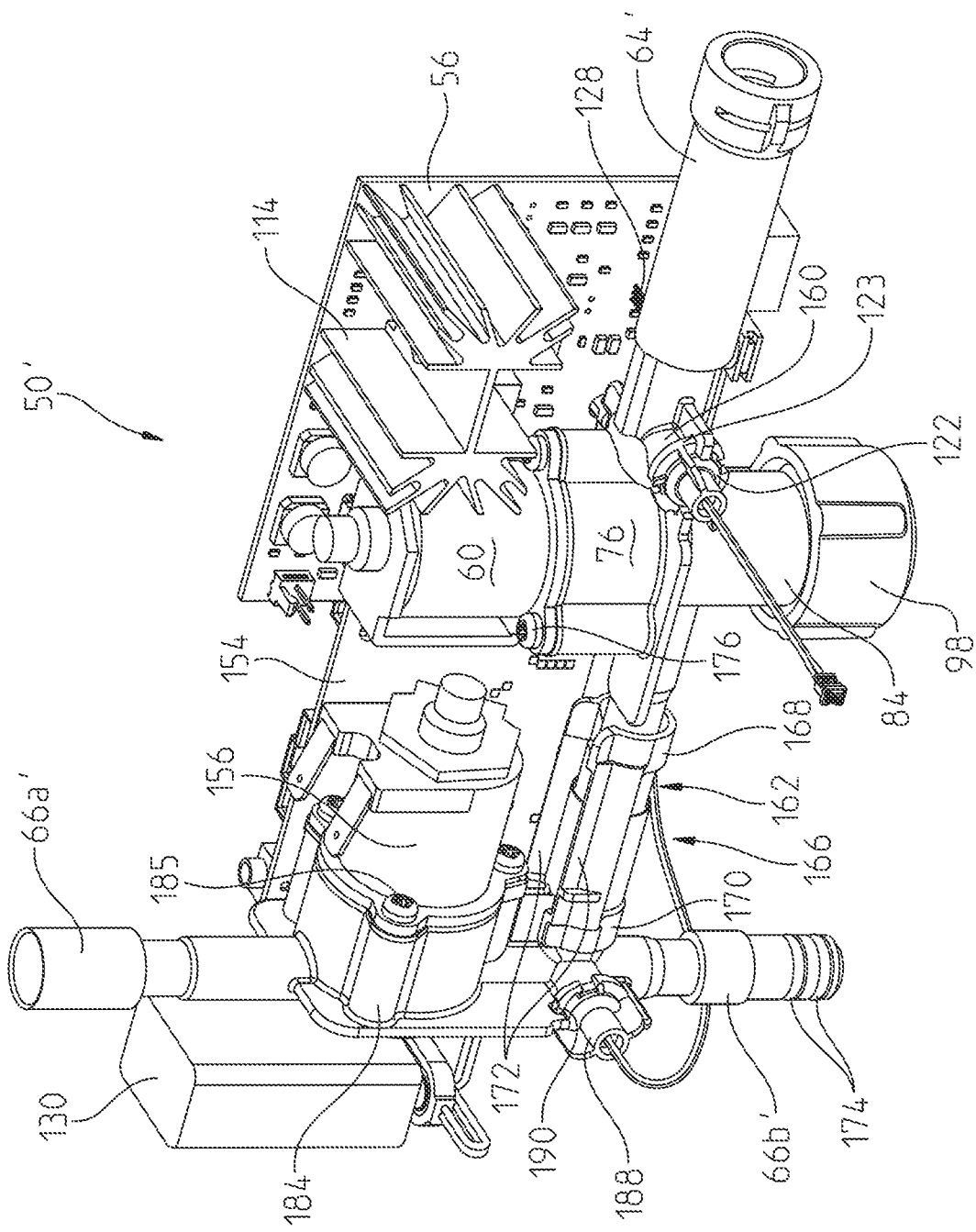
FIG. 10 is a perspective view of the water treatment assembly of FIG. 9.

As shown in FIGS. 9 and 10, water treatment assembly 50' of faucet 10' comprises water treatment housing 54', a first printed circuit board 56, a second printed circuit board 154, water treatment device 58', illustratively an ozone generator, a first electrically operable valve 60, and a second electrically operable valve 156. Water treatment housing 54' includes cover members 54*a'* and 54*b'* which, when coupled together through latches 158 and latch openings 159, generally surround first and second printed circuit boards 56, 154, water treatment device 58', and first and second electrically operable valves 60 and 156. Faucet 10' is configured to operate in either a treatment mode or a non-treatment mode. More particularly, when faucet 10' is in the treatment mode, first electrically operable valve 60, not second electrically operable valve 156, is open. Conversely, when faucet 10' is in the non-treatment mode, second electrically operable valve 156, not first electrically operable valve 60, is open.

Referring to FIGS. 8-11, water treatment assembly 50' further includes an inlet waterway 64' and an outlet waterway 66'. As detailed further below, outlet waterway 66' includes a waterway tube 162 and is fluidly coupled to outlet tube 30. Illustrative inlet waterway 64' may be generally perpendicular to outlet waterway 66' and is fluidly coupled to water treatment device 58' and second portion 28*b'* of cold water inlet tube 28'. Inlet waterway 64' defines a treatment flow path 302 (FIGS. 17A and 17B) in which cold water from cold water supply 8 bypasses second electrically operable valve 156 and flows through water treatment device 58' in order to flow treated water from outlet 2.

As shown in FIG. 11, inlet waterway 64' of water treatment assembly 50' may support filter 112, flow rate sensor assembly 124, thermistor 122, and a pressure-compensating flow restrictor 200 (FIG. 17A). Flow restrictor 200 may be available from Neoperl, Inc. and may be configured to restrict flow at a maximum rate of approximately 0.5 gallons/minute.

Figure 12:
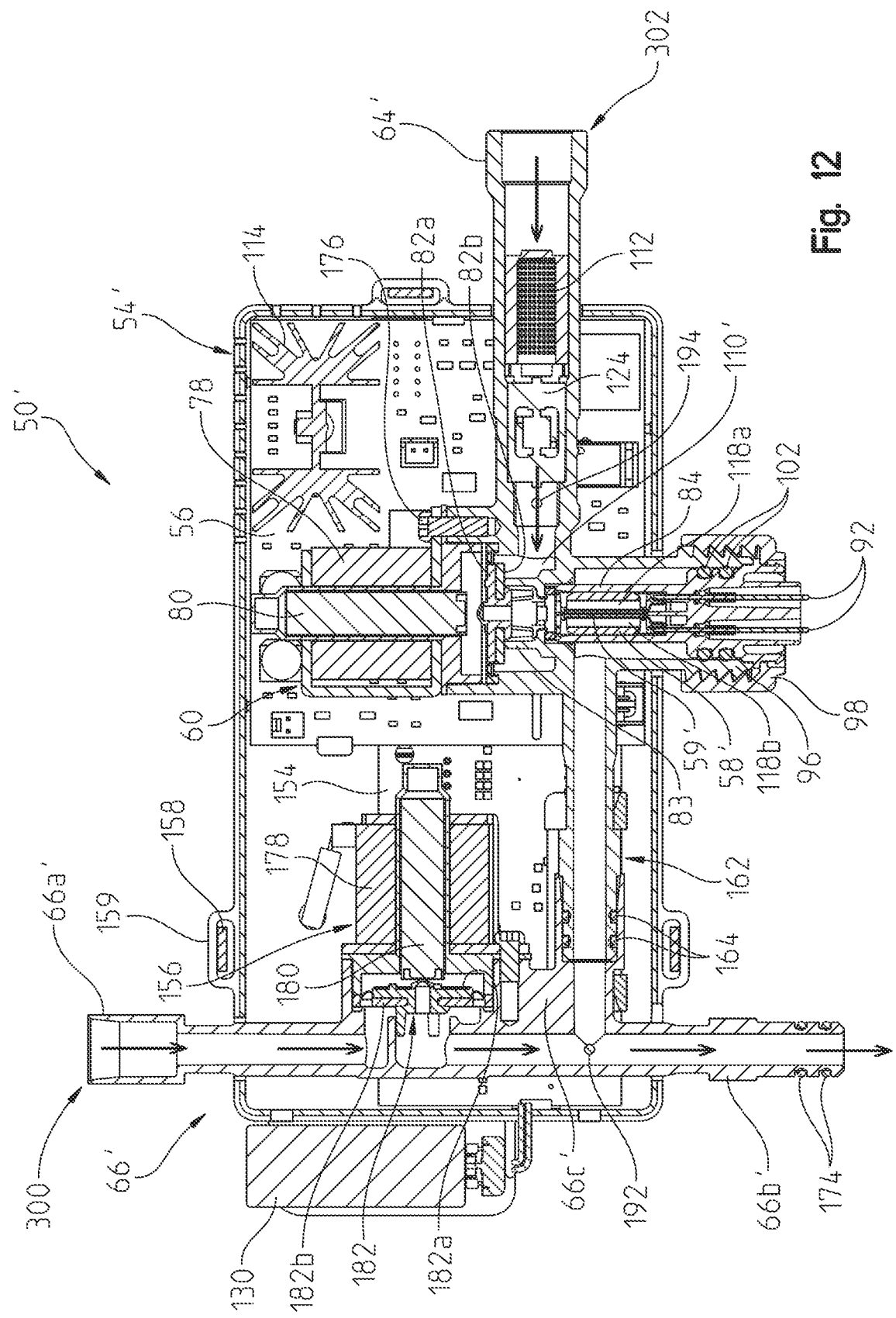
FIG. 12 is a cross-sectional view of the water treatment assembly of FIG. 10, illustrating the flow of water when the faucet is in a non-treatment mode.

Filter 112 may be positioned within inlet waterway 64' of water treatment assembly 50' to remove impurities and other particulate matter from the water. As such, filter 112 may improve the quality of the water. Filter 112 also may increase the uniformity of the water. Additionally, flow rate sensor assembly 124 may be positioned within inlet waterway 64'. Illustratively, flow rate sensor assembly 124 is downstream from filter 112 and includes turbine 126 and Hall-Effect sensor 128 (FIGS. 9 and 10). Thermistor 122 is supported by thermistor retainer 123 and a support member 160 on inlet waterway 64' and is received within an aperture 194 (FIG. 12). Flow rate sensor assembly 124 and thermistor 122 are electrically coupled to controller 136 (FIG. 7). More particularly, flow rate sensor assembly 124 and thermistor 122 are electrically coupled to controller 136 via printed circuit board 56.

Printed circuit board 56 and controller 136 also are electrically coupled to first electrically operable valve 60. Referring to FIGS. 9-11, first electrically operable valve 60 is supported within valve cavity 76 and extends substantially perpendicularly to inlet waterway 64' and waterway tube 162. As shown in FIG. 11, fasteners 176 retain first electrically operable valve 60 within valve cavity 76. First electrically operable valve 60 may be an electromechanical valve, illustratively a solenoid valve, for converting energy into linear motion. As detailed above, first electrically operable valve 60 includes magnetic portion 78, plunger 80, and valve member 82. More particularly, plunger 80 is positioned within magnetic portion 78 and valve member 82 is spaced apart from magnetic portion 78. First side 82a of valve member 82 is comprised of magnetic material (e.g., metal) and second side 82b of valve member 82 is comprised of a non-conductive sealing material (e.g., rubber). First electrically operable valve 60 is electrically coupled to external power supply 146 (e.g., the electrical system of the house, building, or other structure in which faucet 10' is used) (FIG. 7).

Figure 13:
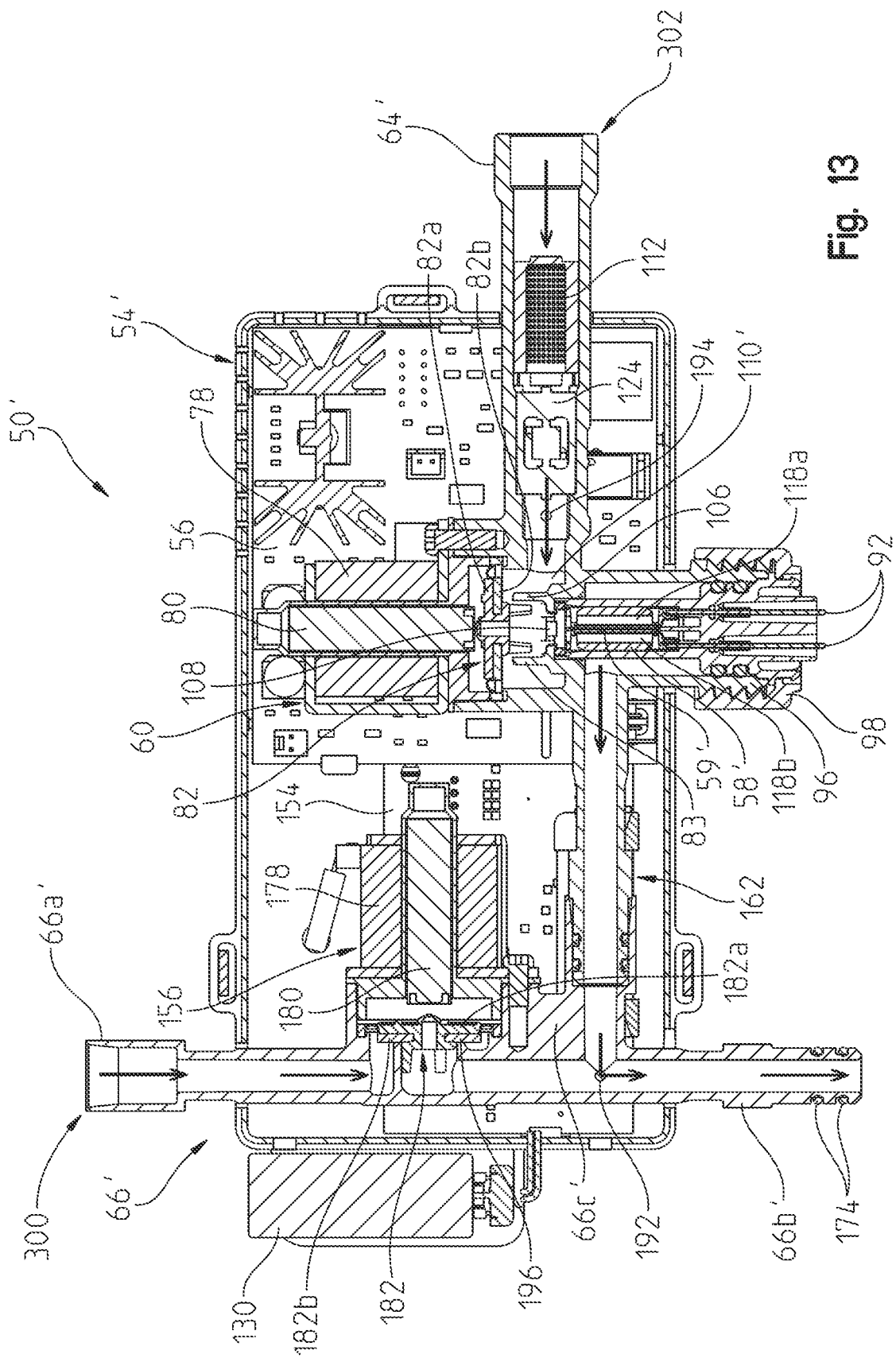
FIG. 13 is a cross-sectional view of the water treatment assembly of FIG. 10, illustrating the flow of water when the faucet is in a treatment mode.

First electrically operably valve 60 further includes a spring mechanism 275 (FIG. 11) within magnetic portion 78 such that plunger 80 is spring-biased toward a closed position. In other words, as shown in FIG. 12, first electrically operable valve 60 is closed when no power is supplied thereto and plunger 80 may extend from magnetic portion 78 in order to contact first side 82a of valve member 82 and push valve member 82 toward valve seat 83 (FIGS. 12 and 13). As such, second side 82b of valve member 82 is sealingly engaged with valve seat 83 to prevent water from flowing into treatment cavity 84.

As shown in FIG. 13, in order to open first electrically operable valve 60, a voltage is applied to magnetic portion 78 to form a magnetic field along plunger 80 when faucet 10' is operating. The magnetic field causes plunger 80 to slide or retract within magnetic portion 78 to open or actuate first electrically operable valve 60. When first electrically operable valve 60 is in the open position, plunger 80 retracts within magnetic portion 78 and compresses spring mechanism 275 (FIG. 11). As such, when first electrically operable valve 60 is operating, plunger 80 is spaced apart from valve member 82, thereby allowing the water pressure of the water in inlet waterway 64' to create a pressure differential in valve cavity 76 and push valve member 82 away from valve seat 83 and toward plunger 80 and magnetic portion 78. During operation, first electrically operable valve 60 may generate heat and, therefore, heat sink 114 may be coupled to circuit board 56 and positioned near first electrically operable valve 60. Cover member 54b' may include slits 116 adjacent heat sink 114 to vent heat produced by first electrically operable valve 60.

As shown in FIG. 13, treatment cavity 84 may be separated from valve cavity 76 by wall 106. More particularly, wall 106 of water treatment housing 54' is positioned intermediate treatment cavity 84 and valve cavity 76. Wall 106 includes openings 108 that regulate and control water flowing between valve cavity 76 and treatment cavity 84. Optionally, a spacer (not shown) having at least one opening or window may be positioned between sleeve 90 and wall 106 in order to further regulate and control the volume of water that flows between valve cavity 76 and treatment cavity 84. As such, openings 108 control and regulate the volume of water that flows through water treatment device 58'.

With reference to FIGS. 9-11, treatment cavity 84 removably supports water treatment device 58' therein. Illustrative water treatment device 58 may be a filter device, an antibacterial device, or any other device configured to treat a fluid within faucet 10'. Antibacterial devices are configured to kill or inhibit the growth of bacteria, for example, in foods or on inanimate surfaces or hands (See http://www.fda.govI-Food/ResourcesForYou/StudentsTeachers/ScienceandThe-FoodSupply/ucm2 15830.htm). Illustratively, antibacterial devices may use chemical treatments (e.g., chlorine), additives, ozone, UV, and other known methods to kill or inhibit growth of bacteria.

Figure 14:
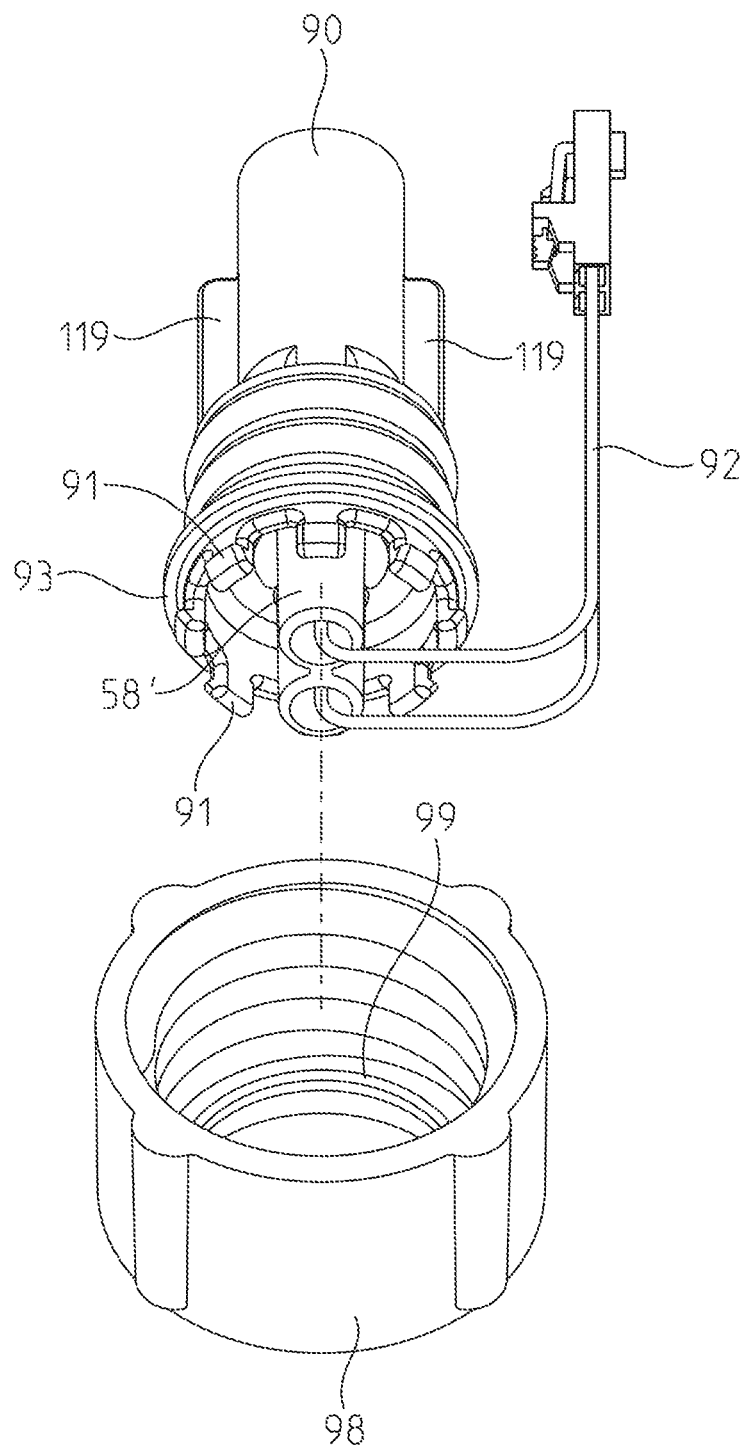
FIG. 14 is an exploded view of a water treatment device and a cap.
Figure 15:
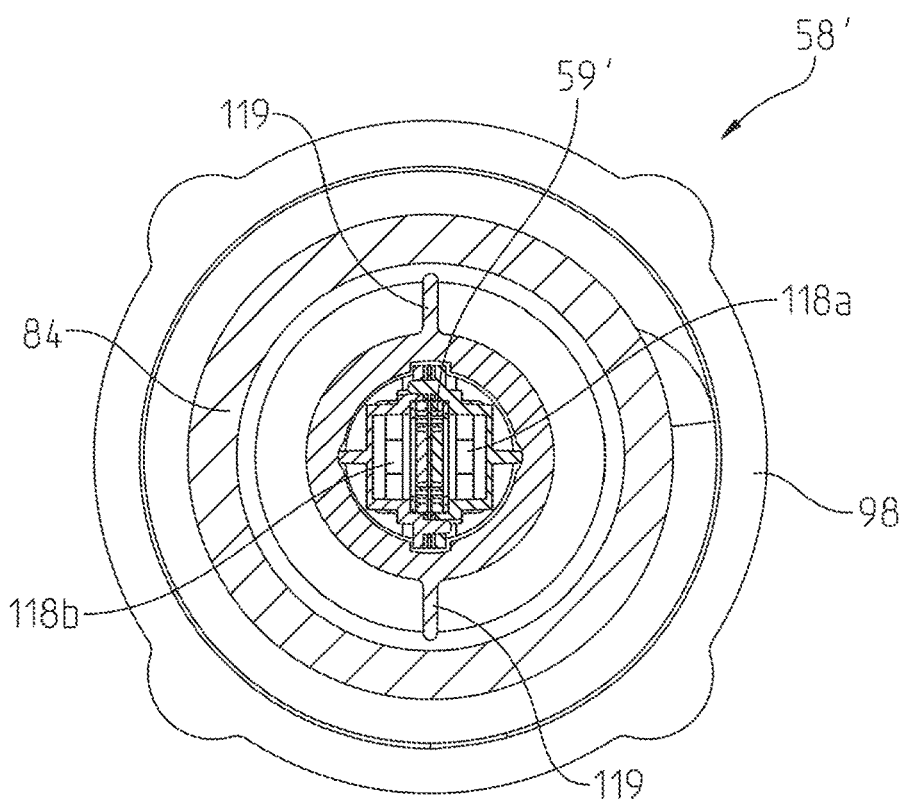
FIG. 15 is a cross-sectional view of the water treatment device of FIG. 14, taken along line 15-15 of FIG. 11.
Figure 16:
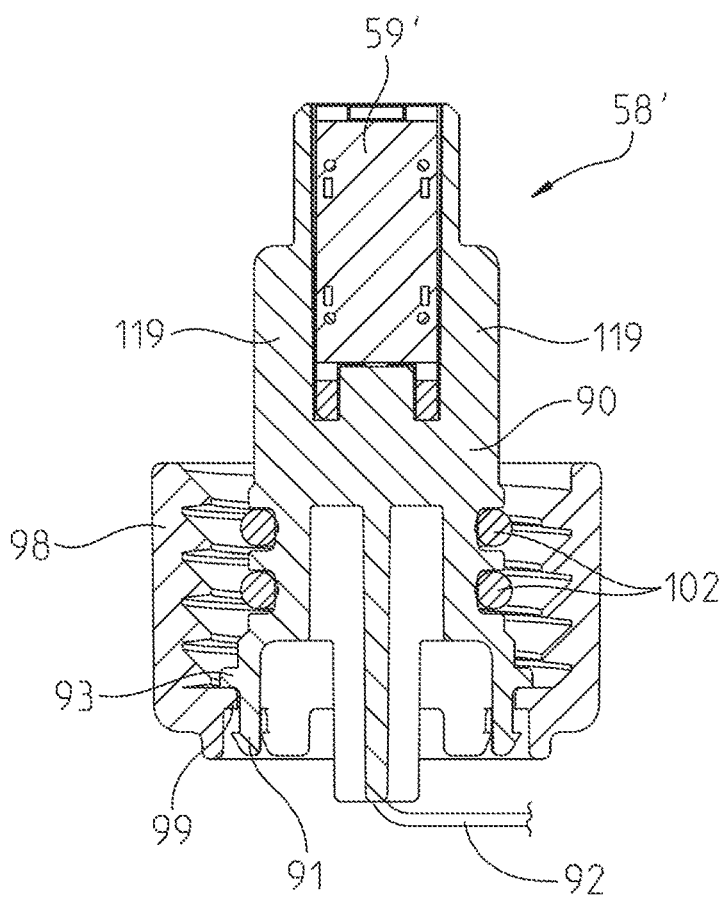
FIG. 16 is a cross-sectional view of the water treatment device and the cap of FIG. 14, taken along line 16-16 of FIG. 11.

Illustratively, water treatment device 58' is an antibacterial ozone generator configured to output ozone into the water. Water treatment device 58' is positioned upstream from outlet tube 30 and is housed within sleeve 90. Threaded end 96 of treatment cavity 84 is threadedly coupled to cap 98 (e.g., a nut) to retain sleeve 90 and water treatment device 58' within treatment cavity 84. More particularly, cap 98 is directly coupled to, or integrally formed with, sleeve 90, such that when cap 98 is removed from water treatment assembly 50', sleeve 90 and water treatment device 58' also are removed from water treatment assembly 50'. For example, FIGS. 14-16 shows that sleeve 90 includes resilient members, illustratively snap fingers 91, and a shoulder 93 to retain cap 98 on sleeve 90. As shown in FIG. 16, a lip 99 of cap 98 is positioned intermediate snap fingers 91 and shoulder 93 of sleeve 90, and cap 98 contacts shoulder 93 when coupled to sleeve 90. Cap 98 is axially retained by snap fingers 91 and shoulder 93 but is free to rotate in order to threadedly couple with treatment cavity 84. Sealing members 102, illustratively o-rings, may be included to seal treatment cavity 84. By coupling cap 98 and water treatment device 58' together via sleeve 90, assembly and serviceability of faucet 10' increases. Additionally, during assembly, cap 98 secures water treatment device 58' within treatment cavity 84. More particularly, water treatment device 58' may be positioned within treatment cavity 84 and, as cap 98 is threaded onto treatment cavity 84, cap 98 presses against snap fingers 91 and contacts shoulder 93. Snap fingers 91 then spring or move outwardly when lip 99 of cap 98 contacts shoulder 93 in order to retain cap 98 on sleeve 90. As cap 98 is further threaded onto treatment cavity 84, sleeve 90 and water treatment device 58' are secured within treatment cavity 84 and move inwardly toward first electrically operable valve 60.

Water treatment device 58' illustratively includes first and second channels 118a and 118b, a pill 59', and electrical wires 92. Illustratively, first and second channels 118a, 118b are substantially parallel to each other and pill 59' may be intermediate channels 118a, 118b. As shown in FIGS. 15 and 16, pill 59' extends in a parallel direction to ribs or dividers 119 on sleeve 90. Ribs 119 separate the treated water flowing from channels 118a and 118b for a longer duration in order to increase the concentration of ozone produced in the water flowing from channels 118a, 118b. For example, the ozonated water flowing from channel 118a mixes with the water flowing in direction 150A (FIG. 4A) but is separated by ribs 119 from the water flowing from channel 118b. As such, ribs 119 may increase the concentration of ozone in the water because the ozone has more time to absorb into the water before the water is mixed and exits treatment cavity 84, as further detailed herein.

Water treatment device 58' is an electrolytic ozone generator configured to produce ozone under pressure; however, water treatment device 58' may be configured to produce ozone through other methods (e.g., corona discharge or "hot spark," plasma, UV). The illustrative embodiment of water treatment device 58' uses an electric current supplied to wires 92 via external power supply (FIG. 7) and transmitted to pill 59' of water treatment device 58' in order to produce ozone. Exemplary water treatment devices 58' may be available from EOI Electrolytic Ozone Inc. or Klaris Corporation Inc. The current supplied to wires 92 is held constant (e.g., 1.25 amps), however, the voltage may be variable (e.g., 14-24 volts). More particularly, by maintaining a constant current, water treatment device 58' receives a constant power input, thereby allowing water treatment device 58' to consistently operate. For example, when water treatment device 58' produces ozone, the fixed current maintains a consistent output of ozone which increases ozone production and, therefore, increases the concentration of ozone in the water. The voltage is variable and fluctuates to supply water treatment device 58' with necessary voltage depending on the requirements of faucet 10'.

Controller 136 (FIG. 7) may be configured to determine when the current supplied to water treatment device 58' is not maintained at the constant, predetermined level (e.g., 1.25 amps). Controller 136 is configured to signal the user that water treatment device 58' is not operating efficiently, for example due to mineral build-up, or should be replaced. For example, controller 136 may be configured to flash red and white lights on user input 134 and prevent water treatment device 58' from operating when it is necessary to replace water treatment device 58' and/or when water treatment device 58 is not efficiently producing ozonated or ozone-treated water. If water treatment device 58' is not operating efficiently, controller 136 also may be configured to reverse or flip the current in order to clean water treatment device 58'. Additionally, controller 136 also may indicate to a user that water treatment device 58' should be replaced. Exemplary water treatment device 58' may be configured to have a service life of at least approximately two years when typically operating approximately 10 minutes/day.

Because water treatment device 58' is positioned under sink deck 5, sufficient time is permitted for the ozone to be absorbed by the water in second portion 30b of outlet tube 30 before the ozone-treated water is delivered from outlet 2. For example, outlet tube 30 may be approximately 36 inches in length in order to allow the ozone to be sufficiently dissolved or absorbed in the water before reaching outlet 2. As such, the ozone concentration may increase as water flows toward outlet 2 in second portion 30b of outlet tube 30. Additionally, faucet 10' may include an aspirator (not shown) to facilitate the treatment of the water.

When water is configured to flow through water treatment device 58', as shown in FIG. 13, water flows in a water passageway 110' which includes valve cavity 76, treatment cavity 84, and channels 118a, 118b. Water passageway 110' extends between inlet waterway 64' and outlet waterway 66' and between valve cavity 76 and treatment cavity 84. Illustrative water passageway 110' has a generally serpentine shape in order to condense water passageway 110'. More particularly, water passageway 110' is substantially horizontal through inlet waterway 64' and includes a substantially right-angle bend as water flows in a substantially vertical direction between valve cavity 76 and treatment cavity 84. Illustratively, water passageway 110' extends between valve cavity 76, through openings 108 in wall 106, and into treatment cavity 84. Water passageway 110' includes another substantially right-angle bend in treatment cavity 84 and extends toward waterway tube 162. The configuration of water passageway 110' also increases the flow path of the water through water treatment device 58' which may increase the amount of ozone absorbed into the water.

As water flows in water passageway 110' between valve cavity 76 and treatment cavity 84, water is separated such that a portion of the water flows through water treatment device 58' and a portion of the water side streams through channels 118a, 118b. The side streaming water is illustratively denoted by arrows 150A (FIG. 4A) and as such, bypasses water treatment device 58'. The side streaming water 150A may minimize the pressure drop within water treatment housing 54'. The water flowing through water treatment device 58' is illustratively denoted by arrows 150B (FIG. 4A) and may be treated, for example with ozone. As shown in FIG. 4A, arrows 150A and 150B indicate that the treated water flowing through water treatment device 58' (FIG. 13) is generally coaxial with the non-treated water flowing around water treatment device 58'. As such, when faucet 10' is in the treatment mode, treated and non-treated water simultaneously flow in a generally coaxial arrangement through treatment cavity 84. Water treatment device 58' is configured to produce ozone (O3) from the water flowing in the direction of arrows 150B (i.e., flowing through water treatment device 58'). By separating channels 118a and 118b with ribs 119 on pill 59', oxygen may be separated from hydrogen from a longer duration of time in treatment cavity 84 and may be better able to form ozone. Therefore, the configuration and structure of pill 59' may increase the concentration of ozone produced by water treatment device 58'.

Referring to FIGS. 9, 10, and 12, water treatment device 58' is fluidly coupled to outlet waterway 66' of water treatment assembly 50' through waterway tube 162. Outlet waterway 66' also is fluidly coupled to outlet tube 30 and, more particularly, first portion 30a of outlet tube 30 is coupled to a first end 66a' of outlet waterway 66' to define a non-treatment flow path 300 (FIGS. 17A and 17B) in which the user may control the temperature, flow rate, and other properties of the water via handle 34 and the water flowing to outlet 2 bypasses water treatment device 58'. Outlet waterway 66' further includes a second end 66b' which is fluidly coupled to second portion 30b of outlet tube 30. First and second ends 66a' and 66b' may include sealing members 174, illustratively o-rings, for preventing water leaks between outlet waterway 66' and outlet tube 30. As shown in FIGS. 12 and 13, outlet waterway 66' supports a temperature sensor, illustratively a thermistor 188 and a thermistor retainer 190. Thermistor 188 is received within an aperture 192 in outlet waterway 66'. Illustratively, thermistor 188 is downstream from second electrically operable valve 156 and is configured to electrically communicate with controller 136 in order to determine the temperature of the water.

Outlet waterway 66' further includes a third end 66c' which is configured to receive waterway tube 162. Waterway tube 162 extends between first electrically operable valve 60 and outlet waterway 66'. Waterway tube 162 may include sealing members 164, illustratively o-rings, for preventing water leaks between waterway tube 162 and third end 66c' of outlet waterway 66'. Waterway tube 162 is supported by a channel member 166, which includes a first end 168 adjacent treatment cavity 84 and a second end 170 adjacent third end 66c' of outlet waterway 66'. Channel member 166 further includes tabs 172 for assembling or disassembling channel member 166 with waterway tube 162.

Outlet waterway 66' also supports second electrically operable valve 156. Similar to first electrically operable valve 60, second electrically operable valve 156 includes a magnetic portion 178, a plunger 180, and a valve member 182 having a first side 182a comprised of a magnetic material and a second side 182b comprised of a non-conductive sealing material, as shown in FIGS. 12 and 13. Second electrically operable valve is supported within a valve cavity 184 and is retained therein with fasteners 185. Second electrically operable valve 156 is configured to move between an open position and a closed position. A spring mechanism (not shown) similar to spring mechanism 275 (FIG. 11) may be included to bias plunger 180 toward valve member 182 such that plunger 180 contacts first side 182a of valve member 182. As such, second electrically operable valve 156 is biased in the closed position. In other words, as shown in FIG. 13, second electrically operable valve 156 is closed when no power is supplied thereto and plunger 180 may extend from magnetic portion 178 in order to contact first side 182a of valve member 182 and push valve member 182 toward a valve seat 196 (FIGS. 12 and 13). As such, second side 182b of valve member 182 is sealingly engaged with valve seat 196 to prevent water from flowing into second portion 30b of outlet tube 30.

As shown in FIG. 12, in order to open second electrically operable valve 156, a voltage is applied to magnetic portion 178 to form a magnetic field along plunger 180 when faucet 10' is operating. The magnetic field causes plunger 180 to slide or retract within magnetic portion 178 in order to open or actuate second electrically operable valve 156. When second electrically operable valve 156 is in the open position, plunger 180 retracts within magnetic portion 178 and compresses spring mechanism 275 (FIG. 11). As such, when second electrically operable valve 156 is operating, plunger 180 is spaced apart from valve member 182, thereby allowing the water pressure of the water in first end 66a' of outlet waterway 66' to create a pressure differential in valve cavity 184 and push valve member 182 away from valve seat 196 and toward plunger 180 and magnetic portion 178. As such, water from valve assembly 20 flows through second electrically operable valve 156 and into second portion 30b of outlet tube 30. Water in second portion 30b is dispensed from faucet 10' at outlet 2 and is not treated by water treatment device 58'.

However, when a user desires to dispense treated water, for example ozonated water, from faucet 10', second electrically operable valve 156 is closed and water only flows through first electrically operable valve 60. When faucet 10' is configured to flow water through water treatment device 58', the ozone-treated water at outlet 2 is preferably used as an antibacterial agent for disinfecting or cleaning applications or purposes. Additionally, the ozone-treated water may be used to disinfect drinking water. More particularly, until the ozone dissolved in the water is destroyed or otherwise destructed, the ozone in the water actively kills or inhibits growth of bacteria in the water. Alternatively, if the ozone dissolved in the water is destroyed, the ozone-treated water remains disinfected or clean, however, the ozone in the water no longer actively kills or inhibits growth of bacteria.

Outlet waterway 66' may further include filter 113 (FIGS. 17A and 17B). For example, filter 113 may be supported at second end 66b' and downstream from second electrically operable valve 156 and water treatment device 58'. Alternatively, filter 113 may be supported in second portion 30b of outlet tube 30. Filter 113 may be configured to further improve the quality of the water by removing impurities or other particles. Additionally, filter 113 may be, for example, a carbon black filter, may be configured to destroy or destruct the ozone in the water in second portion 30b of outlet tube 30. As such, the water in second portion 30b of outlet tube 30 is treated with ozone and is disinfected or clean as it is delivered from outlet 2. However, when the ozone in the water is destroyed by filter 113, the water delivered from outlet 2 no longer actively disinfects objects in contact with the water. Controller 136 may be operably coupled to filter 113 to control operation of filter 113 and/or the flow of water through filter 113 (i.e., through a bypass valve). As such, a user may selectively operate filter 113 in order to produce disinfected water for particular clean water applications (e.g., drinking) and disinfecting water for other water applications (e.g., cleaning).

Faucet 10' may include a quality sensor 144 (FIG. 7) to measure the oxidation-reduction potential ("ORP") and/or the kill rate of the ozonated water, thereby monitoring the effectiveness of water treatment device 58'. For example, under normal operation, faucet 10' is configured to dispense ozonated water having a concentration of at least approximately 0.3 ppm when the water flows at approximately 0.75 gallons/minute and the temperature of the water is approximately 70° or less. Additionally, faucet 10' may be configured to achieve a kill rate of at least approximately 3 log CFU for certain bacteria and viruses within approximately 60 seconds of exposure time on hard surfaces when the flow rate of the water is approximately 0.5-1.0 gallons/minute and the temperature of the water is approximately 70° For less.

Referring to FIGS. 7 and 8, controller 136 may receive input from sensors, user input 134, or other inputs to control operation water treatment device 58'. Illustratively, user input 134 is a mechanical push button on pedestal 36. Alternatively, user input 134 may be a touch or proximity sensor implemented by a capacitive sensor, IR sensor, acoustic sensor, and other sensors. Controller 136 electrically controls the operation of water treatment device 58' and may include a timer or clock 142 to turn off water treatment device 58' and/or faucet 10' after a predetermined length of time of operation. For example, controller 136 may be configured to turn off faucet 10' after four consecutive minutes of operation in order to prevent a potential overflow condition in sink basin 1. Additionally, controller 136 may be configured to turn off water treatment device 58' after three consecutive minutes of operation in order to prevent undesirable off-gassing. Also, clock 142 may record a cumulative amount of time that water treatment device 58' has been operating within a predetermined period. For example, when water treatment device 58' cumulatively operates for approximately 15 minutes during a 60-minute period, clock 142 may send a signal to controller 136. In response thereto, controller 136 may prevent water treatment device 58' from operating until water treatment device 58' has been inactive for a predetermined time.

Additionally, clock 142 may be configured as a water treatment retention timer. More particularly, controller 136 may cooperate with clock 142 to continue operation of water treatment device 58' when a user accidentally bumps or taps spout 12, thereby accidentally turning off the water. For example, when water flows from outlet 2 and user input 134 is activated, controller 136 activates water treatment device 58' to deliver treated water from outlet 2. However, if a user accidentally bumps or taps spout 12 while water treatment device 58' is operating, thereby turning off the water, and then subsequently taps spout 12 again within a predetermined time period, the water will turn on and treated water will continue to flow from outlet 2. As such, controller 136 continues operation of water treatment device 58' for a predetermined time (e.g., 30 seconds) after spout 12 receives a tap to turn water off. If the user does not tap spout 12 within the predetermined time period to turn on the water again, thereby indicating that the user did not accidentally turn off the water, controller 136 will stop operation of water treatment device 58'. It may be appreciated that controller 136 may differentiate between a tap on spout 12 for controlling operation of faucet 10 and a grab on spout 12 for adjusting the position of spout 12. In particular, spout 12 is configured to swivel or rotate and a user may adjust the position of spout 12 without turning on/off the water.

Faucet 10' also may include a display or other signal indicator (not shown) operably coupled to user input 134 to indicate to a user whether water treatment device 58' is operating. For example, faucet 10' may include a light-emitting diode ("LED") display on pedestal 36 that may use a specific color to indicate if water treatment device 58' is active (i.e., turned on). In other illustrative embodiments of the present disclosure, user input 134 may be backlit and illuminates to indicate that water treatment device 58' is operating. For example, user input 134 may be backlit to illuminate a white light when water treatment device 58' is operating. Additionally, user input 134 may include a temperature indicator, for example a blue light for cold water and a red light for hot water. Additionally, user input 134 may be configured to gradually change from red to blue or blue to red to indicate a respective decrease or increase in the temperature of the water, as measured by thermistor 122. User input 134 also may be configured to produce a flashing light output to signal other conditions of faucet 10'.

Alternatively, rather than user input 134 to selectively activate water treatment device 58', capacitive sensor 138 and controller 136 may be used to operate water treatment device 58' and/or actuate first electrically operable valve 60 through touch or proximity sensing technology. As such, capacitive sensor 138, in combination with controller 136, may be configured to monitor and control the operation of both first electrically operable valve 60 and water treatment device 58'. Capacitive sensor 138 may comprise a hands-free proximity sensor, such as an infrared sensor coupled to spout 12, or a touch sensor to control activation of first electrically operable valve 60 and/or water treatment device 58' in a manner similar to that disclosed in U.S. Patent Application Publication No. 2011/0253220 to Sawaski et al., the disclosure of which is expressly incorporated by reference herein. More particularly, capacitive sensor 138 also may comprise an electrode (not shown) coupled to spout body 12. The side wall of spout body 12 may be formed of an electrically conductive material (e.g., metal) and define the electrode. In other illustrative embodiments, the electrode may be defined by a separate electrically conductive element, such as a metal plate. Any suitable capacitive sensor 138 may be used, such as a CapSense capacitive sensor available from Cypress Semiconductor Corporation.

An output from capacitive sensor 138 is communicated to controller 136. More particularly, controller 136 may determine whether a touch (tap or grab) is detected on spout body 12 and/or whether a user's hands or other object are within a detection area proximate spout body 12. For example, if capacitive sensor 138 is operating with the touch sensor, when a touch is detected on spout body 12, controller 136 determines the touch pattern (number of touches) before implementing different functions of faucet 10'. Controller 136 may determine that a single tap was detected on spout body 12, thereby indicating that first electrically operable valve 60 should be turned off, for example. Alternatively, controller 136 may determine that two taps (a double tap) were detected on spout body 12 within a predetermined time period (e.g., one second), thereby indicating that first electrically operable valve 60 and water treatment device 58' should be turned on, for example.

The concentration of ozone in the water, and therefore, the effectiveness of water treatment device 58', may be affected by parameters or properties of the water, such as flow rate, temperature, the flow mode at outlet 2, and the amount of power supplied to water treatment device 58'. User input 134 may be configured to flash a white light when any of the parameters or properties are insufficient or undesirable for the operation of water treatment device 58'. As such, controller 136 monitors and controls the operation of water treatment device 58' in response to signals sent by thermistor 122 and flow rate sensor assembly 124, power sensor 140, quality sensor 144, and mode sensor 120. The exemplary faucet 10' may be configured for ozone concentrations of at least approximately 0.3 ppm.

Power sensor 140 monitors the power available to first electrically operable valve 60, second electrically operable valve 156, and water treatment device 58'. For example, power sensor 140 may be configured to determine the level of current in water treatment device 58'. More particularly, if the current is lower than a predetermined amount, no ozone may be produced by water treatment device 58'. As detailed above, a low concentration of ozone decreases the effectiveness of water treatment device 58'. Therefore, if water treatment device 58' is turned on when the current supplied to water treatment device 58' is below a predetermined minimum level, controller 136 will prevent water treatment device 58' from operating in order to prevent damage to water treatment device 58'. User input 134 may indicate to a user that water treatment device 58 has not been activated.

Controller 136 also may communicate with a secondary or back-up power source, illustratively battery 130, externally coupled to water treatment housing 54' and electrically coupled to first and second electrically operable valve 60 and 156. If external power supply 146 loses power, faucet 10' may be prevented from operating. However, battery 130 or other secondary power system may provide electricity to faucet 10' in the event of a power loss. Battery 130 is illustratively a qV battery having a service life of at least approximately five years. Battery 130 is configured to power faucet 10' in a non-treatment mode for up to six months in the event of a sustained power loss. User input 134 may be configured to intermittently flash a red light to indicate that battery 130 should be replaced. It may be appreciated that battery 130 can be replaced without accessing water treatment housing 54' because battery 130 is coupled to the outside of water treatment housing 54'.

Additionally, as shown in FIG. 11, thermistor 122 is upstream from water treatment device 58' such that the water flowing from inlet waterway 64' flows over thermistor 122 before flowing to water treatment device 58'. The temperature of the water is inversely related to the concentration of ozone in the water, and in particular, as the temperature of the water increases, the concentration of ozone in the water may decrease due to undesirable off-gassing. When controller 136 receives a temperature measurement from thermistor 122 that is greater than a predetermined maximum temperature (e.g., 85° F.) for a predetermined length of time, such that the temperature of the water will adversely affect the concentration of ozone in the water, controller 136 may prevent water treatment device 58' from operating. Additionally, if the temperature of the water is periodically greater than a second predetermined temperature (e.g., approximately 120° F.), undesirable off-gassing also may occur and controller 136 may prevent water treatment device 58' from operating. If water treatment device 58' is activated when the water temperature is equal to or greater than the predetermined maximum temperature, user input 134 may indicate to a user that water treatment device 58' has not been turned on. For example, user input 134 may be illuminated with a flashing white light to indicate that the temperature of the water is not within an operating range for water treatment device 58'.

Similarly, and as shown in FIG. 11, the flow rate of the water may affect the concentration of ozone in the water, and therefore, the effectiveness of water treatment device 58'. Illustratively, the predetermined operating range of the flow rate may be approximately 0.01-2.5 gallons/minute. The maximum flow rate may be controlled by pressure-compensating flow restrictor 200 (FIG. 17A). Alternatively, as shown in FIG. 17B, a second flow restrictor 202 may be included in water treatment assembly 50'. Illustratively, second flow restrictor 202 is within outlet tube 30 and is intermediate thermistor 122 and second electrically operable valve 156. When the flow rate of the water is low (e.g., less than approximately 0.25 gallons/minute), undesirable off-gassing may occur. Additionally, when the flow rate of the water is high (e.g., greater than approximately 1.0 gallons/minute), the concentration of the ozone in the water may be adversely affected (i.e., the concentration may be too low), thereby also decreasing the effectiveness of water treatment device 58'. User input 134 may be illuminated with a flashing white light to indicate that the flow rate of the water is not within an operating range for water treatment device 58'.

In certain illustrative embodiments, controller 136 may be operably coupled to flow rate sensor assembly 124 and water treatment device 58' in order to proportionally adjust the ozone output or ozone concentration relative to the flow rate. For example, as the user or flow restrictor 200 decreases the flow of water through faucet 10, the concentration of ozone may be adjusted because ozone concentration is dependent upon the flow rate. Illustrative faucet 10' is configured to limit airborne ozone caused by off-gassing to approximately 0.05 ppm during an eight-hour time-weighted average, 0.2 ppm during a 15-minute time-weighted average, 10 and 0.5 ppm during peak exposure.

The flow modes of the water at outlet 2, or variations thereof, also may affect the concentration of ozone in the water. More particularly, the turbulence of the water is inversely related to the concentration of ozone in the water. As the turbulence of the water increases, the concentration of ozone in the water may decrease. As detailed above, the stream mode produces a more laminar, less turbulent flow of water at outlet 2 when compared to the spray mode. Additionally, the water is less turbulent when the aerator produces a laminar stream. As such, mode sensor 120 may send a signal to controller 136 to prevent water treatment device 58' from operating when spray head 15 is in a spray mode or when the aerator is in an aerated mode. If water treatment device 58' is turned on when spray head 15 is in the spray mode, for example, controller 136 may prevent water treatment device 58' from operating and user input 134 may indicate to a user that water treatment device 58' has not been activated. Alternatively, controller 136 may send a signal to change the mode of spray head 15 to produce a laminar stream. Additionally, faucet 10' may be configured with a manual override option, thereby allowing users to continue to use faucet 10' in the treatment mode when the water at outlet 2 is turbulent.

In alternative embodiments, controller 136 and/or the user may control operation of water treatment device 58' to proportionally increase or decrease the production of ozone relative to the flow rate, the temperature of the water, the current or power supply to water treatment device 58', and/or the properties or composition of the water (e.g., the concentration of ozone outputted to the water may be adjusted if the water has been filtered or otherwise treated before entering water treatment device 58'). In particular, pill 59' of water treatment device 58' may be operated by controller 136 to optimize the production of ozone such that the concentration of ozone absorbed into the water also is optimized based upon the detected flow rate and temperature of the water. Additionally, the concentration of ozone in the water may be adjusted to conserve water treatment device 58' (e.g., the output of water treatment device 58' is reduced such that the water may be partially ozonated in order to conserve water treatment device 58'). A user input, such as a dial sensor, slide sensor, or other similar inputs may be used to allow the user to positively adjust the concentration of ozone to a particular concentration.

Figure 18A:
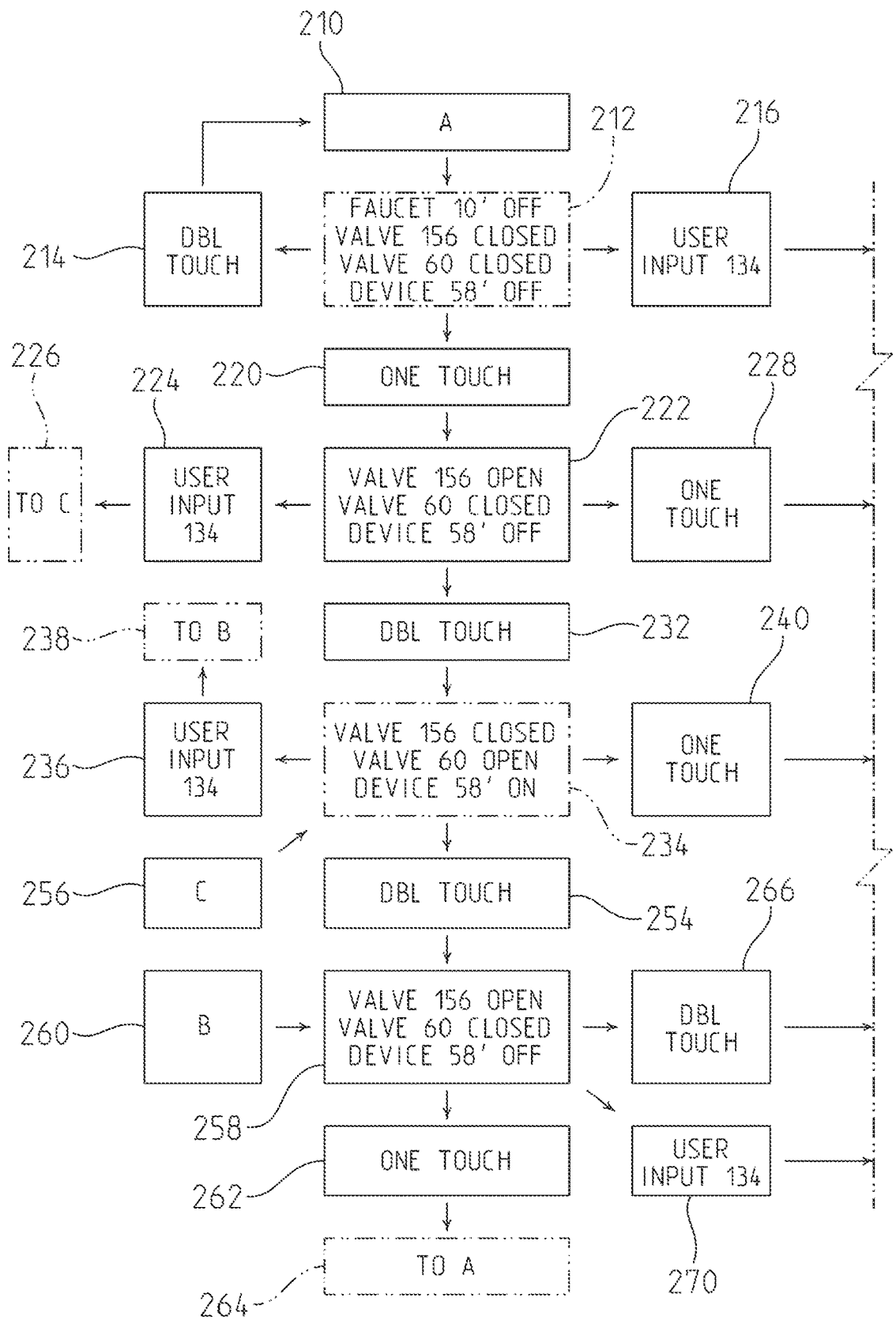
FIG. 18A is a first portion of a diagrammatic view of an illustrative method of operation according to the present disclosure, illustrating a plurality of inputs and conditions.
Figure 18B:
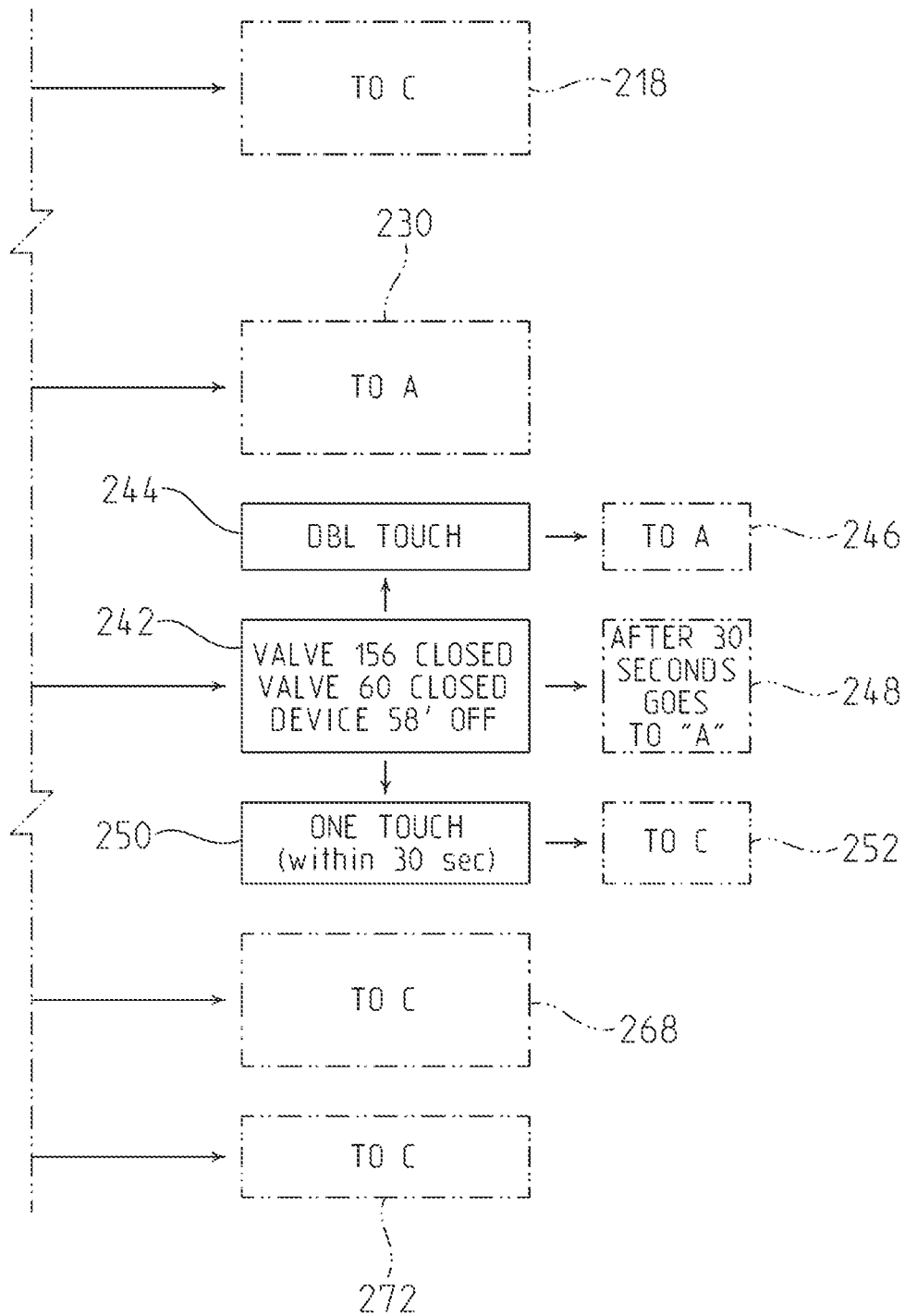
FIG. 18B is a second portion of the diagrammatic view of FIG. 18A.

As shown in FIGS. 18A and 18B, the illustrative embodiment faucet 10' may operate according to the following examples. When first and second electrically operable valves 60 and 156 are closed, faucet 10' is off and does not operate (i.e., water does not flow through outlet 2), as shown in box 212 and defined as Condition A (box 210). When faucet 10' is turned off and in Condition A, water treatment device 58' also is turned off, as shown in box 212. As shown in box 214, if the user double touches faucet 10' when faucet 10' is turned off, faucet 10' remains off and does not operate.

As shown in box 220, a single tap may activate second electrically operable valve 156 through capacitive sensor 138 such that second electrically operable valve 156 opens. However, as shown in box 220, first electrically operable valve 60 remains closed and water treatment device 58' remains turned off. Therefore, non-treated water flows through non-treatment flow path 300 and from outlet 2. More particularly, faucet 10' may be configured to start in the non-treatment mode, shown in FIG. 12, in which water from hot and/or cold water supplies 6, 8 flows through second electrically operable valve 156 and valve assembly 20 before flowing from outlet 2. Faucet 10' may be turned on in the non-treatment mode by activating capacitive sensor 138 by touching or tapping spout 12, manually moving handle 34, and/or otherwise activating user input 134 and/or other sensors on faucet 10'. The temperature and flow rate of the water may be adjusted by moving handle 34. If the user adjusts the position of handle 34 to indicate that both hot water and cold water are desired, water flowing from hot water supply 6 flows through hot water inlet tube 26 toward valve assembly 20. Similarly, water from cold water supply 8 flows into first portion 28a' of cold water inlet tube 28 ', through T-member 152, into third portion 28c' of cold water inlet tube 28', and toward valve assembly 20. Cold water may flow into second portion 28b' of cold water inlet tube 28', however, first electrically operable valve 60 is closed when faucet 10' is in the non-treatment mode and, therefore, water is prevented from flowing into first electrically operable valve 60. As such, water from cold water supply 8 bypasses first electrically operable valve 60 and water treatment device 58' when faucet 10' is in the non-treatment mode (FIG. 17A). When both the hot and cold water flow into valve assembly 20, the water is mixed in valve body 32 in order to output water at the desired temperature selected by the user through moving handle 34. The mixed water then flows through first portion 30a of outlet tube 30, through outlet waterway 66', and through second portion 30b of outlet tube 30 in order to flow through spout 12 and from outlet 2. It may be appreciated that when faucet 10' is in the non-treatment mode, first electrically operable valve 60 is closed and water treatment device 58' is not activated. As such and shown in FIGS. 17A and 17B, both first electrically operable valve 60 and water treatment device 58' are bypassed (i.e., water does not flow therethrough). User input 134 may be illuminated with a blue light to indicate that faucet 10' is operating in the non-treatment mode. As shown in FIG. 18A, a single tap, as shown in box 228, may then close second electrically operable valve 156 and return faucet 10' to Condition A (box 230) (i.e., faucet 10' is turned off).

Referring again to FIGS. 18A and 18B, a double tap, as shown in box 232, may activate first electrically operable valve 60 and water treatment device 58', such that the water at outlet 2 is treated with ozone. More particularly, as shown in box 234, the double touch initiates Condition C, in which second electrically operable valve 156 is closed, first electrically operable valve 60 is opened, and water treatment device 58' is turned on. As shown in FIG. 13, when faucet 10' is in the treatment mode shown in Condition C, second electrically operable valve 156 is closed (i.e., valve member 182 is in contact with valve seat 196) and, as such, hot water does not flow to spout 12. Additionally, because second electrically operable valve 156 is closed, any cold water in third portion 28c' of cold water inlet tube 28' does not flow through second electrically operable valve 156 or spout 12. It may be appreciated that when faucet 10' is in the treatment mode, the operation of faucet 10' is independent of handle 34. As such, a user may adjust handle 34 without affecting operation of faucet 10' when in the treatment mode.

Referring to FIG. 13, when in the treatment mode, cold water from cold water supply 8 flows into first portion 28a' of cold water inlet tube 28', through second portion 152b of T-member 152, and into inlet waterway 64' of water treatment assembly 50'. First electrically operable valve 60 is opened such that valve member 82 is spaced apart from valve seat 83 to allow water to flow through water passageway 110' and into valve cavity 84. User input 134 may be illuminated with a white light to indicate that faucet 10' is operating in the treatment mode.

As water flows through inlet waterway 64', controller 136 determines, through flow rate sensor assembly 124, if the flow rate is within an operating range and, likewise, determines, through thermistor 122, if a temperature of the water is below a predetermined maximum temperature. Additionally, controller 136 determines if the flow mode at outlet 2 defines a stream and if power is available for water treatment device 58'. If the flow within the operating range, the temperature of the water is below the predetermined maximum temperature, the flow mode is a stream, and power is available, controller 136 will activate water treatment device 58'. As such, and with reference to FIG. 13, power is supplied to water treatment device 58', in particular to pill 59'. As water flows from valve cavity 76 and into treatment cavity 84, a side-streaming portion of the water flows in direction 150A (FIG. 4A) around water treatment device 58' and a portion of the water flows in direction 150B (FIG. 4A) through water treatment device 58'. When water flows through water treatment device 58', ozone is produced. The ozonated water flows from water treatment device 58' and mixes with the non-ozonated, side-streaming water and flows into waterway tube 162, through second end 66b' of outlet waterway 66', through second portion 30b of outlet tube 30, through spout 12, and from outlet 2. As such, when faucet 10' is in the treatment mode, the water at outlet 2 is treated and may be used for disinfecting purposes.

Conversely, if controller 136 determines that the temperature of the water is greater than the predetermined temperature, that the flow rate is above or below the operating range, that the water at outlet 2 is in the spray mode, or that insufficient power is available to water treatment device 58', controller 136 may prevent water treatment device 58' from operating when faucet 10' is in the treatment mode. As such, pill 59' may not be activated and, therefore, ozone may not be produced from the water flowing through channels 118a, 118b. Also, it may be understood that water treatment device 58' will not operate if first electrically operable valve 60 is not operating. User input 134 may indicate that water treatment device 58' is not operating.

As shown in FIG. 18A, only a single touch on spout body 12 (box 240) may be required to simultaneously close first electrically operable valve 60 and turn off water treatment device 58'. When faucet 10' is in the condition indicated in box 242, faucet 10' may be completely turned off with a double touch, as shown in box 244, such that faucet 10' is returned to Condition A (box 246). However, controller 136 may continue to detect inputs for a predetermined amount of time (e.g., 30 seconds) in order to determine if the user positively turned off faucet 10' or if the user accidentally tapped faucet 10' without desiring to turn off faucet 10'. If the user does not tap faucet 10' after the predetermined amount of time, faucet 10' is returned to Condition A, as shown in box 248. However, if the user inputs a single touch, rather than a double touch, within the predetermined amount of time, as shown in box 250, faucet 10' is returned to Condition C (box 252).

When in Condition C (box 234), the user may double touch faucet 10' to open second electrically operable valve 156, close first electrically operable valve 60, and turn off water treatment device 58', defined as Condition B (box 260). When in Condition B (box 260), another double touch by the user, as shown in box 266, configures faucet 10' in Condition C (box 268). Alternatively, if user input 134 is used to selectively indicate that the treatment mode is desired, faucet 10' is configured in Condition C (box 272). However, a single touch by the user, as shown in box 262, configures faucet 10' in Condition A (box 264).

When in Condition C (box 234), the user may activate user input 134, as shown in box 236, to return faucet 10' to Condition B (box 238). Similarly, when in Condition B in which second electrically operable valve 156 is open, first electrically operable valve 60 is closed, and water treatment device 58' is closed (box 222), the user may activate user input 134, as shown in box 224, to toggle or switch between the non-treatment mode and the treatment mode and return faucet 10' to Condition C (box 226). Also, when in Condition A, the user may activate user input 134 to initiate operation of faucet 10' in the treatment mode. More particularly, when user input 134 is used, as shown in box 216, and faucet 10' is in Condition A, faucet 10' immediately operates in Condition C to provide treated water at outlet 2.

Although the invention has been described in detail with reference to certain preferred embodiments, variations and modifications exist within the spirit and scope of the invention as described and defined in the following claims.

The invention claimed is:

1. A faucet for delivering fluid comprising:
a spout;
an electrically operable valve fluidly coupled to the spout;
an ozone treatment device configured to provide ozone in the fluid;
a capacitive sensor operably coupled to the ozone treatment device, the capacitive sensor providing an output signal;
a controller operably coupled to the capacitive sensor and being configured to monitor the output signal from the capacitive sensor to selectively operate the ozone treatment device in response to the output signal;
a first valve in fluid communication with the spout;
a first flow path fluidly coupled to the first valve;
a second valve spaced apart from the first valve and in fluid communication with the spout; and
a second flow path fluidly coupled to the second valve.

2. The faucet of claim 1, wherein a user touch on the spout is detected by the capacitive sensor to selectively operate the ozone treatment device.

3. The faucet of claim 1, wherein fluid selectively flows through one of the first flow path and the second flow path, and when in the first flow path, the fluid flows through the first valve in spaced relation to the ozone treatment device, and when in the second flow path, the fluid flows through the second valve and the ozone treatment device.

4. The faucet of claim 1, further comprising a pull-out spray head removably coupled to the spout.

5. A faucet for delivery fluid comprising:
a spout including an outlet for delivering fluid;
an ozone treatment device configured to provide ozone in the fluid;
a controller operably coupled to the ozone treatment device;
a capacitive sensor operably coupled to the spout and configured to provide an output signal to the controller in response to a user touching the spout; and
wherein the controller selectively operates the ozone treatment device in response to the output signal.

6. The faucet of claim 5, further comprising an electrically operable valve fluidly coupled to the spout, wherein the controller selectively activates the electrically operable valve in response to the output signal.

7. The faucet of claim 6, wherein:
the user touching may include at least one of a single tap on the spout and a double tap on the spout;
the single tap on the spout activates the electrically operable valve; and
the double tap on the spout activates the ozone treatment device.

8. The faucet of claim 5, further comprising:
a first valve in fluid communication with the spout;
a first flow path fluidly coupled to the first valve;
a second valve spaced apart from the first valve and in fluid communication with the spout; and
a second flow path fluidly coupled to the second valve.

9. The faucet of claim 8, wherein fluid selectively flows through one of the first flow path and the second flow path, and when in the first flow path, the fluid flows through the first valve in spaced relation to the ozone treatment device, and when in the second flow path, the fluid flows through the second valve and the ozone treatment device.

10. A faucet for delivering fluid comprising:
a spout;
an electronically operable valve fluidly coupled to the spout;
a controller operably coupled to the electrically operable valve;
a capacitive sensor operably coupled to the spout and the electrically operable valve, the capacitive sensor configured to provide an output signal to the controller in response to a user touching the spout;
an electrically operable device operably coupled to the controller; and
wherein the controller selectively operates the electrically operable valve and the electrically operable device in response to the output signal.

11. The faucet of claim 10, wherein the electrically operable device comprises a water treatment device.

12. The faucet of claim 11, wherein the water treatment device comprises an ozone treatment device.

13. The faucet of claim 12, further comprising:
a first valve in fluid communication with the spout;
a first flow path fluidly coupled to the first valve;
a second valve spaced apart from the first valve and in fluid communication with the spout; and
a second flow path fluidly coupled to the second valve.

14. The faucet of claim 13, wherein fluid selectively flows through one of the first flow path and the second flow path, and when in the first flow path, the fluid flows through the first valve in spaced relation to the ozone treatment device, and when in the second flow path, the fluid flows through the second valve and the ozone treatment device.

* * * * *